(12) United States Patent
Matsuda et al.

(10) Patent No.: US 11,157,154 B2
(45) Date of Patent: Oct. 26, 2021

(54) MEDIA-EDITING APPLICATION WITH NOVEL EDITING TOOLS

(71) Applicant: Apple Inc., Cupertino, CA (US)

(72) Inventors: Ken Matsuda, Sunnyvale, CA (US); Matthew D. Diephouse, Columbus, OH (US); Dave Cerf, San Francisco, CA (US); Vincenzo De Marco, San Jose, CA (US); Jordan P. McCommons, San Jose, CA (US); Louis LaSalle, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/389,639

(22) Filed: Apr. 19, 2019

(65) Prior Publication Data

US 2019/0250806 A1 Aug. 15, 2019

Related U.S. Application Data

(63) Continuation of application No. 13/151,177, filed on Jun. 1, 2011, now Pat. No. 10,324,605.
(Continued)

(51) Int. Cl.
*G06F 3/048* (2013.01)
*G11B 27/34* (2006.01)
(Continued)

(52) U.S. Cl.
CPC .......... *G06F 3/04847* (2013.01); *G06F 3/048* (2013.01); *G06F 3/04842* (2013.01);
(Continued)

(58) Field of Classification Search
None
See application file for complete search history.

(56) References Cited

U.S. PATENT DOCUMENTS

| 5,404,316 A | 4/1995 | Klingler et al. |
| 5,440,348 A | 8/1995 | Peters et al. |

(Continued)

FOREIGN PATENT DOCUMENTS

| EP | 0702832 A1 | 3/1996 |
| GB | 2464123 A | 4/2010 |

(Continued)

OTHER PUBLICATIONS

Work with Clips in Windows Movie Maker, by Microsoft. Internet Wayback archive Oct. 13, 2009.
(Continued)

*Primary Examiner* — Ryan Barrett
*Assistant Examiner* — Haimei Jiang
(74) *Attorney, Agent, or Firm* — Invoke

(57) ABSTRACT

Some embodiments provide a media-editing application with novel editing tools. The media editing application provides an in-line precision editor that can be opened in the composite display area. In some embodiments, a selection of an edge between two clips expands a composite lane into two lanes, a first lane and a second lane. The first lane is then used to perform edits to the left side of the selected edge, while the second lane is used to perform edits to the right side of the selected edge. In some embodiments, the first lane shows the additional media content available for the clip on the left side of the edge to include. The second lane shows the additional media content available for the clip on the right side of the edge to include. The additional media content is in the source media file, of which a clip represents a portion.

18 Claims, 38 Drawing Sheets

Related U.S. Application Data

(60) Provisional application No. 61/443,692, filed on Feb. 16, 2011, provisional application No. 61/443,707, filed on Feb. 16, 2011, provisional application No. 61/443,704, filed on Feb. 16, 2011, provisional application No. 61/443,702, filed on Feb. 16, 2011.

(51) Int. Cl.
*G06F 3/0484* (2013.01)
*G11B 27/034* (2006.01)
*H04N 5/262* (2006.01)

(52) U.S. Cl.
CPC ............ *G11B 27/034* (2013.01); *G11B 27/34* (2013.01); *H04N 5/2628* (2013.01)

(56) References Cited

U.S. PATENT DOCUMENTS

| | | | |
|---|---|---|---|
| 5,442,744 A | 8/1995 | Piech et al. | |
| 5,453,846 A | 9/1995 | Tsao et al. | |
| 5,467,288 A | 11/1995 | Fasciano et al. | |
| 5,519,828 A | 5/1996 | Rayner | |
| 5,521,841 A | 5/1996 | Arman et al. | |
| 5,524,244 A | 6/1996 | Robinson et al. | |
| 5,559,945 A | 9/1996 | Beaudet et al. | |
| 5,613,909 A | 3/1997 | Stelovsky | |
| 5,634,020 A | 5/1997 | Norton | |
| 5,659,539 A | 8/1997 | Porter et al. | |
| 5,659,792 A | 8/1997 | Walmsley | |
| 5,659,793 A | 8/1997 | Escobar et al. | |
| 5,664,216 A | 9/1997 | Blumenau | |
| 5,682,326 A | 10/1997 | Klingler et al. | |
| 5,732,184 A | 3/1998 | Chao et al. | |
| 5,752,029 A | 5/1998 | Wissner | |
| 5,760,767 A | 6/1998 | Shore et al. | |
| 5,781,188 A | 7/1998 | Amiot et al. | |
| 5,812,204 A | 9/1998 | Baker et al. | |
| 5,826,102 A | 10/1998 | Escobar et al. | |
| 5,838,381 A | 11/1998 | Kasahara et al. | |
| 5,892,506 A | 4/1999 | Hermanson | |
| 5,892,507 A | 4/1999 | Moorby et al. | |
| 5,893,062 A | 4/1999 | Bhadkamkar et al. | |
| 5,930,446 A | 7/1999 | Kanda | |
| 5,940,573 A | 8/1999 | Beckwith | |
| 5,999,173 A | 12/1999 | Ubillos | |
| 5,999,220 A | 12/1999 | Washino | |
| 6,005,621 A | 12/1999 | Linzer et al. | |
| 6,023,714 A | 2/2000 | Hill et al. | |
| 6,057,833 A | 5/2000 | Heidmann et al. | |
| 6,061,062 A | 5/2000 | Venolia | |
| 6,122,411 A | 9/2000 | Shen et al. | |
| 6,134,380 A | 10/2000 | Kushizaki | |
| 6,144,375 A | 11/2000 | Jain et al. | |
| 6,154,600 A | 11/2000 | Newman et al. | |
| 6,154,601 A | 11/2000 | Yaegashi et al. | |
| 6,161,115 A | 12/2000 | Ohanian | |
| 6,172,675 B1 | 1/2001 | Ahmad et al. | |
| 6,182,109 B1 | 1/2001 | Sharma et al. | |
| 6,184,937 B1 | 2/2001 | Williams et al. | |
| 6,188,396 B1 | 2/2001 | Boezeman et al. | |
| 6,204,840 B1 | 3/2001 | Petelycky et al. | |
| 6,211,869 B1 | 4/2001 | Loveman et al. | |
| 6,229,850 B1 | 5/2001 | Linzer et al. | |
| 6,243,133 B1 | 6/2001 | Spaulding et al. | |
| 6,262,776 B1 | 7/2001 | Griffits | |
| 6,281,420 B1 | 8/2001 | Suzuki et al. | |
| 6,324,335 B1 | 11/2001 | Kanda | |
| 6,366,296 B1 | 4/2002 | Boreczky et al. | |
| 6,370,198 B1 | 4/2002 | Washino | |
| 6,392,710 B1 | 5/2002 | Gonsalves et al. | |
| 6,400,378 B1* | 6/2002 | Snook ................ | G11B 27/034 707/999.102 |
| 6,404,978 B1 | 6/2002 | Abe | |
| 6,414,686 B1 | 7/2002 | Protheroe et al. | |
| 6,469,711 B2 | 10/2002 | Foreman et al. | |
| 6,476,826 B1 | 11/2002 | Plotkin et al. | |
| 6,477,315 B1 | 11/2002 | Ohomori | |
| 6,486,896 B1 | 11/2002 | Ubillos | |
| 6,487,565 B1 | 11/2002 | Schechter et al. | |
| 6,539,163 B1 | 3/2003 | Sheasby et al. | |
| RE38,079 E | 4/2003 | Washino et al. | |
| 6,542,692 B1 | 4/2003 | Houskeeper | |
| 6,544,294 B1 | 4/2003 | Greenfield et al. | |
| 6,546,188 B1 | 4/2003 | Ishii et al. | |
| 6,546,399 B1 | 4/2003 | Reed et al. | |
| 6,559,868 B2 | 5/2003 | Alexander et al. | |
| 6,573,898 B1 | 6/2003 | Mathur et al. | |
| 6,628,303 B1* | 9/2003 | Foreman ............... | G06F 3/0483 375/E7.026 |
| 6,629,104 B1 | 9/2003 | Parulski et al. | |
| 6,631,240 B1 | 10/2003 | Salesin et al. | |
| 6,650,826 B1 | 11/2003 | Hatta | |
| 6,658,194 B1 | 12/2003 | Omori | |
| 6,665,343 B1 | 12/2003 | Jahanghir et al. | |
| 6,670,966 B1* | 12/2003 | Kusanagi ............ | G11B 27/034 715/716 |
| 6,674,955 B2 | 1/2004 | Matsui et al. | |
| 6,714,216 B2 | 3/2004 | Abe | |
| 6,741,996 B1 | 5/2004 | Brechner et al. | |
| 6,744,968 B1 | 6/2004 | Imai et al. | |
| 6,763,175 B1 | 7/2004 | Trottier et al. | |
| 6,771,285 B1 | 8/2004 | McGrath et al. | |
| 6,848,117 B1 | 1/2005 | Emura | |
| 6,871,003 B1 | 3/2005 | Phillips et al. | |
| 6,871,161 B2 | 3/2005 | Laird | |
| 6,904,566 B2 | 6/2005 | Feller et al. | |
| 6,928,613 B1 | 8/2005 | Ishii et al. | |
| 6,940,518 B2 | 9/2005 | Minner et al. | |
| 6,947,044 B1 | 9/2005 | Kulas | |
| 6,950,836 B2 | 9/2005 | Lohn et al. | |
| 6,956,574 B1 | 10/2005 | Cailloux et al. | |
| 6,965,723 B1 | 11/2005 | Abe et al. | |
| 6,967,599 B2 | 11/2005 | Choi et al. | |
| 6,970,859 B1 | 11/2005 | Brechner et al. | |
| 7,020,381 B1 | 3/2006 | Kato et al. | |
| 7,035,435 B2 | 4/2006 | Li et al. | |
| 7,035,463 B1 | 4/2006 | Monobe et al. | |
| 7,042,489 B2 | 5/2006 | Zell et al. | |
| 7,043,137 B2 | 5/2006 | Slone | |
| 7,062,107 B1 | 6/2006 | Crosby et al. | |
| 7,062,713 B2 | 6/2006 | Schriever et al. | |
| 7,073,127 B2 | 7/2006 | Zhao et al. | |
| 7,079,144 B1 | 7/2006 | Shimada et al. | |
| 7,103,260 B1 | 9/2006 | Hinson | |
| 7,103,839 B1 | 9/2006 | Natkin et al. | |
| 7,155,676 B2 | 12/2006 | Land et al. | |
| 7,171,625 B1 | 1/2007 | Sacchi | |
| 7,194,676 B2 | 3/2007 | Fayan et al. | |
| 7,207,007 B2 | 4/2007 | Moriwake et al. | |
| 7,313,755 B2 | 12/2007 | Rahman et al. | |
| 7,325,199 B1 | 1/2008 | Reid | |
| 7,336,264 B2 | 2/2008 | Cajolet et al. | |
| 7,370,335 B1 | 5/2008 | White et al. | |
| 7,383,509 B2 | 6/2008 | Foote et al. | |
| 7,398,002 B2 | 7/2008 | Hsiao et al. | |
| 7,411,590 B1 | 8/2008 | Boyd et al. | |
| 7,432,940 B2 | 10/2008 | Brook et al. | |
| 7,434,155 B2 | 10/2008 | Lee | |
| 7,437,674 B2 | 10/2008 | Chen | |
| 7,444,593 B1 | 10/2008 | Reid | |
| 7,480,864 B2 | 1/2009 | Brook et al. | |
| 7,502,139 B2 | 3/2009 | Nishimura | |
| 7,518,611 B2 | 4/2009 | Boyd et al. | |
| 7,539,659 B2 | 5/2009 | Wong et al. | |
| 7,546,532 B1* | 6/2009 | Nichols ................ | G11B 27/34 715/716 |
| 7,561,160 B2 | 7/2009 | Fukuya | |
| 7,606,444 B1 | 10/2009 | Erol et al. | |
| 7,623,755 B2* | 11/2009 | Kuspa ................ | G11B 27/034 386/278 |
| 7,623,756 B2 | 11/2009 | Komori et al. | |
| 7,653,550 B2 | 1/2010 | Schulz | |
| 7,664,336 B2 | 2/2010 | Zhang et al. | |

(56) References Cited

U.S. PATENT DOCUMENTS

| | | |
|---|---|---|
| 7,668,869 B2 | 2/2010 | Weinberger et al. |
| 7,669,130 B2 | 2/2010 | Agarwal et al. |
| 7,689,510 B2 | 3/2010 | Lamkin et al. |
| 7,710,439 B2 | 5/2010 | Reid et al. |
| 7,720,349 B2 | 5/2010 | Ogikubo |
| 7,725,828 B1 | 5/2010 | Johnson |
| 7,739,299 B2 | 6/2010 | Kii et al. |
| RE41,493 E | 8/2010 | Marcus |
| 7,770,125 B1 | 8/2010 | Young et al. |
| 7,779,358 B1 | 8/2010 | Gupta et al. |
| 7,805,678 B1 * | 9/2010 | Niles ................ G06F 3/0483 715/716 |
| 7,823,056 B1 | 10/2010 | Davey et al. |
| 7,836,389 B2 | 11/2010 | Howard et al. |
| 7,856,424 B2 | 12/2010 | Cisler et al. |
| 7,885,472 B2 | 2/2011 | Yamamoto |
| 7,889,946 B1 | 2/2011 | Bourdev |
| 7,889,975 B2 | 2/2011 | Slone |
| 7,890,867 B1 | 2/2011 | Margulis |
| 7,925,669 B2 | 4/2011 | Freeborg et al. |
| 7,954,065 B2 | 5/2011 | Ubillos |
| 7,956,930 B2 | 6/2011 | Sullivan |
| 7,958,507 B2 | 6/2011 | Santos et al. |
| 7,975,062 B2 | 7/2011 | Krikorian et al. |
| 7,992,097 B2 | 8/2011 | Ubillos |
| 8,006,261 B1 | 8/2011 | Haberman et al. |
| 8,010,910 B2 | 8/2011 | Wright et al. |
| 8,020,100 B2 | 9/2011 | Ubillos et al. |
| 8,024,657 B2 | 9/2011 | Larsen et al. |
| 8,082,376 B2 | 12/2011 | Schubert et al. |
| 8,140,953 B1 | 3/2012 | Weaver |
| 8,176,416 B1 | 5/2012 | Williams et al. |
| 8,209,612 B2 | 6/2012 | Johnson |
| 8,265,300 B2 | 9/2012 | Reid et al. |
| 8,285,901 B2 | 10/2012 | Schubert et al. |
| 8,307,287 B2 | 11/2012 | Bhatt |
| 8,332,757 B1 * | 12/2012 | Davey ................ G11B 27/105 715/716 |
| 8,418,068 B1 | 4/2013 | Backus et al. |
| 8,418,082 B2 | 4/2013 | Meaney et al. |
| 8,473,846 B2 | 6/2013 | Ubillos et al. |
| 8,522,144 B2 | 8/2013 | Lyons et al. |
| 8,533,598 B2 * | 9/2013 | Meaney ................ G11B 27/34 715/723 |
| 8,566,721 B2 | 10/2013 | Langmacher et al. |
| 8,572,499 B2 | 10/2013 | Lee et al. |
| 8,577,683 B2 | 11/2013 | DeWitt |
| 8,612,858 B2 | 12/2013 | Meaney et al. |
| 8,621,356 B1 * | 12/2013 | Cho ................ G11B 27/02 715/723 |
| 8,631,326 B2 | 1/2014 | Meaney et al. |
| 8,745,499 B2 | 6/2014 | Pendergast et al. |
| 8,769,421 B2 | 7/2014 | Meaney et al. |
| 8,775,480 B2 | 7/2014 | Carson et al. |
| 8,826,117 B1 | 9/2014 | Junee et al. |
| 8,839,110 B2 | 9/2014 | Wang et al. |
| 8,875,025 B2 | 10/2014 | Ubillos et al. |
| 8,886,015 B2 | 11/2014 | Angquist et al. |
| 8,954,477 B2 | 2/2015 | Agnoli et al. |
| 9,099,161 B2 | 8/2015 | Abbas et al. |
| 9,251,855 B2 | 2/2016 | Graves et al. |
| 2001/0000221 A1 | 4/2001 | Chen et al. |
| 2001/0020953 A1 | 9/2001 | Moriwake et al. |
| 2001/0033295 A1 | 10/2001 | Phillips |
| 2001/0036356 A1 | 11/2001 | Weaver et al. |
| 2001/0040592 A1 | 11/2001 | Foreman et al. |
| 2001/0056434 A1 | 12/2001 | Kaplan et al. |
| 2001/0056460 A1 | 12/2001 | Sahota et al. |
| 2002/0018640 A1 | 2/2002 | Bolduc |
| 2002/0023103 A1 | 2/2002 | Gagne |
| 2002/0069218 A1 | 6/2002 | Sull et al. |
| 2002/0081099 A1 | 6/2002 | Tsumagari et al. |
| 2002/0089540 A1 | 7/2002 | Geier et al. |
| 2002/0101368 A1 | 8/2002 | Choi et al. |
| 2002/0177207 A1 | 9/2002 | Klassen et al. |
| 2002/0140719 A1 | 10/2002 | Amir et al. |
| 2002/0154140 A1 | 10/2002 | Tazaki |
| 2002/0154156 A1 | 10/2002 | Moriwake et al. |
| 2002/0156805 A1 | 10/2002 | Schriever et al. |
| 2002/0168176 A1 | 11/2002 | Iizuka et al. |
| 2002/0188628 A1 | 12/2002 | Cooper et al. |
| 2003/0001848 A1 | 1/2003 | Doyle et al. |
| 2003/0002715 A1 | 1/2003 | Kowald |
| 2003/0002851 A1 | 1/2003 | Hsiao et al. |
| 2003/0007017 A1 | 1/2003 | Laffey et al. |
| 2003/0016254 A1 | 1/2003 | Abe |
| 2003/0018609 A1 | 1/2003 | Phillips et al. |
| 2003/0053685 A1 | 3/2003 | Lestideau |
| 2003/0088877 A1 | 5/2003 | Loveman et al. |
| 2003/0090504 A1 | 5/2003 | Brook et al. |
| 2003/0097400 A1 | 5/2003 | Li et al. |
| 2003/0117431 A1 | 6/2003 | Moriwake et al. |
| 2003/0146915 A1 | 8/2003 | Brook et al. |
| 2003/0164845 A1 | 9/2003 | Fayan et al. |
| 2003/0177145 A1 | 9/2003 | Lohn et al. |
| 2003/0197743 A1 | 10/2003 | Hill et al. |
| 2003/0234803 A1 | 12/2003 | Toyama et al. |
| 2004/0001079 A1 | 1/2004 | Zhao et al. |
| 2004/0001106 A1 | 1/2004 | Deutscher et al. |
| 2004/0001694 A1 | 1/2004 | Evans et al. |
| 2004/0012594 A1 | 1/2004 | Gauthier et al. |
| 2004/0027369 A1 | 2/2004 | Kellock et al. |
| 2004/0046804 A1 | 3/2004 | Chang |
| 2004/0056883 A1 | 3/2004 | Wierowski |
| 2004/0066395 A1 | 4/2004 | Foreman et al. |
| 2004/0071441 A1 | 4/2004 | Foreman et al. |
| 2004/0078761 A1 | 4/2004 | Ohanian |
| 2004/0085354 A1 | 5/2004 | Massand |
| 2004/0088723 A1 | 5/2004 | Ma et al. |
| 2004/0090462 A1 | 5/2004 | Graham |
| 2004/0098379 A1 | 5/2004 | Huang |
| 2004/0100482 A1 | 5/2004 | Cajolet et al. |
| 2004/0125124 A1 | 7/2004 | Kim et al. |
| 2004/0131330 A1 | 7/2004 | Wilkins et al. |
| 2004/0151469 A1 | 8/2004 | Engholm et al. |
| 2004/0197084 A1 | 10/2004 | Tagawa et al. |
| 2004/0201609 A1 | 10/2004 | Obrador |
| 2004/0212637 A1 | 10/2004 | Varghese |
| 2004/0215643 A1 | 10/2004 | Brechner et al. |
| 2004/0233806 A1 | 11/2004 | Kawahara |
| 2004/0257434 A1 | 12/2004 | Davis et al. |
| 2004/0267952 A1 | 12/2004 | He et al. |
| 2004/0268224 A1 | 12/2004 | Balkus et al. |
| 2005/0041029 A1 | 2/2005 | Felt |
| 2005/0042591 A1 | 2/2005 | Bloom et al. |
| 2005/0052441 A1 | 3/2005 | Stevens |
| 2005/0058430 A1 | 3/2005 | Nakamura et al. |
| 2005/0084232 A1 | 4/2005 | Herberger et al. |
| 2005/0120127 A1 | 6/2005 | Bradley et al. |
| 2005/0132293 A1 | 6/2005 | Herberger et al. |
| 2005/0183041 A1 | 8/2005 | Chiu et al. |
| 2005/0201724 A1 | 9/2005 | Chu |
| 2005/0207734 A1 | 9/2005 | Howell et al. |
| 2005/0213833 A1 | 9/2005 | Okada et al. |
| 2005/0216840 A1 * | 9/2005 | Salvucci ................ G11B 27/034 715/723 |
| 2005/0238217 A1 | 10/2005 | Enomoto et al. |
| 2005/0257152 A1 | 11/2005 | Shimizu et al. |
| 2006/0008247 A1 * | 1/2006 | Minami ................ G11B 27/034 386/280 |
| 2006/0015811 A1 | 1/2006 | Tanaka et al. |
| 2006/0048057 A1 | 3/2006 | Herberger et al. |
| 2006/0056716 A1 | 3/2006 | Komeno |
| 2006/0059426 A1 * | 3/2006 | Ogikubo ................ H04N 5/85 715/723 |
| 2006/0078288 A1 | 4/2006 | Huang et al. |
| 2006/0101064 A1 | 5/2006 | Strong et al. |
| 2006/0112390 A1 | 5/2006 | Hamaoka |
| 2006/0136556 A1 | 6/2006 | Stevens et al. |
| 2006/0150072 A1 | 7/2006 | Salvucci |
| 2006/0155684 A1 | 7/2006 | Liu et al. |
| 2006/0156219 A1 | 7/2006 | Haot et al. |
| 2006/0161635 A1 | 7/2006 | Lamkin et al. |
| 2006/0161867 A1 | 7/2006 | Drucker et al. |

(56) References Cited

U.S. PATENT DOCUMENTS

| | | |
|---|---|---|
| 2006/0168521 A1 | 7/2006 | Shimizu et al. |
| 2006/0184980 A1 | 8/2006 | Cole |
| 2006/0224940 A1 | 10/2006 | Lee |
| 2006/0233514 A1 | 10/2006 | Weng et al. |
| 2006/0236245 A1 | 10/2006 | Agarwal et al. |
| 2006/0242122 A1 | 10/2006 | Devorchik et al. |
| 2006/0242164 A1 | 10/2006 | Evans et al. |
| 2006/0253781 A1 | 11/2006 | Pea et al. |
| 2006/0277454 A1 | 12/2006 | Chen |
| 2007/0016872 A1 | 1/2007 | Cummins et al. |
| 2007/0022159 A1 | 1/2007 | Zhu et al. |
| 2007/0053429 A1 | 3/2007 | Jawerth et al. |
| 2007/0058937 A1 | 3/2007 | Ando et al. |
| 2007/0061862 A1 | 3/2007 | Berger et al. |
| 2007/0079321 A1 | 4/2007 | Ott, IV |
| 2007/0124282 A1 | 5/2007 | Wittkotter |
| 2007/0136656 A1 | 6/2007 | Nydam et al. |
| 2007/0154190 A1 | 7/2007 | Gilley et al. |
| 2007/0168873 A1 | 7/2007 | Lentz |
| 2007/0189627 A1 | 8/2007 | Cohen et al. |
| 2007/0189708 A1 | 8/2007 | Lerman et al. |
| 2007/0192697 A1 | 8/2007 | Kawamura et al. |
| 2007/0192729 A1 | 8/2007 | Downs |
| 2007/0203945 A1 | 8/2007 | Louw |
| 2007/0204238 A1 | 8/2007 | Hua et al. |
| 2007/0234214 A1 | 10/2007 | Lovejoy et al. |
| 2007/0240072 A1 | 10/2007 | Cunningham et al. |
| 2007/0242085 A1 | 10/2007 | Weybrew et al. |
| 2007/0260968 A1 | 11/2007 | Howard et al. |
| 2007/0262995 A1 | 11/2007 | Tran |
| 2007/0266304 A1 | 11/2007 | Fletcher et al. |
| 2008/0013916 A1 | 1/2008 | Sharpe et al. |
| 2008/0034013 A1 | 2/2008 | Cisler et al. |
| 2008/0044155 A1* | 2/2008 | Kuspa ................... G11B 27/34 386/278 |
| 2008/0062177 A1 | 3/2008 | Gaul et al. |
| 2008/0071881 A1 | 3/2008 | Kronlund et al. |
| 2008/0072166 A1 | 3/2008 | Reddy |
| 2008/0079972 A1 | 4/2008 | Goodwin et al. |
| 2008/0080721 A1 | 4/2008 | Reid et al. |
| 2008/0104127 A1 | 5/2008 | Billmaier et al. |
| 2008/0110553 A1 | 5/2008 | Otsubo |
| 2008/0120328 A1 | 5/2008 | Delgo et al. |
| 2008/0126191 A1 | 5/2008 | Schiavi |
| 2008/0138034 A1 | 6/2008 | Hiroi et al. |
| 2008/0152297 A1 | 6/2008 | Ubillos |
| 2008/0152298 A1 | 6/2008 | Ubillos |
| 2008/0155420 A1 | 6/2008 | Ubillos et al. |
| 2008/0155421 A1 | 6/2008 | Ubillos et al. |
| 2008/0155459 A1 | 6/2008 | Ubillos |
| 2008/0170553 A1 | 7/2008 | Montemurro et al. |
| 2008/0172399 A1 | 7/2008 | Chi et al. |
| 2008/0184121 A1 | 7/2008 | Kulas |
| 2008/0184290 A1 | 7/2008 | Tapuska |
| 2008/0222170 A1 | 9/2008 | Farnham et al. |
| 2008/0253735 A1 | 10/2008 | Kuspa et al. |
| 2008/0256449 A1 | 10/2008 | Bhatt |
| 2008/0273862 A1 | 11/2008 | Okamoto et al. |
| 2008/0288869 A1 | 11/2008 | Ubillos |
| 2008/0306921 A1 | 12/2008 | Rothmuller et al. |
| 2008/0317431 A1 | 12/2008 | Mishima et al. |
| 2009/0006437 A1 | 1/2009 | Saito |
| 2009/0006475 A1 | 1/2009 | Udezue et al. |
| 2009/0031239 A1 | 1/2009 | Coleran et al. |
| 2009/0037605 A1 | 2/2009 | Li |
| 2009/0063429 A1 | 3/2009 | Rudolph |
| 2009/0070820 A1 | 3/2009 | Li |
| 2009/0089690 A1 | 4/2009 | Chi et al. |
| 2009/0097815 A1 | 4/2009 | Lahr et al. |
| 2009/0100339 A1 | 4/2009 | Wharton-Ali et al. |
| 2009/0129479 A1 | 5/2009 | Yellamraju |
| 2009/0147004 A1 | 6/2009 | Ramon et al. |
| 2009/0150947 A1 | 6/2009 | Soderstrom |
| 2009/0172543 A1 | 7/2009 | Cronin et al. |
| 2009/0174813 A1 | 7/2009 | Washino |
| 2009/0182644 A1 | 7/2009 | Panagopulos et al. |
| 2009/0187864 A1 | 7/2009 | Bedell et al. |
| 2009/0196346 A1 | 8/2009 | Zhang et al. |
| 2009/0201316 A1 | 8/2009 | Bhatt et al. |
| 2009/0204894 A1 | 8/2009 | Bhatt et al. |
| 2009/0228784 A1 | 9/2009 | Drieu et al. |
| 2009/0232480 A1 | 9/2009 | Jendbro |
| 2009/0249185 A1 | 10/2009 | Datar et al. |
| 2009/0249222 A1 | 10/2009 | Schmidt et al. |
| 2009/0251475 A1 | 10/2009 | Mathur et al. |
| 2009/0254825 A1 | 10/2009 | Sichart et al. |
| 2009/0259623 A1 | 10/2009 | Mooneyham et al. |
| 2009/0263100 A1 | 10/2009 | Neuman |
| 2009/0288010 A1* | 11/2009 | Ubillos ................. G11B 27/34 715/720 |
| 2010/0005397 A1 | 1/2010 | Lanahan et al. |
| 2010/0005417 A1 | 1/2010 | Lanahan et al. |
| 2010/0005485 A1 | 1/2010 | Tian et al. |
| 2010/0021125 A1 | 1/2010 | Ingrosso et al. |
| 2010/0023972 A1 | 1/2010 | Summers et al. |
| 2010/0040349 A1 | 2/2010 | Landy |
| 2010/0050080 A1 | 2/2010 | Libert et al. |
| 2010/0063961 A1 | 3/2010 | Guiheneuf et al. |
| 2010/0077289 A1 | 3/2010 | Das et al. |
| 2010/0080528 A1 | 4/2010 | Yen et al. |
| 2010/0082585 A1 | 4/2010 | Barsook et al. |
| 2010/0083173 A1 | 4/2010 | Germann et al. |
| 2010/0088295 A1 | 4/2010 | Duan et al. |
| 2010/0107126 A1 | 4/2010 | Lin et al. |
| 2010/0153395 A1 | 6/2010 | Hannuksela et al. |
| 2010/0153520 A1 | 6/2010 | Daun et al. |
| 2010/0158471 A1 | 6/2010 | Ogikubo |
| 2010/0194763 A1 | 8/2010 | Niles et al. |
| 2010/0241962 A1 | 9/2010 | Peterson et al. |
| 2010/0246996 A1 | 9/2010 | Yamamoto |
| 2010/0262710 A1 | 10/2010 | Khatib et al. |
| 2010/0274673 A1 | 10/2010 | Isaac |
| 2010/0274674 A1 | 10/2010 | Roberts et al. |
| 2010/0275121 A1 | 10/2010 | Johnson |
| 2010/0275123 A1 | 10/2010 | Yu et al. |
| 2010/0278504 A1 | 11/2010 | Lyons et al. |
| 2010/0281366 A1 | 11/2010 | Langmacher et al. |
| 2010/0281367 A1 | 11/2010 | Langmacher et al. |
| 2010/0281371 A1 | 11/2010 | Warner et al. |
| 2010/0281377 A1 | 11/2010 | Meaney et al. |
| 2010/0281378 A1 | 11/2010 | Pendergast et al. |
| 2010/0281379 A1* | 11/2010 | Meaney ............... G11B 27/031 715/723 |
| 2010/0281381 A1* | 11/2010 | Meaney ................ G11B 27/34 715/723 |
| 2010/0281382 A1* | 11/2010 | Meaney ................ G11B 27/34 715/723 |
| 2010/0281383 A1 | 11/2010 | Meaney et al. |
| 2010/0281384 A1 | 11/2010 | Lyons et al. |
| 2010/0281386 A1 | 11/2010 | Lyons et al. |
| 2010/0287475 A1 | 11/2010 | Van et al. |
| 2010/0305729 A1 | 12/2010 | Glitsch et al. |
| 2010/0315366 A1 | 12/2010 | Lee et al. |
| 2010/0322981 A1 | 12/2010 | Bujard et al. |
| 2010/0332981 A1 | 12/2010 | Lipton et al. |
| 2011/0008017 A1 | 1/2011 | Gausereide |
| 2011/0010624 A1 | 1/2011 | Vanslette et al. |
| 2011/0026899 A1 | 2/2011 | Lussier et al. |
| 2011/0030031 A1 | 2/2011 | Lussier et al. |
| 2011/0047163 A1 | 2/2011 | Chechik et al. |
| 2011/0072037 A1 | 3/2011 | Lotzer |
| 2011/0097011 A1 | 4/2011 | Lim et al. |
| 2011/0103684 A1 | 5/2011 | Bhatt et al. |
| 2011/0103772 A1* | 5/2011 | Suzuki ................. G11B 27/34 386/285 |
| 2011/0109796 A1 | 5/2011 | Subedar et al. |
| 2011/0113331 A1 | 5/2011 | Herberger et al. |
| 2011/0116769 A1 | 5/2011 | Sugiyama et al. |
| 2011/0145428 A1 | 6/2011 | Wei et al. |
| 2011/0161348 A1 | 6/2011 | Oron |
| 2011/0206351 A1 | 8/2011 | Givoly |
| 2011/0206352 A1 | 8/2011 | Mikawa |
| 2011/0217025 A1 | 9/2011 | Begen et al. |
| 2011/0239101 A1 | 9/2011 | Rivers-Moore et al. |

(56) References Cited

U.S. PATENT DOCUMENTS

| | | |
|---|---|---|
| 2011/0246889 A1 | 10/2011 | Moore |
| 2011/0258547 A1 | 10/2011 | Symons et al. |
| 2011/0268427 A1 | 11/2011 | Brelay et al. |
| 2011/0271127 A1 | 11/2011 | Thabet et al. |
| 2011/0276881 A1 | 11/2011 | Keng et al. |
| 2012/0011441 A1 | 1/2012 | Larsen et al. |
| 2012/0017152 A1 | 1/2012 | Matsuda et al. |
| 2012/0017153 A1 | 1/2012 | Matsuda et al. |
| 2012/0066628 A1 | 3/2012 | Ens et al. |
| 2012/0198318 A1 | 8/2012 | Graves et al. |
| 2012/0198319 A1 | 8/2012 | Agnoli et al. |
| 2012/0206653 A1 | 8/2012 | Graves et al. |
| 2012/0207449 A1 | 8/2012 | Angquist et al. |
| 2012/0207452 A1 | 8/2012 | Wang et al. |
| 2012/0209815 A1 | 8/2012 | Carson et al. |
| 2012/0209889 A1 | 8/2012 | Agnoli et al. |
| 2012/0210217 A1 | 8/2012 | Abbas et al. |
| 2012/0210218 A1 | 8/2012 | Pendergast et al. |
| 2012/0210219 A1 | 8/2012 | Agnoli et al. |
| 2012/0210220 A1 | 8/2012 | Pendergast et al. |
| 2012/0210221 A1 | 8/2012 | Khan et al. |
| 2012/0210222 A1 | 8/2012 | Matsuda et al. |
| 2012/0210228 A1 | 8/2012 | Wang et al. |
| 2012/0210230 A1 | 8/2012 | Matsuda et al. |
| 2012/0210231 A1 | 8/2012 | Ubillos et al. |
| 2012/0210232 A1 | 8/2012 | Wang et al. |
| 2012/0301114 A1 | 11/2012 | Johnson |
| 2013/0073933 A1 | 3/2013 | Eppolito |
| 2013/0073959 A1 | 3/2013 | Eppolito et al. |
| 2013/0073960 A1 | 3/2013 | Eppolito et al. |
| 2013/0073961 A1 | 3/2013 | Agnoli et al. |
| 2013/0073962 A1 | 3/2013 | Pendergast et al. |
| 2013/0073963 A1 | 3/2013 | Pendergast et al. |
| 2013/0073964 A1 | 3/2013 | Meaney et al. |
| 2013/0104042 A1 | 4/2013 | Meaney et al. |
| 2013/0120388 A1 | 5/2013 | O'Donnell et al. |
| 2013/0132839 A1 | 5/2013 | Berry |
| 2014/0035945 A1 | 2/2014 | Anglin et al. |
| 2014/0169765 A1 | 6/2014 | Wang et al. |
| 2014/0331139 A1 | 11/2014 | Carson et al. |
| 2015/0019972 A1 | 1/2015 | Matsuda et al. |
| 2019/0250806 A1* | 8/2019 | Matsuda ............. G06F 3/04847 |

FOREIGN PATENT DOCUMENTS

| | | |
|---|---|---|
| WO | 94/29868 A2 | 12/1994 |
| WO | 99/14941 A2 | 3/1999 |
| WO | 2007/120694 A1 | 10/2007 |
| WO | 2008/151416 A1 | 12/2008 |
| WO | 2009/026159 A1 | 2/2009 |
| WO | 2009/114134 A2 | 9/2009 |
| WO | 2009/128227 A1 | 10/2009 |
| WO | 2009/129252 A2 | 10/2009 |
| WO | 2010/106586 A1 | 9/2010 |

OTHER PUBLICATIONS

Weynand, Diana. Apple Pro Training Series: Final Cut Pro for Avid Editors, Fourth Edition. 2010. Reviewed at Safaribooks Online.

Weingartner, Andy, "Windows Movie Maker 2011 User Guide," Month Unknown, 2011, pp. 1-70, Microsoft.

Wang, Yijin, et al. "MyVideos—A System for Home Video Management", Proceedings of the 10th ACM International Conference on Multimedia '02, Dec. 1-6, 2002, pp. 412-413, Juan-les-Pins, France.

Ulges, Adrian, et al., "Content-based Video Tagging for Online Video Portals", Proceedings of the 3rd MUSCLE/Image CLEF Workshop on Image and Video Retrieval Evaluation, Sep. 2007, 10 pages, Budapest, Hungary.

Stone, Ken, "The Basics—Editing with Transitions in Final Cut Pro," The Ken Stone Index, Jun. 12, 2001, pp. 1-8.

Stone, Ken, "Motion Paths and the Bezier Handle in FCP," Aug. 13, 2001, Ken Stone.

Stone, Ken, "Basic Keyframing in Final Cut Express", Jan. 27, 2003, V. 1.0.1, Ken Stone.

Shaw, Ryan, et al., "Toward Emergent Representations for Video", Proceedings of the 13th annual ACM International Conference on Multimedia, Nov. 6-11, 2005, 4 pages, Singapore.

Sauer, Jeff, "Review: Apple Final Cut Pro 4," Oct. 3, 2003.

Oetzmann, Anthony, et al., "Audacity—Editing for Beginners Part 2—Cut, Copy and Paste," Apr. 12, 2004, http://audacity.sourceforge.neUmanual1.2/tutorial_ed_beginner2.html.

Myers, Brad A., et al., "A Multi-View Intelligent Editor for Digital Video Libraries", The First ACM+IEEE Joint Conference on Digital Libraries (JCDL'01), Jun. 24-28, 2001, 10 pages, Roanoke, VA, available at http://www.informedia.cs.cmu.edu/documents/dl2001paper.pdf.

Martin, Steve, "Final Cut Express System Requirements, OS 10.2 or Higher," Jan. 13, 2003, Ripple Training.

Long, A. Chris, et al., "Video Editing Using Lenses and Semantic Zooming", Human Computer Interaction Institute, Carnegie Mellon University, Month Unknown, 2009, pp. 1-9, Pittsburgh, PA.

Kutics, Andrea, et al., "Use of Adaptive Still Image Descriptors for Annotation of Video Frames", Lecture Notes in Computer Science, Month Unknown, 2007, pp. 686-697, vol. 4633, Springer-Verlaq, Berlin, Heidelberg.

Hwang, Hark-Chin, Soo Y. Chang, and Kangbok Lee. "Parallel machine scheduling under a grade of service provision." Computers & Operations Research 31, No. 12 (2004): 2055-2061.

Docuceur, et al. (Docuceur, J., Elson, J., Howell, J., and Lorch, J., "The Utility Coprocessor: Massively parallel computations from the coffee shop", in USENIX ATC (2010)).

Diakopoulos, Nicholas, et al., "Videotater: An Approach for Pen-Based Digital Video Segmentation and Tagging", UIST'06, Oct. 15-18, 2006, 4 pages, Montreux, Switzerland, available at http://www.deakondesiqn.com/Documents/tn151-diakopoulos.pdf.

Chisan, James, et al., "Video Bench—Final Report: SEng 480a/CSc 586a," Apr. 11, 2003, pp. 1-43, University of Victoria, Canada.

Casares, Juan, et al., "Simplifying Video Editing Using Metadata", Processing of Designing Interactive Systems (DIS 2002), Jun. 2002, 10 pages, London, UK, available at http://www.informedia.cs.cmu.edu/documents/silver-dis02-draft.pdf.

Brenneis, Lisa, "Final Cut Pro 3 for Macintosh: Visual QuickPro Guide," Apr. 2002, Peachpit Press, Berkeley, California, USA.

Bolante, Anthony, "Premiere Pro CS3 for Windows and Macintosh: Visual QuickPro Guide", Dec. 4, 2007, 2 pages, Peachpit Press, USA.

Avid Media Composer Editing Guide, Avid, 75 Network Drive, Burlington, MA 01803-2756, USA Jun. 2010, pp. 30-32, 649-713.

Author Unknown, Apple Support Communities Discussions, "How to Change DV/DVCPRO video to 16:9 widescreen aspect ratio in Final Cut Pro X?", Jul. 2011; (https://discussions.apple.com/thread/3155532?start=0&tstart=0).

Author Unknown, "Using Adobe Premiere Pro CS4", Apr. 24, 2009, 499 pages, Adobe Systems Incorporated, San Jose, California, USA.

Author Unknown, "Using Adobe Premiere Elements 8 Editor," last updated Aug. 12, 2010, 313 pages, Adobe Systems Incorporated, San Jose, California, USA.

Author Unknown, "Using Adobe Flash CS4 Professional," Updated Mar. 5, 2009, 474 pages, Adobe Systems Incorporated, San Jose, California, USA.

Author Unknown, "iMovie '08 Getting Started," Month Unknown, 2008, pp. 1-50, Apple Inc., Usa.

Author Unknown, "Frame-specific editing with snap—Premiere Pro CS4 Classroom in a Book," Dec. 17, 2008, 17 pages, Adobe Press, USA.

Author Unknown, "Apple Announces Final Cut Pro 4," NAB, Apr. 6, 2003, Apple Inc., Las Vegas, Nevada, USA.

Author Unknown, "Adobe Premiere Pro CS4 Classroom in a Book", Dec. 17, 2008, 11 pages, Adobe Press, USA.

Author Unknown, "Adobe Premiere Pro CS3: User Guide," Apr. 1, 2008, 455 pages, Adobe Systems Incorporated, San Jose, California, USA.

Author Unknown, "Adobe Premiere Pro CS3: Classroom in a Book", Month Unknown, 2008, 27 pages, Chapters 9 and 10, Adobe Systems Incorporated, San Jose, California, USA.

(56) References Cited

OTHER PUBLICATIONS

Author Unknown, "Adobe Premiere Elements 7: Arranging clips in the Sceneline," Dec. 11, 2008, 3 pages, http://help.adobe.com/en_US/PremiereElements/7.0/WSB04491 A8-859D-41e7-975F-0E26B9AECB9B.html.

Author Unknown, "Adobe Director 11: User Guide," Month Unknown, 2008, 498 pages, Adobe Systems Incorporated, San Jose, California, USA.

* cited by examiner

MEDIA-EDITING APPLICATION WITH NOVEL EDITING TOOLS

INCORPORATION BY REFERENCE; DISCLAIMER

Each of the following applications are hereby incorporated by reference: application Ser. No. 13/151,177 filed on Jun. 1, 2011; application Ser. No. 13/151,175 filed Jun. 1, 2011; application Ser. No. 13/154,361 filed Jun. 6, 2011; application No. 61/443,702 filed Feb. 16, 2011; application No. 61/443,704 filed Feb. 16, 2011; application No. 61/443,707 filed Feb. 16, 2011; application No. 61/443,692 filed Feb. 16, 2011; and application No. 61/364,797 filed Jul. 15, 2010. The Applicant hereby rescinds any disclaimer of claim scope in the parent application(s) or the prosecution history thereof and advises the USPTO that the claims in this application may be broader than any claim in the parent application(s).

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro ® and iMovie ®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media editing application. In so doing, the computer generates a graphical interface whereby designers digitally manipulate graphical representations of the media content to produce a desired result. However, in many cases, the designers experience inconvenience in manipulating graphical representations of the media content because of the shortcomings of the existing applications. Also, it is often not possible to view the desired result until the designers finish manipulating the graphical representation.

BRIEF SUMMARY

Some embodiments of the invention provide a media-editing application for creating and editing a media presentation that displays the results of edits as the edits are being made to the media presentation. The media-editing application displays the movement of media clips of the media presentation as the media clips are being moved within the media-editing application to change the media presentation. In some embodiments, the media-editing application is an application that enables a user to create a composite media presentation from a set of media clips. Through a graphical user interface (GUI) of the application, the user specifies the manner in which the media clips are composited to create the composite presentation.

The media application of some embodiments includes a timeline, which is a composite display area for displaying media clips that are part of the composite media presentation. Specifically, the timeline in some embodiments displays one or more geometric shapes that represent one or more media clips that are part of the composite presentation. The timeline of some embodiments includes a primary lane (also called "spine") as well as one or more secondary lanes (also called "anchor lanes"). The spine represents a primary sequence of media, which, in some embodiments, does not have any gaps. When a clip is deleted or removed from the timeline, the media-editing applications automatically closes the gap created in place of the clip. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The media editing application of some embodiments also includes a clip browser, which displays media clips that can be brought into the timeline to be part of the media presentation. The media editing application also includes a preview display area that displays frames of media clips in the clip browser or in the timeline.

The media-editing application of some embodiments allows the user to edit the media presentation by moving a media clip from one location to another location within a timeline or from an area out of the timeline into the timeline. For instance, the user can drag a media clip from a media browser into the spine or into an anchor lane to anchor the media clip to another media clip in the spine. The media-editing application displays during this drag operation the results of the operation. For instance, when a first media clip is dragged into the second media clips in the spine and collides with the second media clips, the media editing application moves the second media clips along the spine to make a room in the spine for the first media clip. When the first media clip is dragged into an anchored media clip that is in an anchor lane, the media editing application moves the anchored media clip into another anchor lane that may be above or below the anchor lane that the anchored media clip currently locates. The up or down movement of the anchored clips can be viewed as dynamic creation of anchor lanes. Some embodiments displays the movement of these media clips as they are being moved.

Some embodiments allow the user of the media-editing application to insert a media clip between two adjacent media clips within the timeline. The two adjacent media clips may be anchored clips or clips in the central compositing lane. Different embodiments provide different ways to insert a media clip between the two adjacent media clips. Some embodiments allow the user to drag a media clip from the clip browser or another media clip in the timeline into the border between the two media clips. The media-editing application of some embodiments allow to add a selected media clip from the clip browser between the two media clips as a playhead is passing close to the border between the two media clips. The two media clips move away from each other to create a space for the clip being inserted between the two clips. Some embodiments display the movement of the two clips as the two clips move to create the space.

Some embodiments shift the media clips (i.e., ripple the media clips in the timeline) away from a particular point along the timeline between the two media clips as a media clip is being inserted to the point. In other embodiments, the media-editing application does not ripple the media clips in the timeline when a media clip is dragged into the particular point in the timeline. These embodiments overwrite any clips or portions of clips with the clip being added for the duration of the clip being added starting at the particular point along the timeline.

Some embodiments allow a user of the media-editing application to append a first media clip to a second media clip in the timeline. The second media may be an anchored clip or a clip in the central compositing lane. Different embodiments provide different ways to append a media clip after another media clip. Some embodiments allow the user to drag a media clip from the clip browser or another media clip in the timeline to a right-edge of another media clip which does not have a media clip appended to the right edge. The media-editing application of some embodiments allow to append a selected media clip from the clip browser to the right edge of another media clip as a playhead is passing close to the right edge. Yet other embodiments allow the user to append a selected media clip from the clip browser after the last media clip in the central compositing lane by invoking a hot key command.

The media-editing application in some embodiments allows a user to delete a portion of the sequence of media clips in the timeline. In some embodiments, the user may select a full clip or multiple clips. Some embodiments allow the user to select a range that spans several clips. The media-editing application of some embodiments may also allow the user to select clips in the anchor lanes (rather than just the clips in the central compositing lane). Some embodiments move the media clips that were adjacent to the deleted media clip or range in order to close the gap created by the deleted media clip or range. Some embodiments displays the movement of the adjacent clips as they are moving to close the gap.

Some embodiments allow the user to anchor a media clip to another media clip in the timeline by selecting a single media clip or a range of media clip(s) from the clip browser and drag it above or below a media clip in the timeline. As described above, the media-editing application anchors a media clip only to a media clip in the central compositing lane. In other embodiments, the media clip to which another media clip is anchored may be any clip displayed in any lanes in the timeline. That is, the media-editing application of these embodiments allows the user to anchor a media clip to a media clip that is in the central compositing lane or to a media clip that is anchored to another media clip.

In some embodiments, the media-editing application allows the user to add an anchored clip into the central compositing lane. Some embodiments allow it by inserting an anchored clip between two adjacent clips or appending the anchored clip after the last media clip displayed in the central compositing lane. Also, some embodiments allow the user to replace a media clip or a selected range over one or more media clips in the central compositing lane with an anchored clip.

In some embodiments, an anchored media clip is represented as a rectangular shape. Each anchored media clip also has an anchor, which is represented as a pointer attached to the rectangular shape that connects the rectangular shape and a media clip displayed in the central compositing lane of a timeline. When a first media clip is anchored to a second media clip that is displayed in the central compositing lane, the anchor of the first media clip points to a position along the length of the second media clip. In some embodiments, the media-editing application displays a frame of the media clip represented by that position in the preview display area, when the first media clip is selected.

Some embodiments allow the user of the application to select two or more clips in different anchor lanes of the timeline to move together. This allows preserving the timing information between the selected anchored clips when the clips are placed in different positions along the timeline. Some embodiments allow the user to create duplicate copies of one or more media clips displayed in the timeline and place the duplicate copies of the clips in another location within the timeline. The media-editing application preserves relative timing information between two or more anchored media clips when the duplicate copies of them are placed in another location within the timeline.

In some embodiments, the media-editing application snaps a first media clip to a second media clip when the user drags (e.g., by a cursor operation) the first media clip close to the second media clip from either side of the second media clip. For instance, when the user moves the first media clip from the right side of the second media clip, the media-editing application snaps the left edge of the first media clip to the right edge of the second media clip. Conversely, when the user moves the first media clip from the left side of the second media clip, the media-editing application snaps the right edge of the first media clip to the left edge of the media clip. The media-editing application applies this snapping feature to any types of clips in any lanes (central compositing lanes, anchor lanes, etc.) that may be displayed in the timeline.

As will be described further below, some embodiments may move away the second clip to make room for the first media clip. Also, some embodiments may temporarily superimpose the second clip to prompt for replacement options. Therefore, the media-editing application of some embodiments uses a set of criteria to determine which moving operation to perform. The set of criteria may include the velocity of the first media clip at which the second media clip is moving to the, types of clips the first and second clips are, the direction in which the first media clip is approaching the second media clip, the origin (e.g., a clip browser, a timeline, etc.) from which the first media clip is moving, etc.

As described above, an anchored clip's media content is composited with (e.g., overlay, superimpose, mix, etc.) the media content of the media clip in a compositing lane. When there are multiple anchored clips at a position along the timeline, the media content of an anchored clip in an upper anchor lane takes the priority over the media content of a media clip in a lower lane in some embodiments. By allowing vertical swapping, the media-editing application provides a simple way of changing priorities of the anchored clips.

In addition to dynamically displaying different edits to the timeline, the media editing application in some embodiments can dynamically display the results of such edits in the preview display area. That is, the media editing application in these embodiments has a preview generator that can display previews of the media presentation on the fly as media clips are being dragged into and within the timeline. This allows the user of the media-editing application to see and hear the results of the operation while performing them. For instance, as a playhead moves along the timeline (i.e., as the media-editing application playbacks the media presentation), the media-editing application displays a composite frame of the media presentation represented by a point along the timeline at which the playhead is positioned currently. When any part of a media clip occupies a point along the timeline at the moment the playhead is passing the point, the media-editing application will factor that media clip into the composite image displayed for that point.

Some embodiments provide a media-editing application with novel editing tools. The media editing application provides an in-line precision editor. That is, the media-editing application opens the precision editor directly in the timeline. For instance, in some embodiments, the selection of an edge between two clips breaks the spine into two tracks, a top track and a bottom track. The top track is then used to perform edits to the left side of the selected edge, while the bottom track is used to perform precision edits to the right side of the selected edge. In some embodiments, the top track shows the additional media content available for the clip that is on the left side of the edge to include. The bottom track shows the additional media content available for the clip on that is the right side of the edge to include. The additional media content is in the source media file, of which a clip represents a portion. In some embodiments, while the precision editor is opened, the media-editing application displays anchor lanes when any anchored clip exists and allows the user to edit any anchored clips in the displayed anchored lanes.

A media clip in some embodiments includes different types of media content. For instance, an audio and video clip has both video and audio content. In some such embodiments, a media clip includes different "tracks" for each type of media content. For instance, an audio content of an audio clip may include several tracks for several audio channels. Likewise, a video content of a video clip may include several tracks for, e.g., a foreground video and a background video.

The media-editing application of some embodiments provides another multi-tracked editing tool. This multi-track editing tool is also an in-line tool. That is, the media-editing application opens this multi-tracked editing tool within the timeline as a new "page" in some embodiments. In some embodiments, the media-editing application displays only the inside of a selected media clip of which to edit the tracks. No other media clips of the media presentation will be displayed when the selected media clip is opened as a new page for multi-track editing. This multi-tracked editing tool opens different tracks contained in a media clip in different lanes to allow the user to edit individual tracks of the media clip independently. In some embodiments, the multi-tracked editing tool opens different tracks of a media clip in a central compositing lane and a set of anchor lanes. Each lane will include a track of a media clip in these embodiments. In some embodiments, the media-editing application does not display in the tool any other media clips that were displayed in the timeline before the tool was opened.

A transition effect is an effect used to impact the transition from one media clip of a media presentation to the next media clip. There are many types of transition effects. A common type of transition effect is a fade-out effect where the content of the outgoing media clip (i.e., the first clip of the two consecutive clips) gradually fades out as the content of the incoming media clip (i.e., the second clip of the two clips) gradually fades in. To apply a transition effect between two adjacent media clips, both media clips must have additional media content that overlap past the edit point in some embodiments. That is, the incoming media clip has to have media content before its in-point and the outgoing media clip has to have media content beyond its out-point. The media-editing application uses these additional media contents to show the transitional effect instead of an abrupt cut between the two media clips. In the case of a fade-out, the additional media content of the incoming media clip starts to fade in before the clip's in-point (i.e., before the outgoing clip's out-point). Likewise, the additional media content of the outgoing media clip keeps fading out beyond the clip's out-point (i.e., beyond the incoming clip's in-point).

The media-editing application of some embodiments displays in the timeline a transition as a rectangle between two media clips. In some embodiments, the media-editing application allows the user of the media-editing application to adjust the transition by manipulating the rectangle. For instance, the media-editing application allows the user to grab either side edges of the rectangle to adjust the points in time at which the incoming media clip starts to fade in or the outgoing media clip finishes fading out. The media-editing application may also allow the user to perform a rolling edit (i.e., adjusting the in-point of the incoming clip and the out-point of the outgoing media clip at the same time) by grabbing and dragging a middle portion of the rectangle.

When a transition is applied between two consecutive media clips of the media presentation, the media-editing application in some embodiments covers portions of the two media clips with the rectangle such that the covered portions are not visible in the timeline. In some such embodiments, the media-editing application displays the rectangle transparently such that each of the two media clips to which the transition effect is applied is visible. That is, the portions of the two media clips that are overlaid with the transition tool are visible because the transition tool is transparent.

As described above, a media clip in some embodiments contains one or more types of media content (e.g., audio, video, text, image, etc.). When a transition is applied between two adjacent media clips in the timeline of some embodiments, the media-editing application allows the user to adjust the transition such that the adjustment affects all types of media content that the two media clips have. For instance, the media-editing application allows the user to drag the right side edge of a transition to adjust the point in time at which both the audio and video content of the outgoing media clip finish fading out. In some such embodiments, the media-editing application also allows the user to adjust different types of media contents separately. For instance, the media-editing application allows the user to adjust the audio contents of the two media clips without affecting the video contents of the two clips by manipulating only the audio portions of the two media clips in the timeline. Also, the media-editing application allows the user to adjust the video transition independently from the audio transition. For instance, the media-editing application allows for moving the video portion of the transition along the timeline independently from the audio portion of the transition. Furthermore, the media-editing application allows the user to adjust one or more types of media contents at the same time and without affecting other contents of the media clips.

When a media clip in the timeline of some embodiments is trimmed from its beginning (i.e., when the media clip's in-point is pulled in), the media-editing application moves the media clips that come after the media clip being trimmed to the left while leaving the media clips that come before the media clip being trimmed static. This results in an impression to the user that the media clip that is being trimmed is trimmed from its ending. That is, this gives an impression that the out-point of the media clip (i.e., the right edge of the clip) that is being trimmed is pulled in (to the left). To avoid causing such impression, some embodiments of the media application moves to the right the media clips that come before the media clip being trimmed from its beginning. That is, when a media clip is trimmed on the beginning side of the media clip, media clips that come before the media clip being trimmed moves in the direction of trimming.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
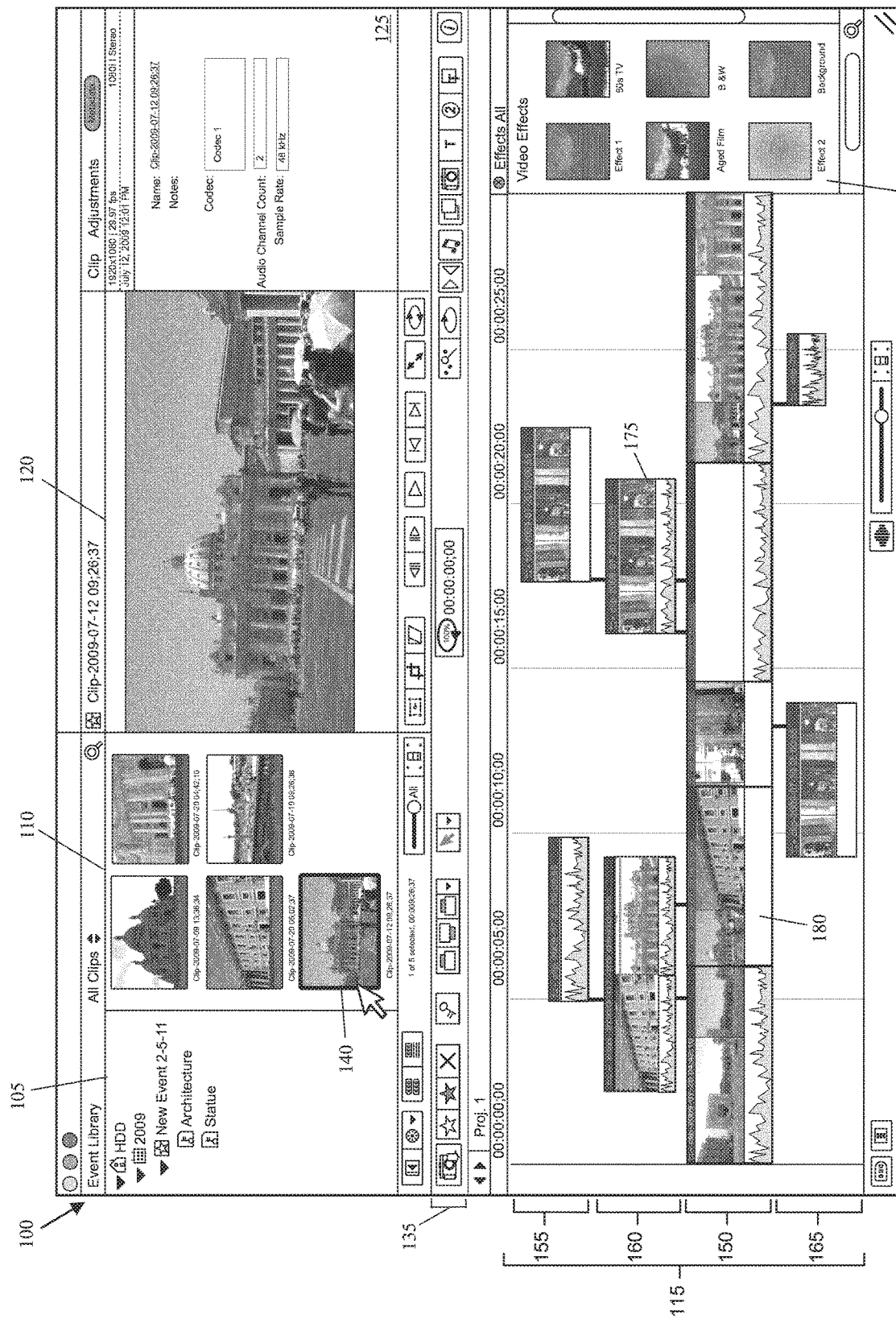
FIG. 1 illustrates a graphical user interface (GUI) of a media-editing application of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media-editing application that creates a composite media presentation, some embodiments of the invention provide a novel compositing display area in which several media clips can be arranged for compositing. This novel compositing display area will be referred to as a "timeline" throughout this application unless specified otherwise. This timeline of some embodiments is capable of performing numerous novel features, some of which will be described in detail further below.

A media clip in some embodiments is a piece of media content. Examples of types of media content include audio data, video data, audio and video data, text data, image/picture data, and/or other media data. In some embodiments, a media clip can be a video clip or an audio clip. In other embodiments, a media clip can be a video clip, an audio clip, an audio and video clip, a sequence of media clips (also referred to as a media clip sequence), a text clip, a text overlay, a still image or picture, or any other type of media clip that can be used to create a composite presentation. In this application, a media clip may also refer to the graphical representation of the media clip in the GUI of a media-editing application of some embodiments.

A media clip that has a temporal component (e.g., audio media clips, video media clips, audio and video media clips, etc.) is further defined by an in-point and an out-point with respect to a source media file in some embodiments. In some such embodiments, the source media file is stored on the computing device on which the media-editing application executes or on a computing device to which the media-editing application has access. A media clip's in- and out-points define its start and end points with respect to the source media file.

The in- and out-points of a media clip can be defined as such to cover an entire source media file or a portion of the source media file in some embodiments. Several media clips can define different in- and out-points with respect to the same source media file such that each media clip has a different media content. For instance, the in- and out-points of a media clip can be defined to be the first half of a source media file while the in and out points of another media clip can be defined to be the second half of the same source media file.

In some embodiments, a media clip can serve as another media clip's source. For instance, the media-editing application allows the user to select a range (i.e., a length along the length of a graphical representation of a media clip that corresponds to a duration within the media clip) and use the selected range like a media clip.

Several detailed embodiments of the invention are described in the sections below. Section I describes various features of the spine-based timeline in some embodiments. Section II describes various edit operations that the media-editing application performs on the media clips displayed in the spine based timeline. Section III describes displaying a preview of a media presentation as the presentation is being edited. Section IV then describes several editing tools that the media-editing application provides. Next, section V describes data structures of media clips used by some embodiments. Section VI describes the software architecture of a media-editing application of some embodiments. Finally, Section VII describes an electronic system that implements some embodiments of the invention.

I. Timeline

A. Introduction

FIG. 1 illustrates a graphical user interface (GUI) 100 of a media-editing application of some embodiments. One of ordinary skill will recognize that the graphical user interface 100 is only one of many possible GUIs for such a media-editing application. In fact, the GUI 100 includes several display areas which may be adjusted in size, opened or closed, replaced with other display areas, etc. The GUI 100 includes a clip library 105, a clip browser 110, a timeline 115, a preview display area 120, an inspector display area 125, an additional media display area 130, and a toolbar 135.

The clip library 105 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 105 includes media clips from both 2009 and 2011.

Within a storage device and/or date, users may group the media clips into "events", or organized folders of media clips. For instance, a user might give the events descriptive names that indicate what media is stored in the event (e.g., the "New Event 2-8-09" event shown in clip library 105 might be renamed "European Vacation" as a descriptor of the content). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the "New Event 2-8-09" event, all media clips showing children might be tagged by the user with a "kids" keyword, and then these particular media clips could be displayed in a sub-folder of the event that filters clips in this event to only display media clips tagged with the "kids" keyword.

The clip browser 110 allows the user to view clips from a selected folder (e.g., an event, a sub-folder, etc.) of the clip library 105. As shown in this example, the folder "New Event 2-8-11 3" is selected in the clip library 105, and the clips belonging to that folder are displayed in the clip browser 110. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well. There are several types of clips. An audio and video clip is a clip that contains both audio and video content. An audio clip is a clip that contains only audio content. A video clip is a clip that contains only video content.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 115 provides a visual representation of a composite presentation (or project) being created by the user of the media-editing application. Specifically, it displays one or more geometric shapes that represent one or more media clips that are part of the composite presentation. The timeline 115 of some embodiments includes a primary lane (also called a "spine", "primary compositing lane", or "central compositing lane") as well as one or more secondary lanes (also called "anchor lanes") above and/or below the primary lane. The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

Clips placed in the anchor lanes are referred to as "anchored clips." As an example, FIG. 1 shows a media clip 175 that is anchored off of another media clip 180 in the timeline 115. In some of these embodiments, media clips can be placed in these anchor lanes to anchor off of media clips in the central compositing lane 150. Instead of, or in conjunction with, having several levels of media clips that anchor off the central compositing lane 150, some embodiments allow media clips to be placed in these anchor lanes and to be anchored off of other anchored media clips placed in these anchor lanes. To help the user distinguish the central compositing lane 150 and the anchored lanes in the timeline 115, some embodiments use different tones for these lanes. For instance, the timeline 115 uses a darker tone for the central compositing lane 150 than the tone for the anchored lanes 155, 160, and 165.

As shown, the timeline 115 can place different types of media clips in the same lane (a central compositing lane or an anchored lane). Also, the timeline 115 can place different types of media clips in the anchor lanes above and below the central compositing lane. In other words, the timeline 115 can place a media clip of any type (e.g., audio clip, video clip, audio and video clip, etc.) in any lane of the timeline 115.

Also, when there are multiple anchored clips at a position along the timeline 115, the media content of an anchored clip in an upper anchor lane takes the priority over the media content of a media clip in a lower lane in some embodiments. For instance, the video content of the media clip in the uppermost anchor lane will be the content of the presentation for the period time along the timeline that the media clip spans.

As with the clips in the clip browser, the user can skim through the timeline or play back the timeline (either a portion of the timeline or the entire timeline). In some embodiments, the playback (or skimming) is not shown in the timeline clips, but rather in the preview display area 120.

The preview display area 120 (also referred to as a "viewer") displays images from media files that the user is skimming through, playing back, or editing. These images may be from a composite presentation in the timeline 115 or from a media clip in the clip browser 110. In this example, the user has been skimming through the beginning of clip 140, and therefore an image from the start of this media file is displayed in the preview display area 120. As shown, some embodiments will display the images as large as possible within the display area while maintaining the aspect ratio of the image.

The inspector display area 125 displays detailed properties about a selected item and allows a user to modify some or all of these properties. The selected item might be a clip, a composite presentation, an effect, etc. In this case, the clip that is shown in the preview display area 120 is also selected, and thus the inspector displays information about media clip 140. This information includes duration, file format, file location, frame rate, date created, audio information, etc. about the selected media clip. In some embodiments, different information is displayed depending on the type of item selected.

The additional media display area 130 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 130 is currently displaying a set of effects for the user to apply to a clip. In this example, only two effects are shown in the display area (the keyer effect and the luma keyer effect, because the user has typed the word "keyer" into a search box for the effects display area).

The toolbar 135 includes various selectable items for editing, modifying what is displayed in one or more display areas, etc. The right side of the toolbar includes various selectable items for modifying what type of media is displayed in the additional media display area 130. The illustrated toolbar 135 includes items for video effects, visual transitions between media clips, photos, titles, generators and backgrounds, etc. In addition, the toolbar 135 includes an inspector selectable item that causes the display of the inspector display area 125 as well as items for applying a retiming operation to a portion of the timeline, adjusting color, trimming, anchoring, creating position clips, and other functions.

The left side of the toolbar 135 includes selectable items for media management and editing. Selectable items are provided for adding clips from the clip browser 110 to the timeline 115. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One or ordinary skill will also recognize that the set of display areas shown in the GUI 100 is one of many possible configurations for the GUI of some embodiments. For instance, in some embodiments, the presence or absence of many of the display areas can be toggled through the GUI (e.g., the inspector display area 125, additional media display area 130, and clip library 105). In addition, some embodiments allow the user to modify the size of the various display areas within the UI. For instance, when the display area 130 is removed, the timeline 115 can increase in size to include that area. Similarly, the preview display area 120 increases in size when the inspector display area 125 is removed.

B. Volume Control

Figure 2:
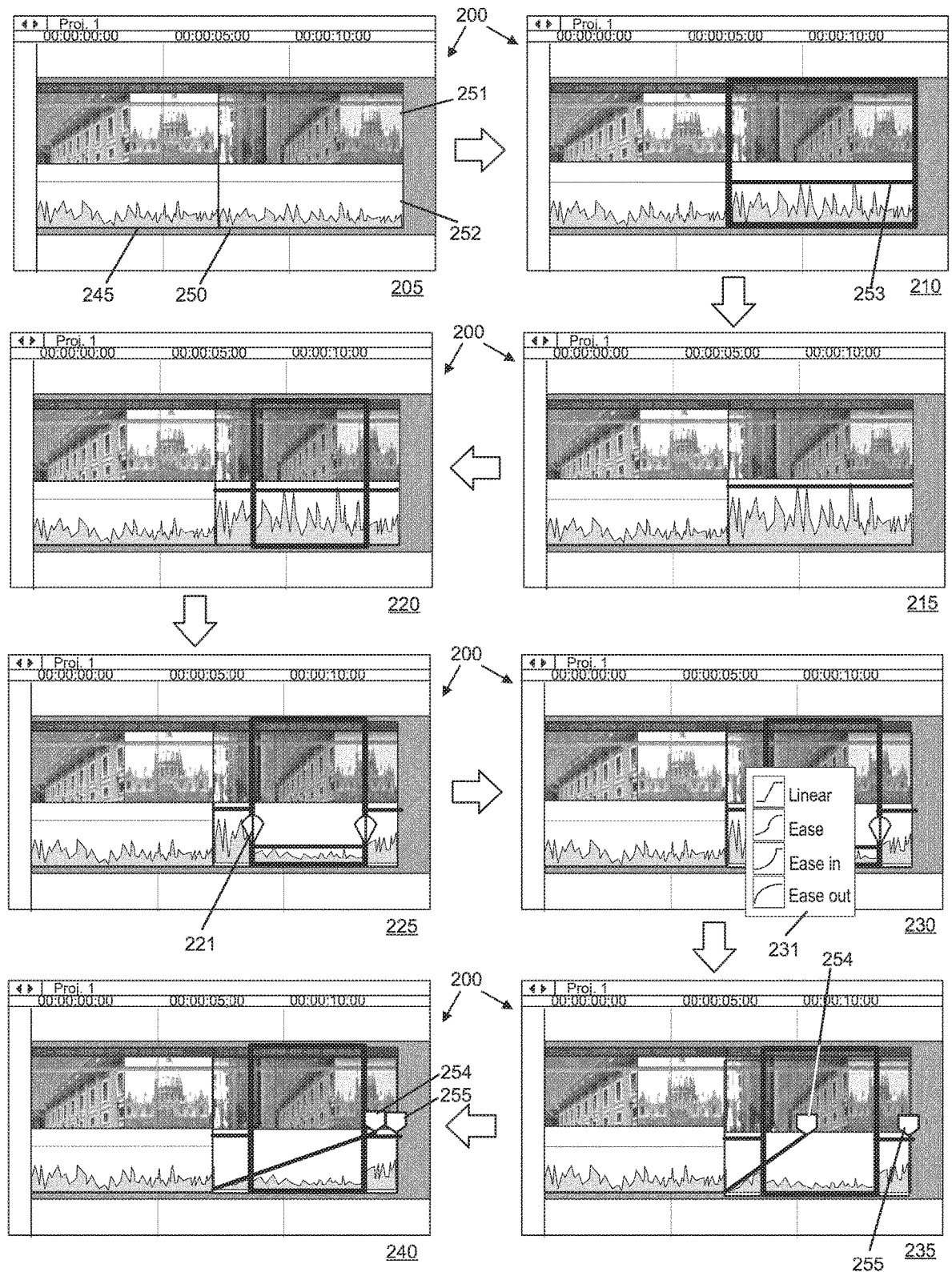
FIG. 2 illustrates an example of modifying the audio content of a media clip that includes both audio and video contents in a timeline of a media-editing application.

FIG. 2 illustrates an example of modifying the audio content of a media clip that includes both audio and video contents in a timeline of a media-editing application. Specifically, this figure illustrates a timeline 200 in eight different stages 205-240 to show changing volume level of the audio of a media clip 250 displayed in the timeline 200. FIG. 2 illustrates a media clip 245 and the media clip 250 displayed in the timeline 200. The timeline 200 is similar to the timeline 115 described above by reference to FIG. 1.

The media-editing application of some embodiments provides a volume control for a user of the application to control the volume of a media clip displayed in the timeline 200. The audio portion of a media clip displayed in the timeline 200 includes a volume control. The volume control in some embodiments appears as a horizontal line across the waveform in the audio portion as shown in the stage 215 of this figure. As the user drags the line upwards or downwards, the media-editing application changes the volume of the audio content of the media clip.

The media-editing application also allows the user to select a range of media clips displayed in the timeline 200 such that the user can selectively control the volume of the selected range. The audio portion in some embodiments includes fade handles 221 and 222, which appear near both ends of the waveform in the selected range as shown in the stage 225 of this figure. The user can control fading of the audio content by dragging the handles along the volume control line.

In some embodiments, the media-editing application provides a set of volume patterns for the user to select. By choosing a pattern and dragging volume control knobs 254 and 255 (shown in the stages 235 and 240), the user can apply the selected volume pattern to the audio content of the media clip. The volume control knob also moves along the volume level control line. Using the volume control knob 254, the user can apply a selected pattern from the beginning of a clip. The volume control knob 255 allows the user to apply a selected pattern from the end of a clip.

In the first stage 205, the timeline 200 displays a media clip 250, which includes both audio and media contents. Accordingly, the media clip 250 includes an audio portion 252 and a video portion 251 in its representation in the timeline 200. In the second stage 210, the timeline 200 highlights a volume control line 253 when the user selects the line 253 by a click operation.

In the third stage 215 the user drags the volume control line 253 upwards in order to increase the volume of the audio content of the media clip 250. In the fourth stage 220, the user selects (e.g., by a click operation) a range of the media clip 250. In the fifth stage 225, the user brings down a portion of the volume control line 253 that falls within the selected portion. As a result, the volume is leveled down for the duration of the media clip represented by the selected portion.

In the sixth stage 230, the timeline 200 displays a menu 231 for volume patterns when the user selects a volume control knob (behind the menu 231) by a click operation. The user can then select a volume pattern from the menu 231. In this example, the user selects "Linear." In the seventh stage 235, the timeline 200 applies the selected volume pattern as the user drags the control knob 254 to the right. In the eighth stage 240, the timeline 200 shows the selected pattern more apparently as the user drags the control knob 254 to the right end of the media clip 250.

C. Multiple Playheads

Figure 3:
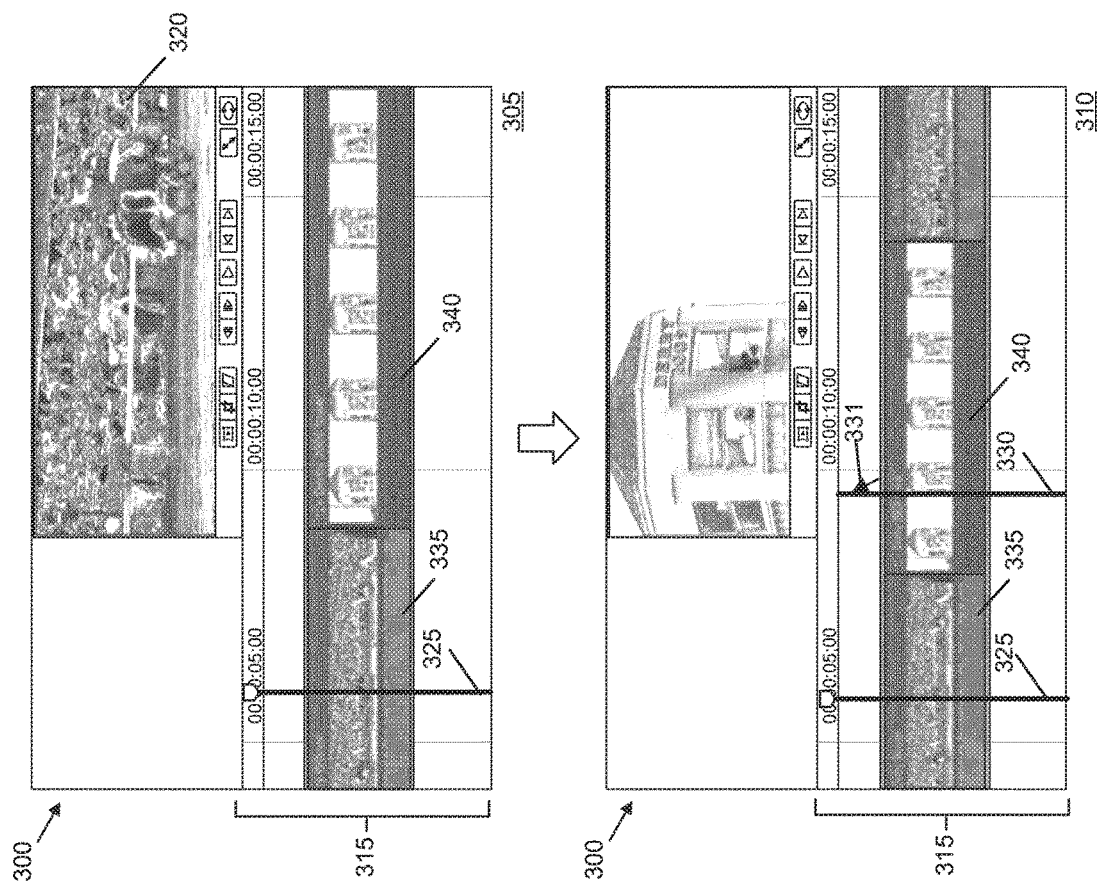
FIG. 3 illustrates a timeline of a media-editing application having two playheads.

FIG. 3 illustrates a timeline of a media-editing application having two playheads. Specifically, this figure illustrates a GUI 300 in two different stages 305 and 310 to show that a timeline 315 includes two playheads for editing and playing back a media presentation. The GUI 300 includes the timeline 315 and a viewer 320. The timeline 315 and the viewer 320 are similar to the timeline 115 and the viewer 120 described above by reference to FIG. 1.

The timeline 315 of some embodiments provides two playheads, a skimming playhead 330 and a primary playhead 325. A playhead in some embodiments appears as a vertical line in the timeline 315. A video frame of the media presentation that the playhead is positioned at is displayed in the viewer 320. A portion of audio content that corresponds to the frame will also be output to an audio output device by the media-editing application. The skimming playhead 330 is a playhead that matches the position of the cursor in the timeline 315. The primary playhead 325 is a static playhead that scrolls across the timeline 315 during playback or can be selected and moved across the timeline by the user of the media-editing application. The primary playhead specifies a current editing position in the timeline 315, while the skimming playhead specifies a skimming position in the time 315.

When the cursor (not shown) enters the timeline 315, the skimming playhead appears and becomes the editing position, since it is the point of focus. It will override the primary playhead 325 when it is present in the timeline 315. When the cursor leaves the timeline and enters another portion of the GUI 300, the primary playhead 325 is the current editing position. The primary playhead 325 allows the user to leave the timeline without losing the video frame of interest. As will be described further below, the primary playhead 325 also allows the user to use hotkey edits to add, remove or modify the content of the media presentation at the position of the primary playhead. Also, when the media presentation is previewed (i.e., when the media presentation is played back instead of being skimmed), the two playheads synch up and move together horizontally along the timeline 315 in some embodiments. Also, in some embodiments, different colors are used to represent the different playheads. For instance, a red color is used for the skimming playhead 330 and a gray color is used for the primary playhead 325 in some such embodiments.

In the first stage 305, the primary playhead 325 is placed at a position of the timeline 315 so that the playhead intersects with the media clip 335. In some embodiments, each point along the length of a media clip represents a video frame of the media clip. As shown, the media-editing application displays in the viewer 320 a frame of the media clip 335 represented by a point along the timeline 315 at which the primary playhead 325 is positioned currently.

In the second stage 310, the skimming playhead 330 appears as a cursor 331 enters into the timeline 315. The skimming playhead 330 is placed at a position of the timeline 315 such that the playhead intersects with the media clip 340. As shown, the media-editing application displays in the viewer 320 a frame of the media clip 340 represented by a point along the timeline 315 at which the skimming playhead 330 is positioned currently in some embodiments. When the cursor leaves the timeline 315, the skimming played 330 will disappear from the timeline 315 and the viewer 320 will display the video frame that it displayed in the first stage 305 because the primary playhead 325 has not been moved to another position in the timeline 315.

II. Live Drag

A. Inserting a Media Clip

Figure 4:
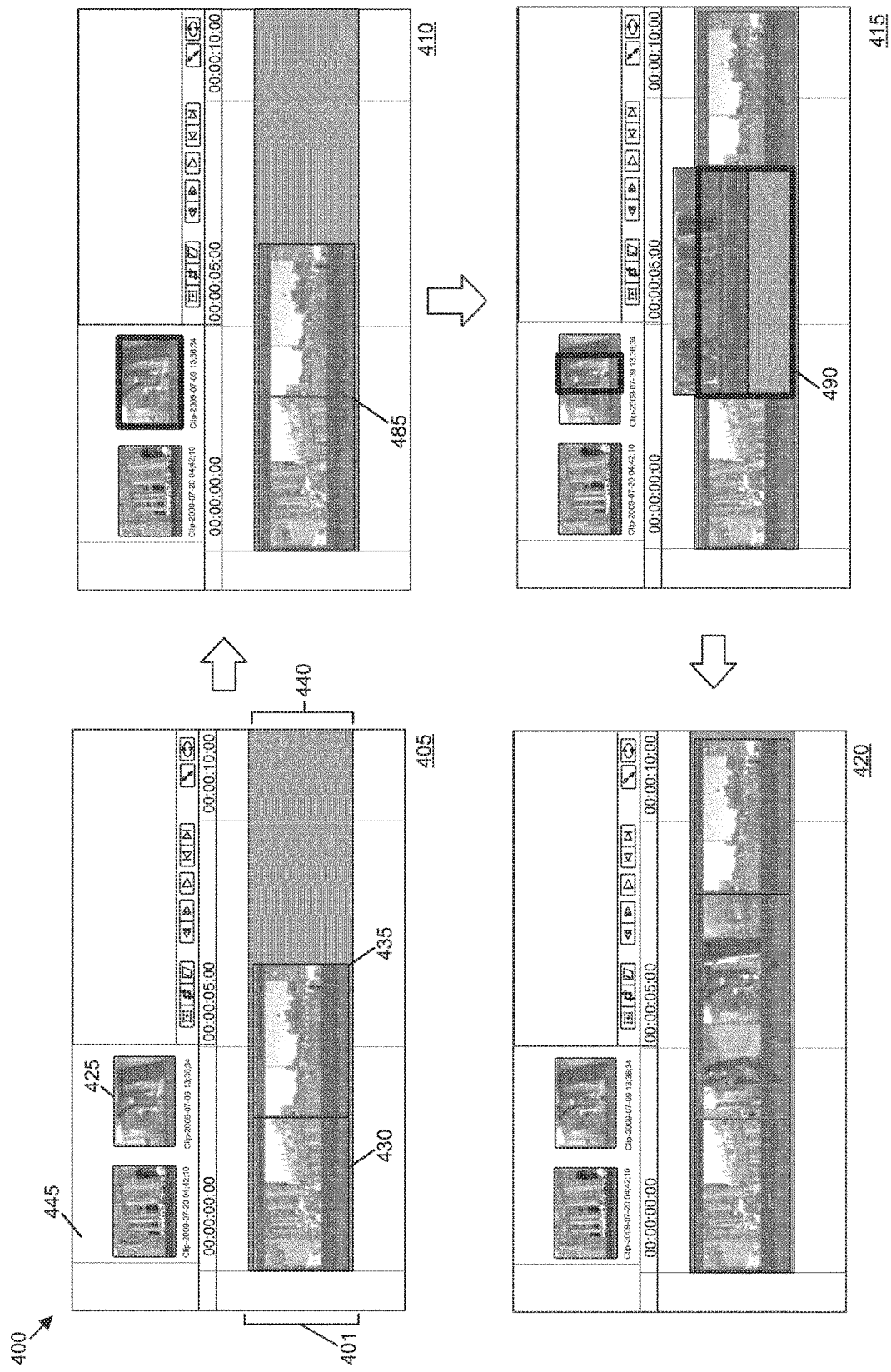
FIG. 4 illustrates an example of inserting a media clip between two adjacent media clips in a timeline of a media-editing application.

FIG. 4 illustrates an example of inserting a media clip between two adjacent media clips in a timeline 401 of a media-editing application. Specifically, this figure illustrates a GUI 400 in four different stages 405-420 that the media-editing application allows the user to add a media clip 425 to the timeline 401 by inserting it between two media clips 430 and 435 displayed the timeline 401. The GUI 400 is similar to the GUI 100 described above by reference to FIG. 1 in that the GUI 400 includes a clip browser 445 and the timeline 401 which are similar to the clip browser 110 and the timeline 115, respectively. The timeline 401 includes a central compositing lane 440.

Some embodiments allow a user of the media-editing application to insert a media clip between two adjacent media clips within the timeline 401. The two adjacent media clips may be anchored clips or clips in the central compositing lane 440. Different embodiments provide different ways to insert a media clip between the two adjacent media clips. Some embodiments allow the user to drag a media clip from the clip browser 445 or another media clip in the timeline 401 into the border between the two media clips. The media-editing application of some embodiments allow to add a selected media clip from the clip browser 445 between the two media clips as a playhead is passing close to the border between the two media clips.

Some embodiments shift the media clips (i.e., ripple the media clips in the timeline) away from a particular point along the timeline 401 between the two media clips as a media clip is being inserted to the point. In other embodiments, the media-editing application does not ripple the media clips in the timeline when a media clip is dragged into the particular point in the timeline. These embodiments overwrite any clips or portions of clips with the clip being added for the duration of the clip being added starting at the particular point along the timeline.

As shown, the created space for the media clip 425 is indicated by the highlighted boundary 490 in this example. In some embodiments, the media-editing application performs this movement in an animated motion, thereby creating an animated effect of the sliding of the clips in the timeline away from the point of insertion to make room for the inserted clip(s).

In the first stage 405, the timeline 401 displays media clips 430 and 435 in the central compositing lane 440. In the second stage 410, the user selects (e.g., by a click operation, etc.) a media clip 425 displayed in the clip browser 445 to bring into the timeline 401. In the third stage 415, the user drag the selected media clip and hovers over the two media clips 430 and 435 in between of which the user wants to insert the media clip 425. The media clip 435 moves away from the particular point 485 in between the two media clips 430 and 445 to make room for the media clip 425.

The fourth stage 420 illustrates the completion of the insertion of the media clip 425 into the particular point 485 of the timeline 401. In some embodiments, the media-editing application snaps the media clip 425 into the space 490 that was created for the media clip 480 in the third stage 415.

B. Appending a Media Clip

Figure 5:
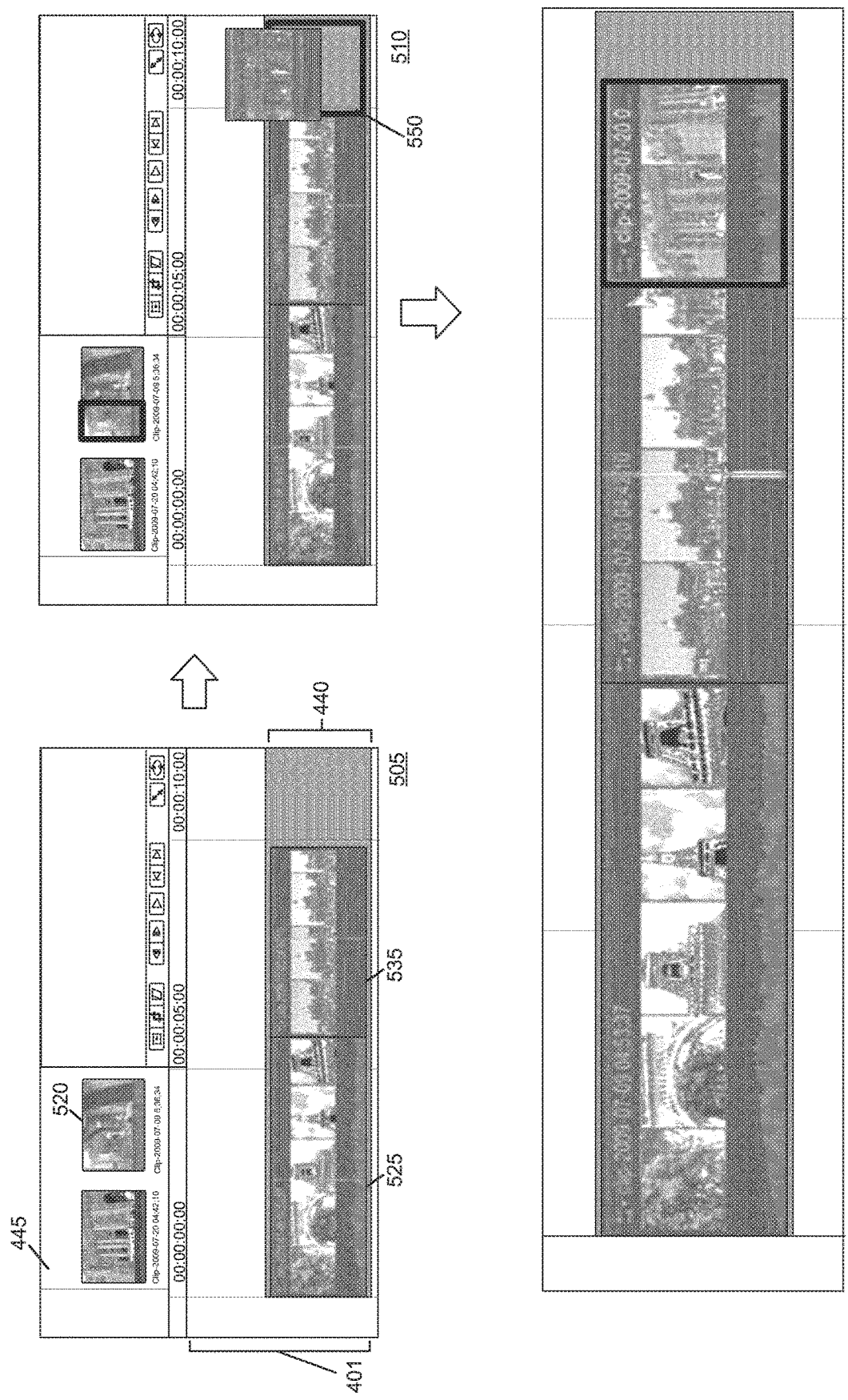
FIG. 5 illustrates an example of appending a media clip to another media clip displayed in the timeline.

FIG. 5 illustrates an example of appending a media clip to another media clip displayed in the timeline 401. Specifically, this figure illustrates the GUI 400 in three different stages 505-515 to show that the media-editing application allows the user of the application to append a media clip 520 to the end of the sequence of media clips 525 and 535 in the timeline 401.

Some embodiments allow a user of the media-editing application to append a first media clip to a second media clip in the timeline 401. The second media may be an anchored clip or a clip in the central compositing lane 440. Different embodiments provide different ways to append a media clip after another media clip. Some embodiments allow the user to drag a media clip from the clip browser 445 or another media clip in the timeline 401 to a right-edge of another media clip which does not have a media clip appended to the right edge. The media-editing application of some embodiments allow to append a selected media clip from the clip browser 445 to the right edge of another media clip as a playhead is passing close to the right edge. Yet other embodiments allow the user to append a selected media clip from the clip browser 445 after the last media clip in the central compositing lane 440 by invoking a hot key command.

In the first stage 505, the timeline 401 displays media clips 525 and 535 in the central compositing lane 440. As shown, the media clip 535 is the last media clip of the sequence of the two media clips. In the second stage 510, the user selects a range of a media clip 520 (e.g., selected via a cursor controller operation, selected from a keystroke, etc.) from the clip browser 545 towards the right edge of the media clip 535. The third stage 515 illustrates the completion of appending the media clip 520 to the media clip 535. The selected range of the media clip 520 appears at the end of the sequence in the timeline 401. In some embodiments, the media-editing application snaps the media clip 520 to the right edge of the media clip 535.

C. Deleting a Media Clip

Figure 6:
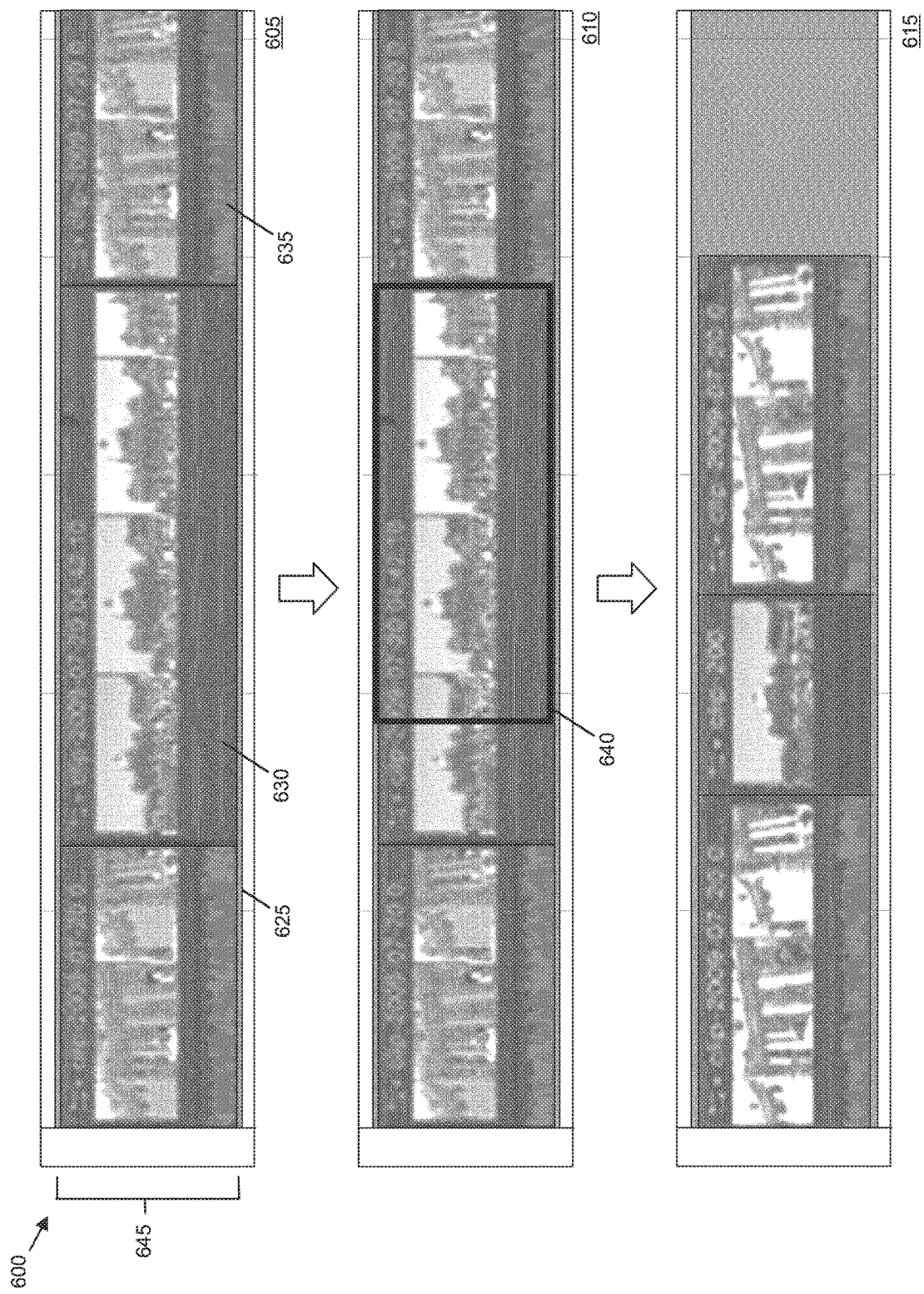
FIG. 6 illustrates an example of deleting a selected range of a media clip displayed in a timeline of a media-editing application.

FIG. 6 illustrates an example of deleting a selected range of a media clip displayed in a timeline 600 of a media-editing application. Specifically, this figure illustrates the timeline 600 in three different stages 605-615 to show the deletion of a range of a media clip that is less than the whole media clip displayed in the timeline 600. As shown, the central compositing lane 645 displays a composite presentation of media clips that includes media clips 625-635.

The media-editing application in some embodiments allows a user to delete a portion of the sequence of media clips in the timeline 600. In some embodiments, the user may select a full clip or multiple clips. Some embodiments allow the user to select a range that spans several clips. The media-editing application of some embodiments may also allow the user to select clips in the anchor lanes (rather than just the clips in the central compositing lane).

The first stage 605 shows the timeline 600 including clips 625-635 before the user performs a deletion operation. The second stage 610 illustrates a selection of a particular portion 640 of the timeline 600 (e.g., through a cursor controller operation, through a keyboard selection of the starting and ending point, through defining a starting point and a range). In this example, the selected particular portion 640 is a portion of the media clip 630 (e.g., two and a half frames within media clip 630).

The third stage 615 illustrates the deletion of the selected particular portion 640 from the timeline 600. The user of the media-editing application may invoke a command to delete the selected portion 640 by performing keyboard operations (e.g., delete key), by selecting from a drop-down menu, by performing a cursor controller operation, etc. Upon the deletion of the selected portion 640, the media-editing application deletes the selected portion 640. As a result, the central compositing lane 645 no longer displays the selected portion 640. The media clip 635, which comes after the deleted portion, ripples (i.e., moves to the left on the central compositing lane 645) in order not to leave a gap in the central compositing lane 645.

As illustrated by this example, the removal of the selected portion 640 shortens the total duration of the timeline 600 by the duration of the delete portion 640. The media-editing application in some embodiments maintains the total duration of the timeline by replacing the selected portion with placeholder gaps in order to prevent ripple edits. While this example illustrates the removal of a media clip within the central compositing lane, the media-editing application may also allow the user to delete an anchored clip.

D. Anchoring a Media Clip

Figure 7:
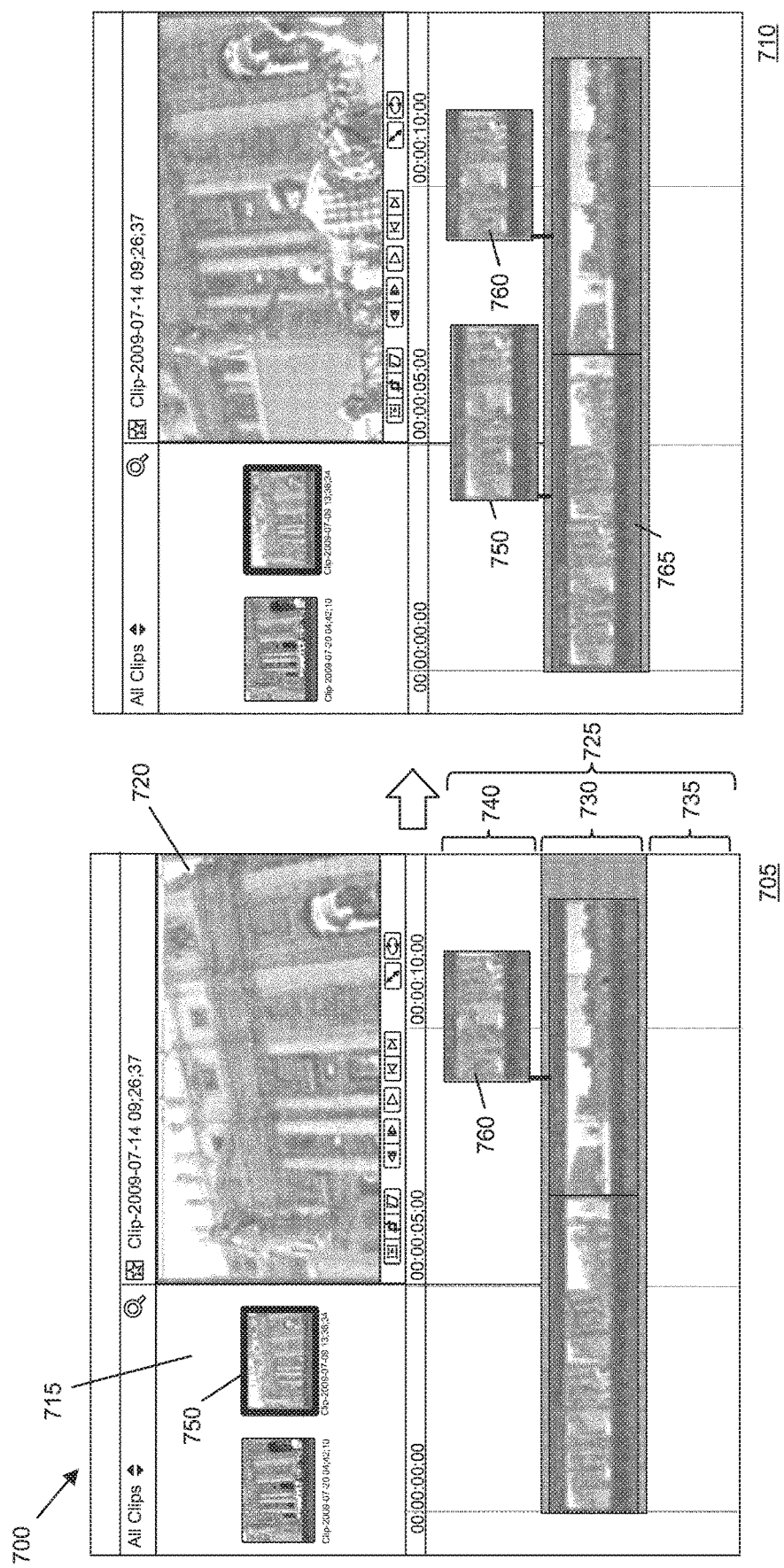
FIG. 7 illustrates an example of anchoring a media clip to another media clip displayed in a timeline of a media-editing application.

FIG. 7 illustrates an example of anchoring a media clip to another media clip displayed in a timeline of a media-editing application. Specifically, this figure illustrates a GUI 700 in two different stages 705 and 710 to show the media-editing application allows a user of the application to select a media clip from a clip browser and anchor the clip to another clip in the timeline 725. The GUI 700 is similar to the GUI 100 described above by reference to FIG. 1 in that the GUI 700 includes a clip browser 715, a preview display area 720, and a timeline 725 which are similar to the clip browser 110, the preview display area 120, and the timeline 115, respectively.

Some embodiments allow the user to anchor a media clip to another media clip in the timeline 725 by selecting a single media clip or a range of media clip from the clip browser and drag it above or below a media clip in the timeline 725. As described above, the media-editing application anchors a media clip only to a media clip in the central compositing lane 730. In other embodiments, the media clip that is anchored to may be any clip displayed in any lanes in the timeline 725. That is, the media-editing application of these embodiments allows the user to anchor a media clip to a media clip that is in the central compositing lane 730 or to a media clip that is anchored to another media clip.

In the first stage 705, a media clip 750 has been selected from the clip browser 715. The selection is received through a user selection input 755 such as input received from a cursor controller (e.g., a mouse, touchpad, trackpad, etc.), from a touchscreen (e.g., a user touching a UI item on a touchscreen), etc.

In the second stage 710, a user has dragged the media clip 750 from the clip browser 715 and dropped it (by releasing the mouse button, "tap" of a touchscreen, etc.) in the anchor lane 740 above the central compositing lane 730 and before the anchored media clip 760 in the timeline 725. The media-editing application anchors the media clip 750 to the media clip 765.

Figure 8:
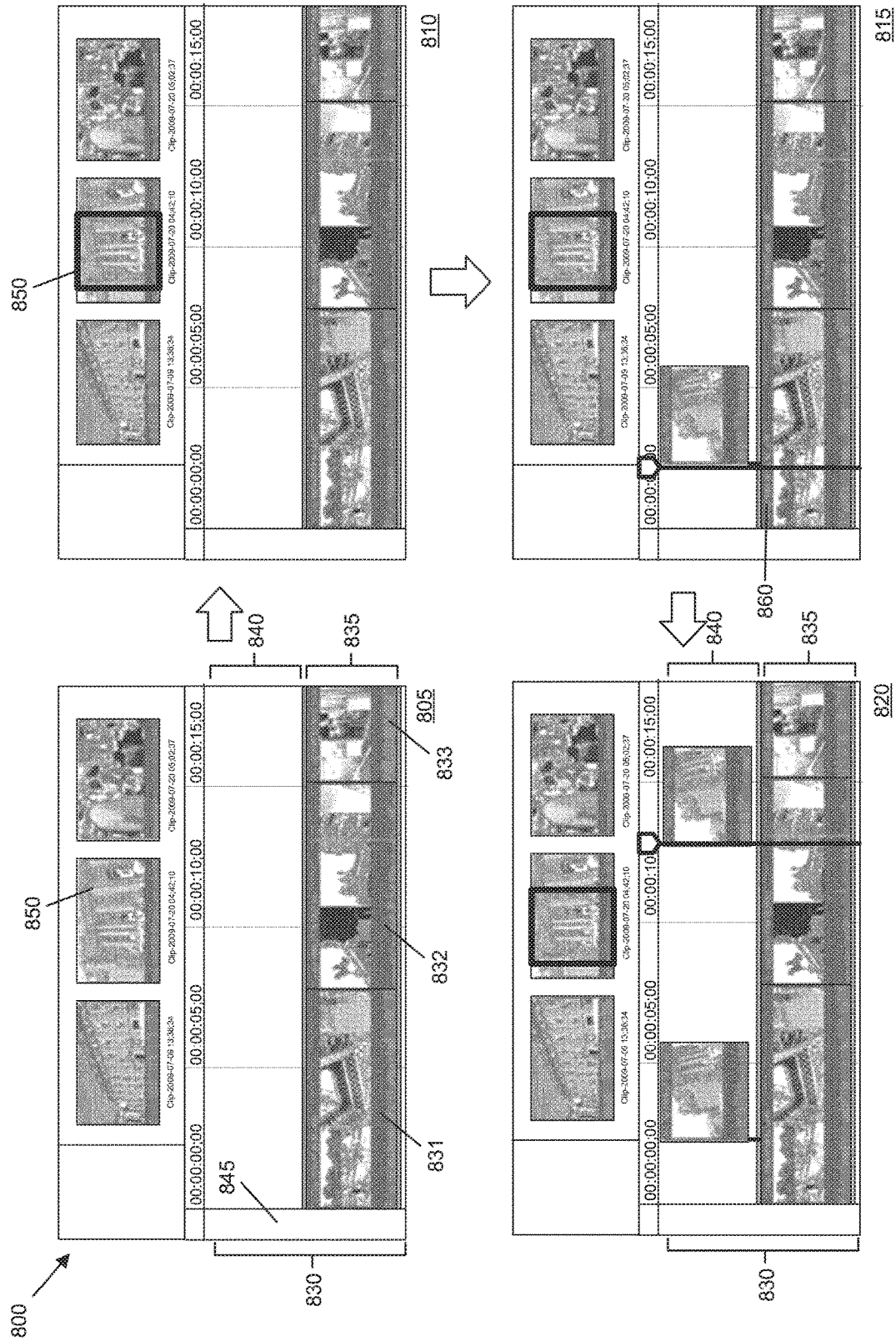
FIG. 8 illustrates an example of anchoring a media clip to another media clip displayed in a timeline of a media-editing application.

FIG. 8 illustrates another example of anchoring a media clip to another media clip displayed in a timeline of a media-editing application. Specifically, this figure illustrates a GUI 800 in three different stages 810, 815, and 820 to show that the media-editing application allows a user of the application to select a range of a media clip from a clip browser and anchor the selected range to several media clips as a primary playhead passes by those several media clips. The GUI 800 is similar to the GUI 100 described above by reference to FIG. 1 in that the GUI 800 includes a clip browser 825, and a timeline 830 which are similar to the clip browser 110 and the timeline 115, respectively. The timeline 830 includes a playhead 845, which is similar to the primary playhead 325 described above by reference to FIG. 3.

In some embodiments, the media-editing application allows the user of the application to anchor a first media clip to a second media clip in the timeline 830 based on the position of the playhead 845 along the timeline 830. In some such embodiments, the media-editing application anchors the first media clip to the second media clip when the user invokes a command to anchor as the playhead 845 passes by a position along the length of the second media clip. In some embodiments, the second media clip must be a media clip in the central compositing lane 835. In other embodiments, the second media clip can be any media clip placed in any lane of the timeline 830. The media-editing application in these embodiments anchors a first media clip to a second media clip that does not have above it another anchored clip that intersects the playhead 845 at the moment the command to anchor is invoked. That is, these embodiments anchors the first media clip to the second media clip that is in the uppermost lane of the timeline 830 among the media clips that the playhead is intersecting at the moment.

In the first stage 805, the timeline 830 displays media clips 831-833. The second stage 805 illustrates a selection of a range in a media clip 850 from the clip browser 825 (e.g., by clicking a mouse button, tapping a touchpad, or touching a touchscreen). The media-editing application indicates the selection by a bolding of the border of that particular portion of the media clip 850. In this example, the user selects a range of the media clip 850 to anchor to a media clip displayed in the timeline 830.

In the third stage 815, the user invokes a command provided by the media-editing application to anchor the selected range to a media clip displayed in the central composing lane 835. At the moment when the command was invoked, the playhead 845 is placed at a position along the timeline that intersects with the media clip 831. As a result, the media-editing application places the media clip 855 (the selected range of the media clip 850) to that position along the timeline and anchors the media clip 855 to the media clip 831 at that position. The in-point of the anchored media clip 855 coincides with the location of the playhead 845. In some embodiments, the media-editing application places an anchor 860 at the in-point of the anchored clip 855. The media-editing application places the anchor 860 that connects the anchored clip and the clip that is anchored at the in-point of the anchored clip 855.

In the fourth stage 820, the playhead 845 has continued to move along the timeline to the right as the media-editing application plays back the media clips in the central compositing lane 835. The user invokes the command to anchor again when the playhead is intersecting the media clip 832. The media-editing application anchors the selected range of the media clip 850 as a media clip to the media clip 832 at the position of the playhead 840. In this manner, the media-editing application created duplicate copies of the selected range of the media clip 850 and anchored the copies to different media clips in the central compositing lane 835.

Figure 9:
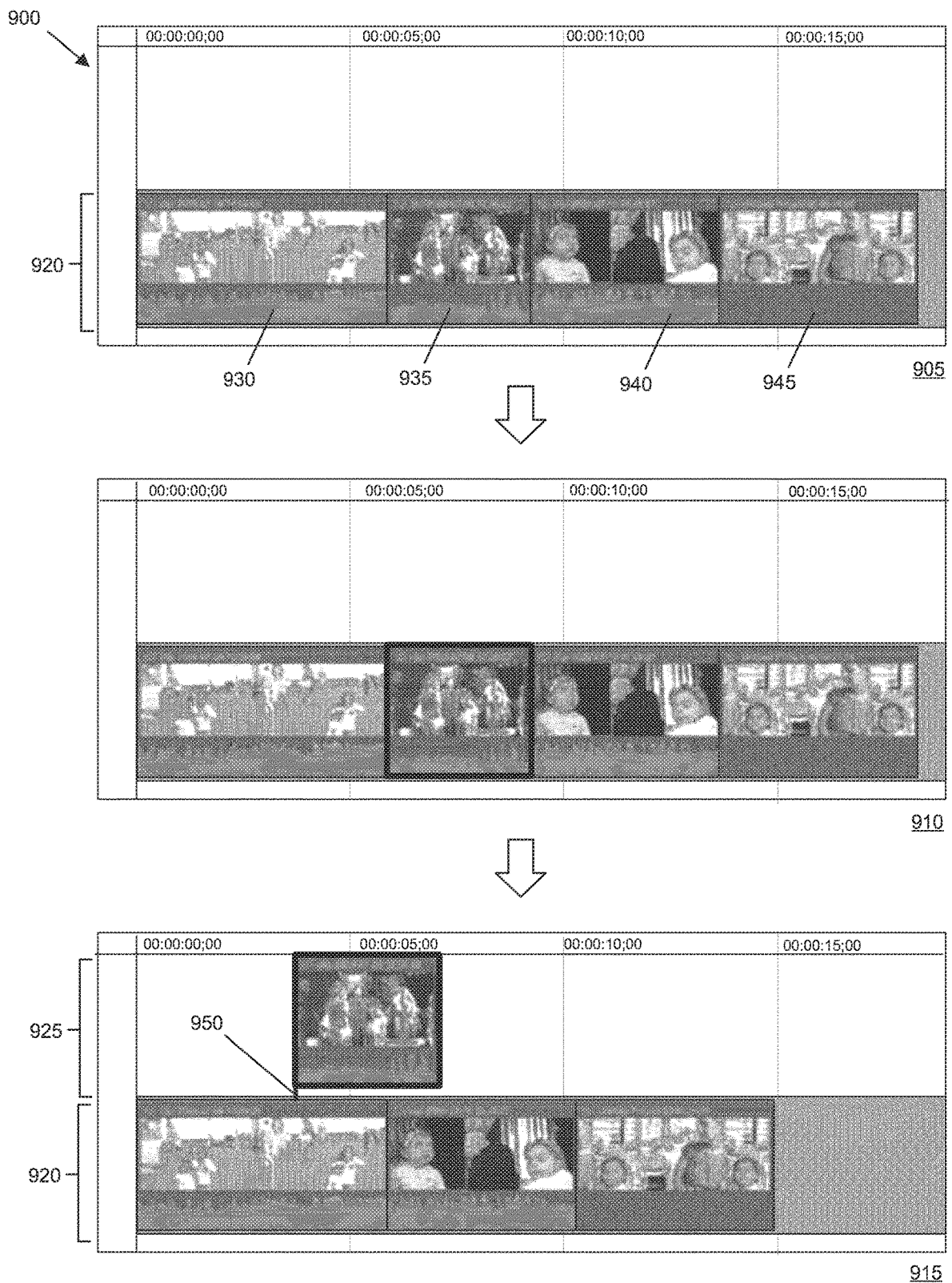
FIG. 9 illustrates an example of anchoring a media clip to another media clip displayed in a timeline of a media-editing application.

FIG. 9 illustrates yet another example of anchoring a media clip to another media clip displayed in a timeline of a media-editing application. Specifically, this figure illustrates a timeline 900 in three different stages 905-915 to show that the media-editing application allows a user of the application to remove a media clip from a central compositing lane 920 and anchor it to another media clip in the central composing lane 920. The timeline 900 is similar to the timeline 115 described above by reference to FIG. 1.

The media-editing application of some embodiments allows the user to remove a media clip from the central compositing lane 920 and anchor it to another media clip in the timeline 900. In some embodiments, the media-editing application allows the user to drag a first media clip out of the central compositing lane 920 and drop it above or below a second media clip to anchor the first media clip to the second media clip. The second media clip may be any media clip in any lane of the timeline 900.

In the first stage 905, the timeline 900 displays media clips 930-945 in the central compositing lane 920. In the second stage 920, the user selects the media clip 935 (e.g., by a click operation) and starts to drag it out of the central compositing lane 920.

In the third stage 915, the user drops the media clip 935 at a location above the media clip 930 in the timeline 900. The media-editing application anchors the media clip 935 to the media clip 930 in the anchor lane 925 such that the anchor 950 points to a particular point along the length of the media clip 930.

E. Moving an Anchored Clip into Central Compositing Lane

Figure 10:
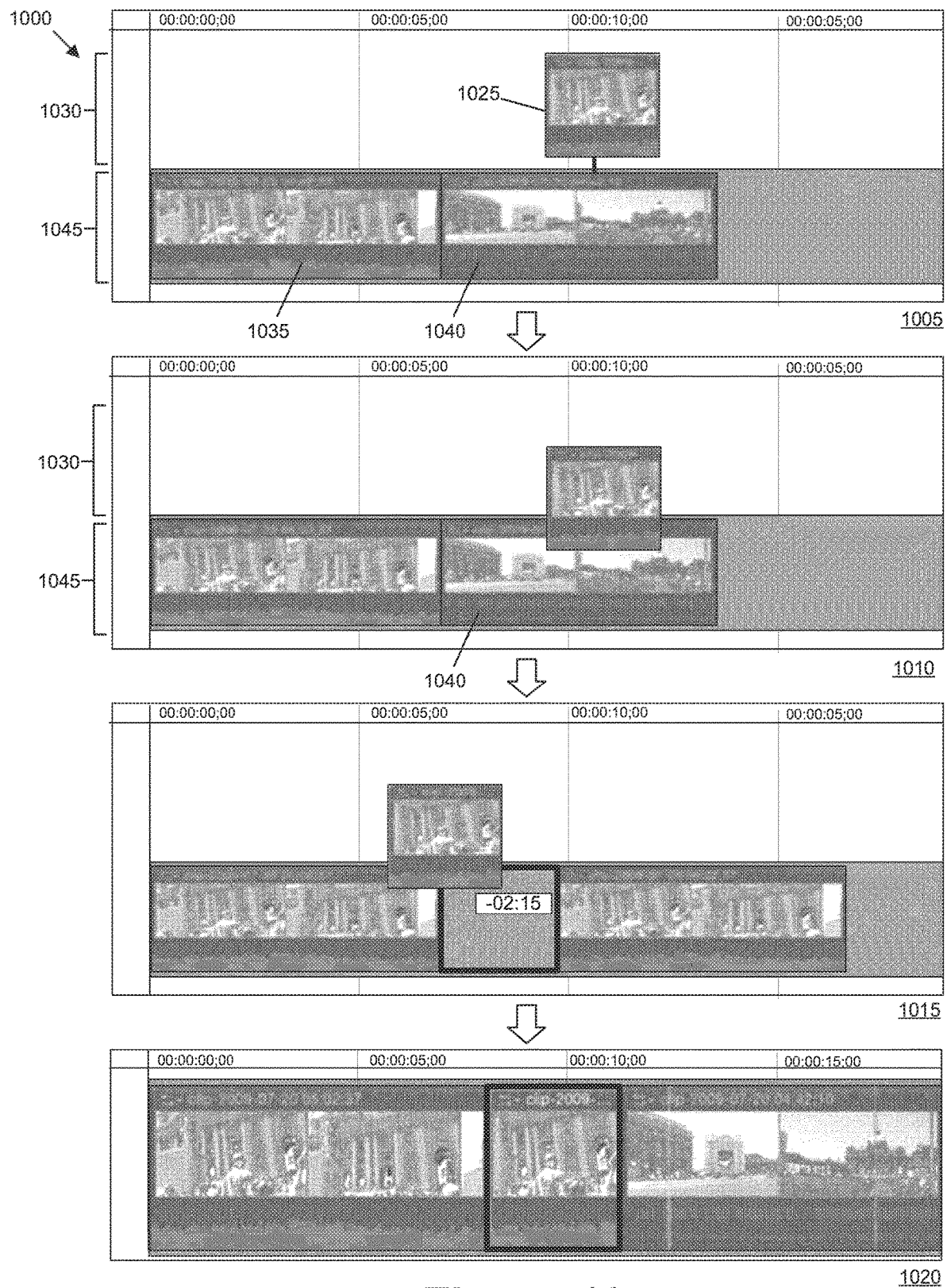
FIG. 10 illustrates an example of moving an anchored media clip into a central compositing lane in a timeline of a media-editing application.

FIG. 10 illustrates an example of moving an anchored media clip into a central compositing lane in a timeline of a media-editing application. Specifically, this figure illustrates a timeline 1000 in four different stages 1005, 1010, 1015, and 1020 to show that the media-editing application allows a user of the application to move an anchored clip 1025 from an anchor lane 1030 and place it between clips 1035 and 1040 that are displayed in a central compositing lane 1045. The timeline 1000 is similar to the timeline 115 described above by reference to FIG. 1.

In some embodiments, the media-editing application allows the user to add an anchored clip into the central compositing lane. Some embodiments allow it by inserting an anchored clip between two adjacent clips or appending the anchored clip after the last media clip displayed in the central compositing lane. Also, some embodiments allow the user to replace a media clip or a selected range over one or more media clips in the central compositing lane with an anchored clip.

At stage 1005, the user selects the anchored clip 1025 has been selected from the anchor lane 1030 (e.g., by clicking a mouse button, tapping a touchpad, or touching a touchscreen). At stage 1010, the user has dragged the anchored media clip 1025 from its previous location and hovers the media clip (without dropping it) over media clips 1035 and 1040 displayed on central compositing lane 1045 such that the left border line (in-point) of the media clip 1025 has covered a portion of the media clip 1040.

At stage 1015, the user has dragged the anchored media clip 1025 further towards left in such a way that the left edge (in-point) of the media clip has covered a portion of media clip 1035 as shown in this stage. In other words, the user has hovered media clip 1025 between the two media clips 1035 and 1040 in the central compositing lane 1045. As a result, the media-editing application makes space between the two media clips 1035 and 1040 in the central compositing lane 1045 for the anchored media clip 1025.

At stage 1020, the user has dropped the anchored media clip 1025 (by releasing the mouse button, "tap" of a touchscreen, etc.) in the space previously created at stage 1015. Consequently, the media-editing application places the media clip 1025 between the two media clips 1035 and 1040 in the central compositing lane 1045.

F. Moving Anchored Clips Along Anchor Lanes

Figure 11:
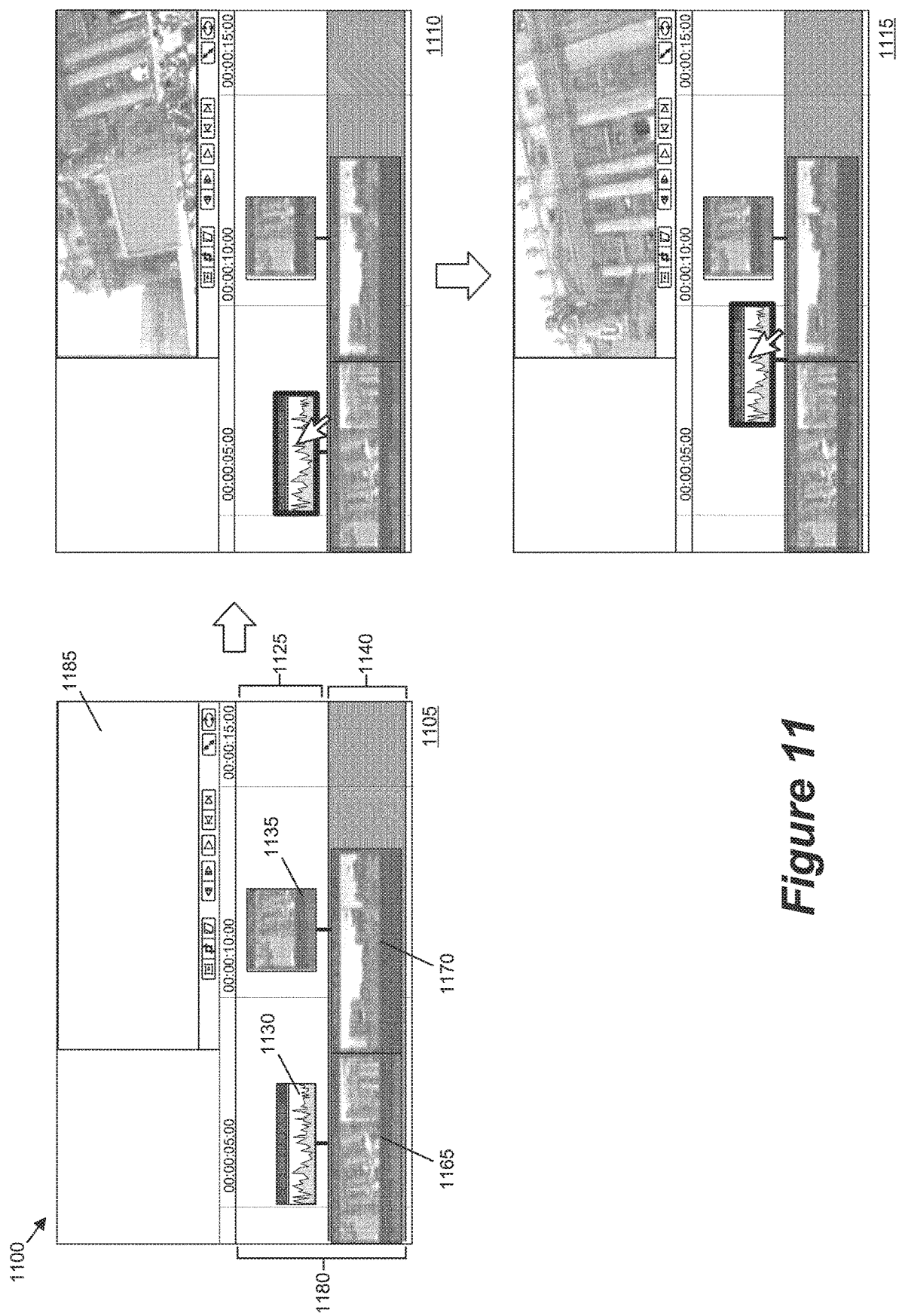
FIG. 11 illustrates an example of moving an anchored clip along an anchor lane in a timeline of a media-editing application.

FIG. 11 illustrates an example of moving an anchored clip along an anchor lane in a timeline of a media-editing application. Specifically, this figure illustrates the GUI 1100 in three different stages 1105, 1110, and 1115 to show that a preview display area 1185 displays the frame of a media clip to which an media clip 1130 is anchored. The GUI 1100 is similar to the GUI 100 described above by reference to FIG. 1 in that the GUI 1100 includes a timeline 1180 and the preview display area 1185 which are similar to the clip browser 110 and the timeline 105, respectively.

In some embodiments, an anchored media clip is represented as a rectangular shape. Each anchored media clip also has an anchor, which is represented as a pointer attached to the rectangular shape that connects the rectangular shape and a media clip representation displayed in the central compositing lane of a timeline. When a first media clip is anchored to a second media clip that is displayed in the central compositing lane, the anchor of the first media clip points to a position along the length of the second media clip. In some embodiments, the media-editing application displays a frame of the media clip represented by that position in the preview display area, when the first media clip is selected.

The operation of the GUI 1100 will now be described by reference to the three stages 1105-1115 that are illustrated in FIG. 11. In the first stage 1105, the media-editing application displays two media clips 1170 and 1165 in the central compositing lane 1140 and two anchored media clips 1130 and 1135. The first anchored media clip 1130 is anchored to the media clip 1165 in the central compositing lane 1140. The preview display area 1185 does not display any frame as no media clip is selected and a playhead is intersecting none of the media clips.

The second stage 1110 illustrates that the user has selected the first anchored media clip 1130 in the anchor lane 1125 using a cursor (e.g., by clicking a mouse button, tapping a touchpad, or touching a touchscreen). The media-editing application indicates the selection by highlighting the border of the anchored media clip 1130 as shown. The user selects the anchored media clip 1130 as the media clip that the user wishes to move along the anchor lane. As shown, the preview display area 1185 displays the frame in the media clip 1165 to which the anchor of the media clip 1130 is pointing.

At stage 1115, the user has dragged the anchored media clip 1130 towards right and dropped it (by releasing the mouse button, "tap" of a touchscreen, etc.) closer to the anchored media clip 1135. As shown in stage 1115, the position of the anchor of the anchored audio clip 1130 does not change by changing the position of the anchored clip. In other words, the anchor and the anchored clip will move along the anchor lane together and as one entity. Moreover, the preview display area 1185 is now displays a frame of the media clip 1165 to which the anchor 1175 is pointing.

Figure 12:
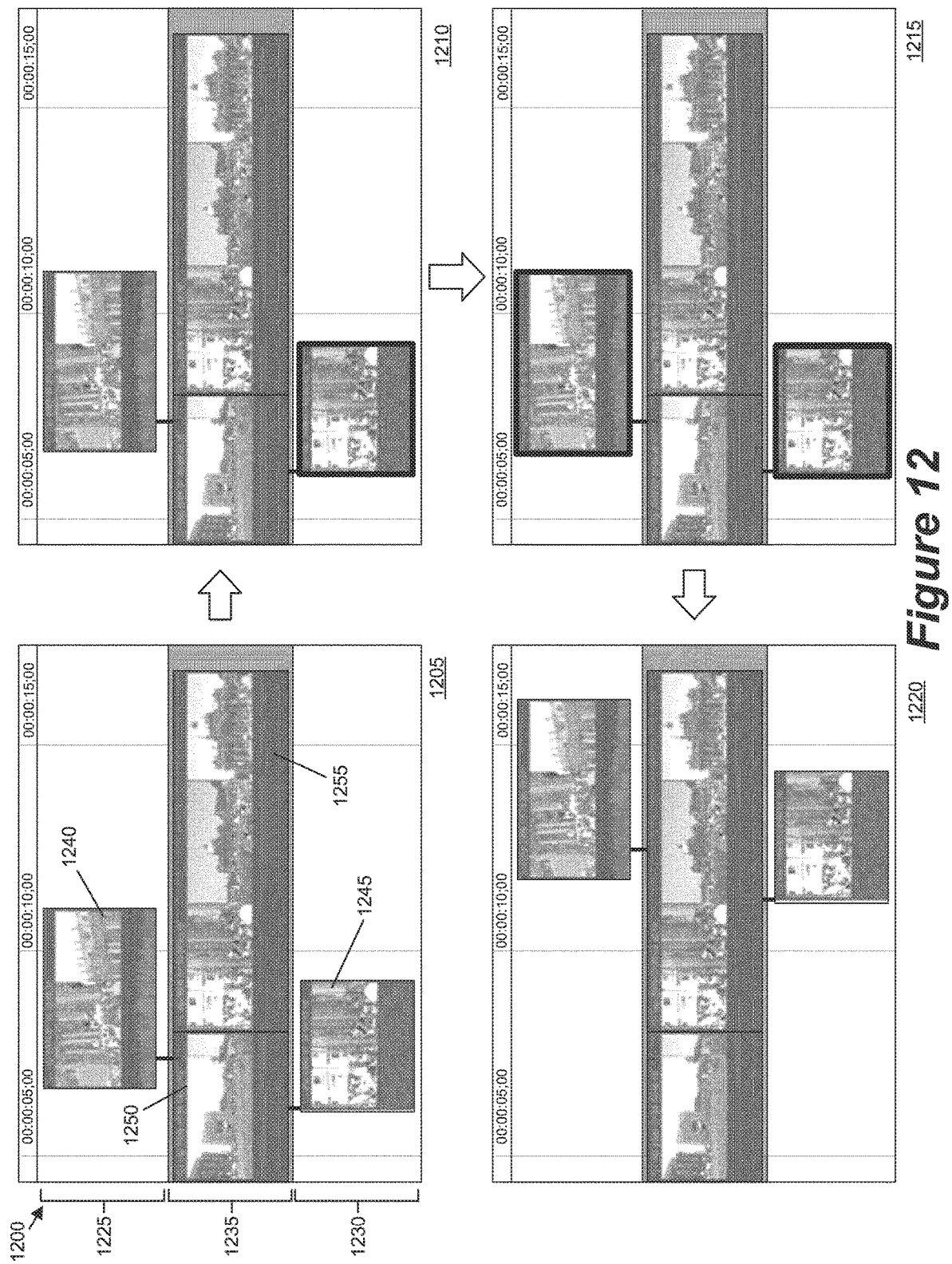
FIG. 12 illustrates an example of moving multiple anchored clips along an anchor lane in a timeline of a media-editing application.

FIG. 12 illustrates an example of moving multiple anchored clips along an anchor lane in a timeline of a media-editing application. Specifically, this figure illustrates the timeline 1200 in four different stages 1205, 1210, 1215, and 1220 to show that the media-editing application allows a user of the application to move multiple anchored clips along different anchor lanes. The timeline 1200 is similar to the timeline 115 described above by reference to FIG. 1. The timeline 1200 includes a central compositing lane 1235.

Some embodiments allow the user of the application to select two or more clips in different anchor lanes of the timeline 1200 to move together. This allows preserving the timing information between the selected anchored clips when the clips are placed in different positions along the timeline 1200.

The operation of the timeline 1200 will now be described by reference to the four stages 1205-1220 that are illustrated in FIG. 12. In the first stage 1205, the media-editing application displays two media clips 1250 and 1255 in the central compositing lane 1235. In addition, the media-editing application displays a media clip 1240 is in the anchor lane 1225 above the central compositing lane 1235 and a media clip 1245 is in the anchor lane 1230 below the central compositing lane 1235. The media clips 1240 and 1245 are anchored to the media clip 1250 in the central compositing lane 1235.

The second stage 1210, illustrates that a user has selected the anchored media clip 1245 in the anchor lane 1230 by using a cursor (e.g., by clicking a mouse button, tapping a touchpad, or touching a touchscreen). The selection is illustrated in some embodiments by a bolding of the border of the anchored media clip 1245. The user selects the anchored media clip 1245 as one of the media clips that the user wishes to move along the anchor lanes.

The third stage 1215, illustrates that the user has selected the anchored media clip 1240 in the anchor lane 1225 as the second selected anchored media clip by using a cursor (e.g., by clicking a mouse button, tapping a touchpad, or touching a touchscreen). The selection is illustrated by a bolding of the border of the anchored media clip 1240. The user selects the anchored media clip 1240 as the second media clip that the user wishes to move along the anchor lanes.

At stage 1220, the user has dragged the anchored media clips 1240 and 1245 towards the right and dropped them (by releasing the mouse button, "tap" of a touchscreen, etc.) close to the end of the second media clip in the central compositing lane 1235. As a result, the media clips 1240 and 1245 are anchored to the media clip 1255 in the central composting lane 1235. The relative positions of the two anchored media clips are not changed.

As illustrated, the user moves two anchored media clips along two different anchor lanes at the same time in this example. However, the user may move any number of anchored media clips (or portions of anchored clips) from multiple anchor lanes above the central compositing lane and multiple anchor lanes below the central compositing lane at the same time as well. As described above, the user may also move one or more anchored media clips from one position in the anchor lane to another position in the same anchor lane.

G. Duplicating Anchor Clips

Figure 13:
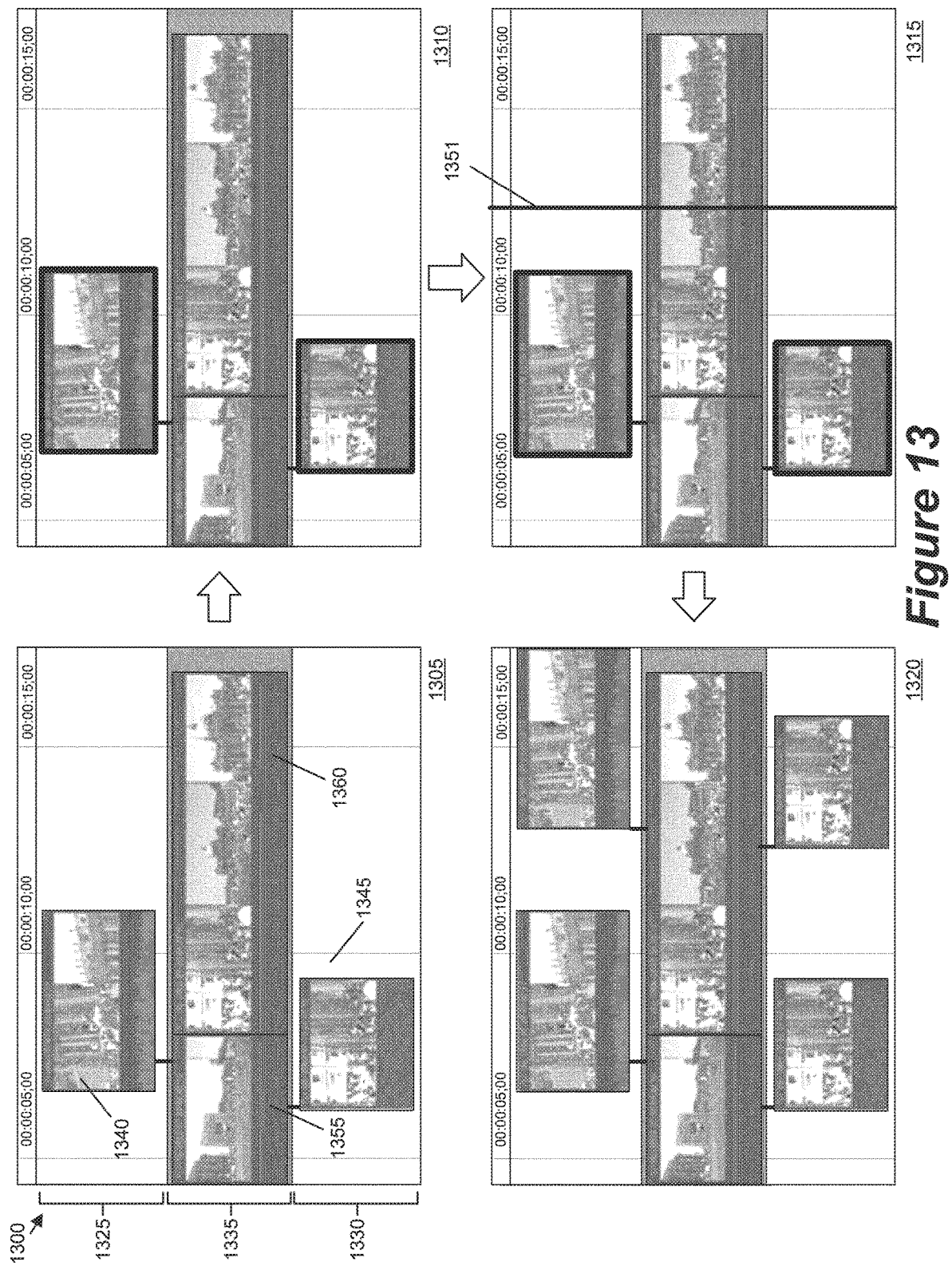
FIG. 13 illustrates an example of duplicating anchored clips in anchor lanes of a timeline of a media-editing application.

FIG. 13 illustrates an example of duplicating anchored clips in anchor lanes of a timeline of a media-editing application. Specifically, this figure illustrates the timeline 1300 in four different stages 1305, 1310, 1315, and 1320 to show that the media-editing application allows a user of the application to copy one or more anchored clips from a position in anchor lanes and paste them in a different position in the anchor lanes. The timeline 1300 is similar to the timeline 115 described above by reference to FIG. 1.

Some embodiments allow the user to create duplicate copies of one or more media clips displayed in the timeline 1300 and place the duplicate copies of the clips in another location within the timeline 1300. The media-editing application preserves relative timing information between two or more anchored media clips when the duplicate copies of them are placed in another location within the timeline.

The operation of the timeline 1300 will now be described by reference to the four stages 1305-1320 that are illustrated in FIG. 13. In the first stage 1305, the media-editing application displays two media clips 1355 and 1360 in the central compositing lane 1335. The media-editing application also displays a media clip 1340 in the anchor lane 1325 above the central compositing lane 1335 and a media clip 1345 in the anchor lane 1330 below the central compositing lane. The media clips 1340 and 1345 are anchored to the media clip 1250 in the central compositing lane 1335.

The second stage 1310 illustrates that a user has selected and copied the anchored media clips 1340 and 1345 in the anchor lanes 1325 and 1330, respectively. More detail of selecting a media clip is described above by reference to FIG. 12. The selection is illustrated in some embodiments by a bolding of the border of the anchored media clips 1340 and 1345. In this example, the user selects the anchored media clips 1340 and 1345 as the two media clips that the user wishes to paste duplicate copies of them somewhere else in the anchor lanes. As it is mentioned above, the user has also copied these two clips at this stage. In order to copy an anchored clip, some embodiments provide a pop-up or pull-down menu or window (not shown) to receive a user input as to where the copy must be saved. In some such embodiments, a user also has the option to save the copy of the anchored media clip in other temporary storage (e.g., a clipboard).

The third stage 1315 illustrates that the user has selected a different spot on the anchor lane by using a cursor (e.g., by clicking a mouse button, tapping a touchpad, or touching a touchscreen). In this example, the media-editing application allows the user to specify the position along the timeline 1300 to which to paste the duplicate copies of the media clips 1350 and 1345 by a skimming playhead 1351. The skimming playhead is similar to the skimming playhead 330 described above by reference to FIG. 3.

In the fourth stage 1320, the user has pasted the anchored media clips 1340 and 1345 at locations in the timeline 1300 where the user had previously specified in the third stage 1315. As shown in this stage 1320, the two anchored media clips 1340 and 1345 are copied onto the new locations in the anchor lanes with exactly the same relative positions they had in their original locations with respect to the central compositing lane 1335. In order to paste an anchored clip, some embodiments provide a pop-up or pull-down menu or window (not shown) to receive a user input as to where the saved copy must be pasted. In some embodiments, the media-editing application also provides an option to paste the saved copy of the anchored media clip from the clipboard.

While the above example illustrates copying two anchored media clips in two different anchor lanes at the same time and then pasting them at the same time, some embodiments allows the user to copy and paste any number of anchored media clips from the anchor lane above the central compositing lane and the anchor lane below the central compositing lane (not shown) at the same time as well. The user may also copy and paste (not shown) one or more anchored media clips from one position in the anchor lane to another position in the same anchor lane.

H. Snapping Media Clips

Figure 14:
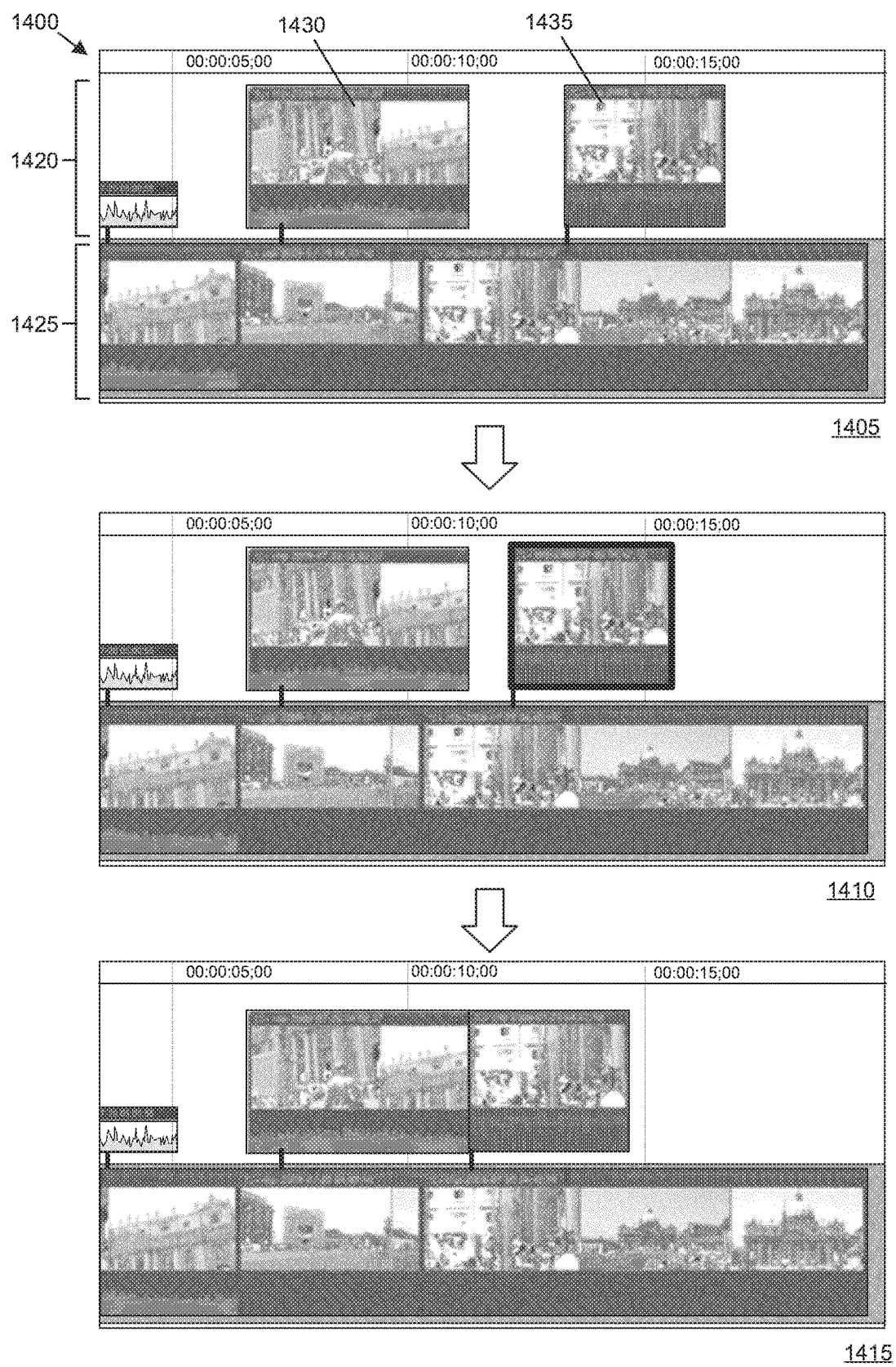
FIG. 14 illustrates an example of horizontal snapping of two media clips displayed in a timeline of a media-editing application.

FIG. 14 illustrates an example of horizontal snapping of two media clips displayed in a timeline of a media-editing application. Specifically, this figure illustrates the timeline 1400 in three different stages 1405, 1410, and 1415 to show that the media-editing application snaps a media clip 1435 to a media clip 1430 as the user moves the media clip 1435 within a certain distance from the media clip 1430. The timeline 1400 is similar to the timeline 115 described above by reference to FIG. 1.

In some embodiments, the media-editing application snaps a first media clip to a second media clip when the user drags (e.g., by a cursor operation) the first media clip close to the second media clip from either side of the second media clip. When the user moves the first media clip from the right side of the second media clip, the media-editing application snaps the left edge of the first media clip to the right edge of the second media clip. Conversely, when the user moves the first media clip from the left side of the second media clip, the media-editing application snaps the right edge of the first media clip to the left edge of the media clip. The media-editing application applies this snapping feature to any types of clips in any lanes (central compositing lanes, anchor lanes, etc.) that may be displayed in the timeline.

As will be described further below, some embodiments may move away the second clip to make room for the first media clip. Also, some embodiments may temporarily superimpose the second clip to prompt for replacement options. Therefore, the media-editing application of some embodiments uses a set of criteria to determine an operation to perform. The set of criteria may include the velocity of the first media clip at which the second media clip is moving to the, types of clips the first and second clips are, the direction in which the first media clip is approaching the second media clip, the origin (e.g., a clip browser, a timeline, etc.) from which the first media clip is moving, etc.

The operation of the timeline 1400 will now be described by reference to the three stages 1405-1415 that are illustrated in FIG. 14. In the first stage 1405, the media-editing application displays two anchored media clips 1430 and 1435 in two different positions in the anchor lane 1420. The user has selected the anchored media clip 1435. In some embodiments, the user of the media-editing application may perform this selection by clicking a mouse button, tapping a touchpad, or touching a touchscreen. The selection is shown in some embodiments by a bolding of the border of the anchored media clip 1435. The user selects the media clip 1435 to move it towards the media clip 1430 in the anchor lane 1420.

The second stage 1410 illustrates that the user has dragged the anchored media clip 1435 towards the left and close to the media clip 1430. When the distance between two media clips drops below a certain threshold distance, the media-editing application determines an operation to perform based on a set of criteria.

At stage 1415, the user has released the anchored media clip 1435 (by releasing the mouse button, "tap" of a touchscreen, etc.) when the distance between the two clips (e.g., the distance between the upper right corner of the media clip 1430 and the upper left corner of the media clip 1435) is smaller than a certain distance. Using the set of criteria, the media-editing application determines that the operation to perform is snapping the two media clips and then snaps the media clip 1435 to the right edge of the media clip 1430. As a result, the two media clips become two contagious clips as shown.

I. Vertically Swapping Anchored Clips

Figure 15:
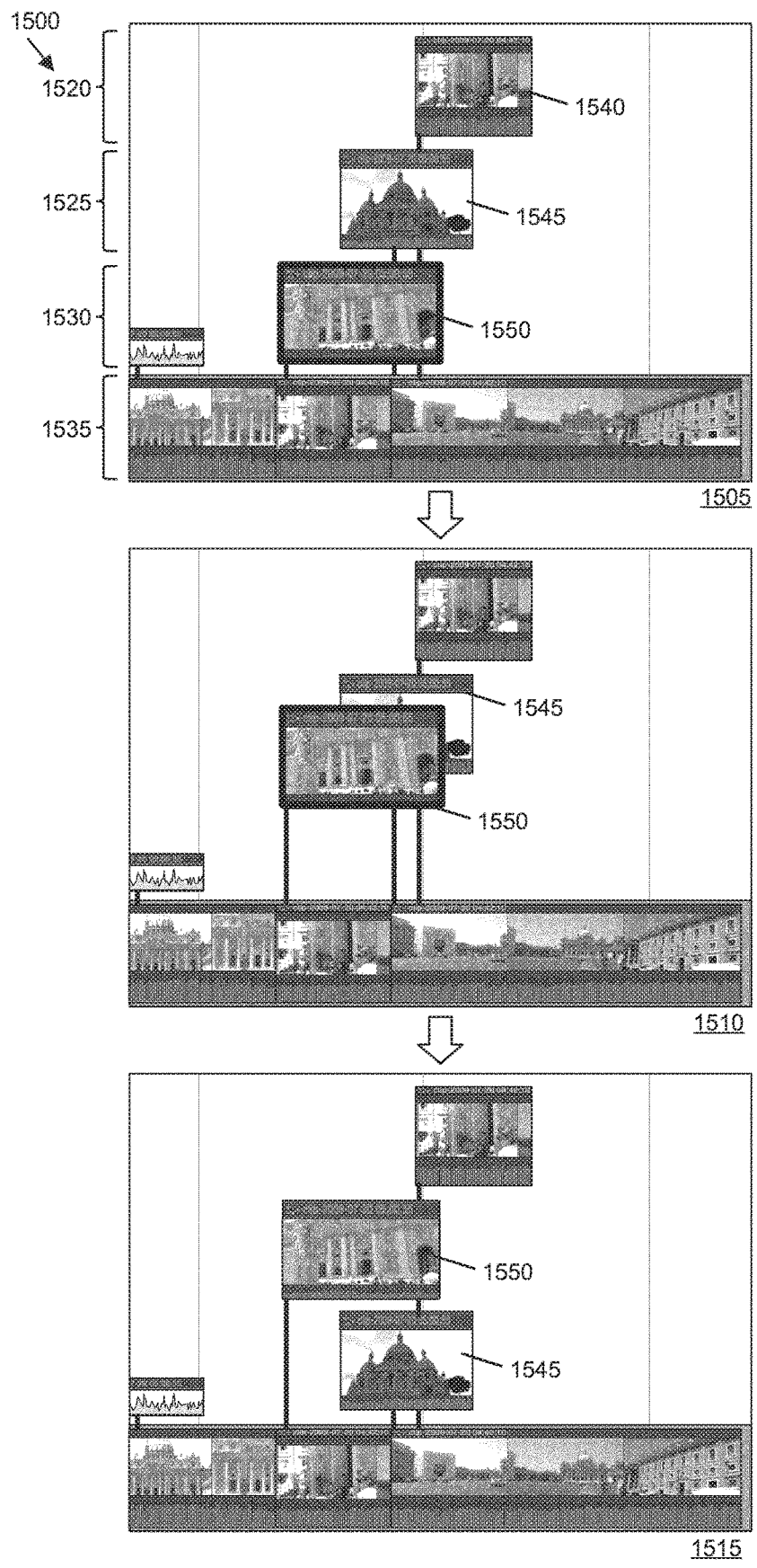
FIG. 15 illustrates an example of vertical swapping of two anchored media clips in two different anchor lanes in a timeline of a media-editing application.

FIG. 15 illustrates an example of vertical swapping of two anchored media clips in two different anchor lanes in a timeline of a media-editing application. Specifically, this figure illustrates a timeline 1500 in three different stages to show that the media-editing application allows a user of the application to vertically swap an anchored clip 1550 with an anchored clip 1545. The timeline 1500 is similar to the timeline 105 described above by reference to FIG. 1.

As described above, an anchored clip's media content is composited with (e.g., overlay, superimpose, mix, etc.) the media content of the media clip in a compositing lane. When there are multiple anchored clips at a position along the timeline 1500, the media content of an anchored clip in an upper anchor lane takes the priority over the media content of a media clip in a lower lane in some embodiments. By allowing vertical swapping, the media-editing application provides a simple way of changing priorities of the anchored clips.

The operation of the timeline 1500 will now be described by reference to the three stages 1505-1515 that are illustrated in FIG. 15. In the first stage 1505, the media-editing application displays three anchored media clips 1540-1550 in three different anchor lanes 1520-1530, respectively. The user has selected the anchored media clip 1550 in the anchor lane 1530 using a cursor (e.g., by clicking a mouse button, tapping a touchpad, or touching a touchscreen). The selection is illustrated in some embodiments by a bolding of the border of the anchored media clip 1550. The user has selected the anchored media clip 1550 to swap with the anchored media clip 1545 in the anchor lane 1525.

The second stage 1510 illustrates that the user has dragged the anchored media clip 1550 up and towards the anchored media clip 1545 in the anchor lane 1525. The media-editing application overlays the media clip 1545 with the media clip 1550. Based on a set of criteria, the media-editing application determines an operation to perform.

In the third stage 1515, the user has released the anchored media clip 1550. Using the set of criteria, the media-editing application determines that it will swap the two media clips vertically and the swaps the two media clips. Accordingly, the compositing priorities of the two media clips have been switched as well.

J. Live Drag

Figure 16:
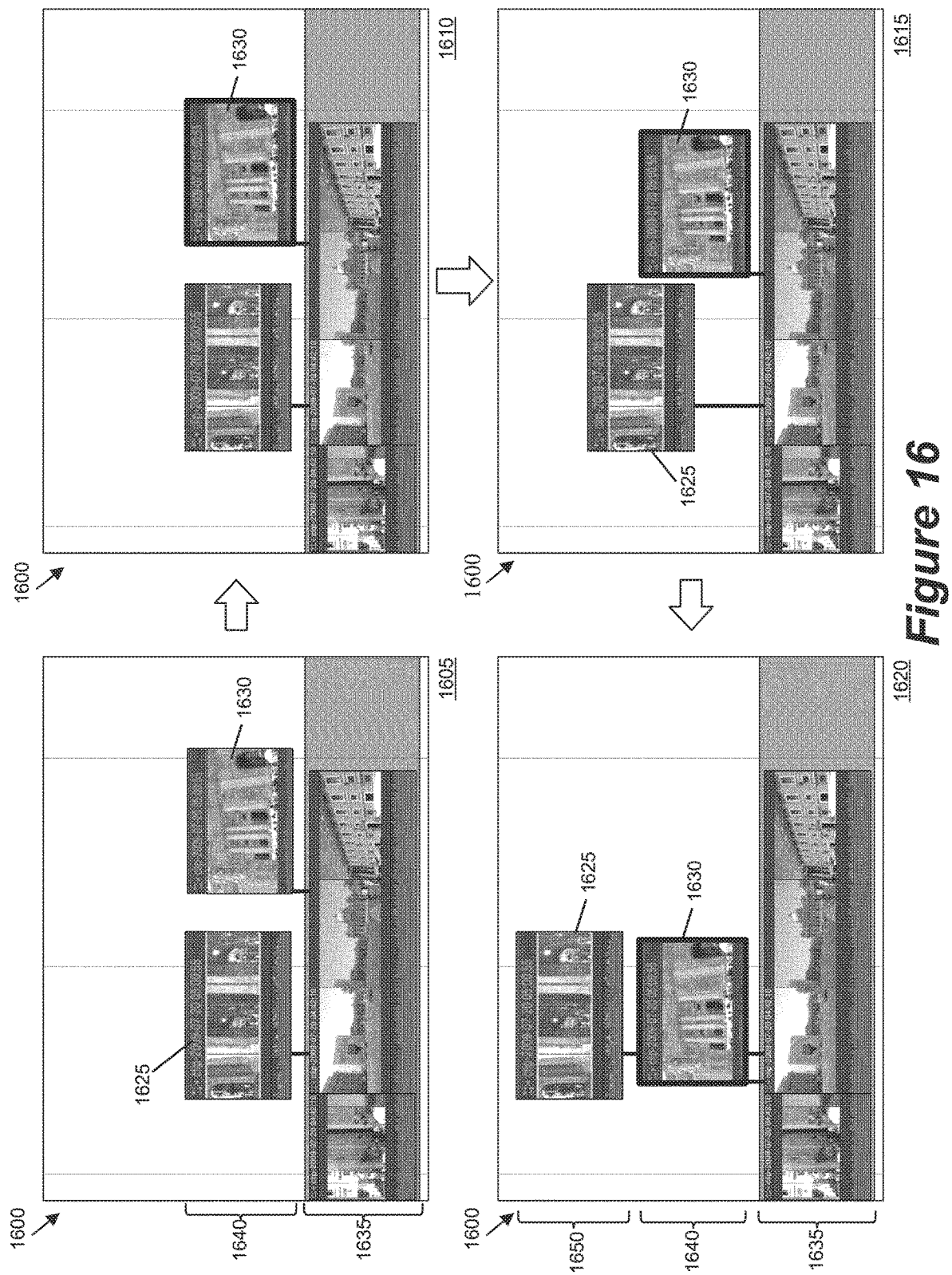
FIG. 16 illustrates a timeline of a media-editing application that displays results of editing operations as the editing operations are being performed.

FIG. 16 illustrates a timeline 1600 of a media-editing application that displays results of editing operations as the editing operations are being performed. Specifically, FIG. 16 illustrates the timeline 1600 in four different stages 1605-1620 to show that the timeline 1600 displays media clip 1625 being pushed up to another anchor lane as media clip 1625 is dragged towards the media clip 1630. The timeline 1600 is similar to the timeline 115 described above by reference to FIG. 1.

As described above, the media-editing application of some embodiments allows the user to edit a media presentation by moving a media clip from one location to another location within a timeline or from an area out of the timeline into the timeline. For instance, the user can drag a media clip from a clip browser (not shown) into a central compositing lane or to a location occupied by an anchored clip in an anchor lane. Some embodiments show the result of editing operation performed by moving media clips as the operations are being performed. In other words, when the user moves media clips within the timeline or into the timeline, the timeline of these embodiments display movement of the media clips.

When a media clip is dragged into the central compositing lane and collides with the media clips displayed in the lane, the media clips in the central composting lane move along the central compositing lane, whereas anchored clips may also get pushed up or down. The up or down movement of the anchored clips in some embodiments can be viewed as dynamic creation of anchor lanes. For instance, when an anchored clip collides with a media clip that is being dragged, the anchored media clip moves to a higher level to make space for the dragged clip.

In some embodiments, the media-editing application displays a visual indication between the media clips as a media clip is dragged and moved over the region of the timeline 1600. This visual indication helps the user to identify the media clips between which the user may wish to place the media clip being dragged.

In the first stage 1605, the timeline 1600 displays the media clips 1625 and 1630 in the anchor lane 1640. These two clips are anchored off the media clips displayed in the central compositing lane 1635. In the second stage 1610, the user selects (e.g., via a clicking operation) the anchored media clip 1630 to drag it to the left.

In the third stage 1615, the user drags the media clip 1630 to a location close to the media clip 1625. As the media clip 1630 is dragged near the media clip 1625, the timeline 1600 moves the media clip 1625 upward so as to make room for the media clip 1630. In the fourth stage, the user drags the media clip 1630 to a location that was formerly occupied by the media clip 1625. The timeline 1600 moves the media clip 1625 above the media clip 1630. As a result, timeline 1600 has created another anchor lane 1650 on top of the anchor lane 1640.

Figure 17:
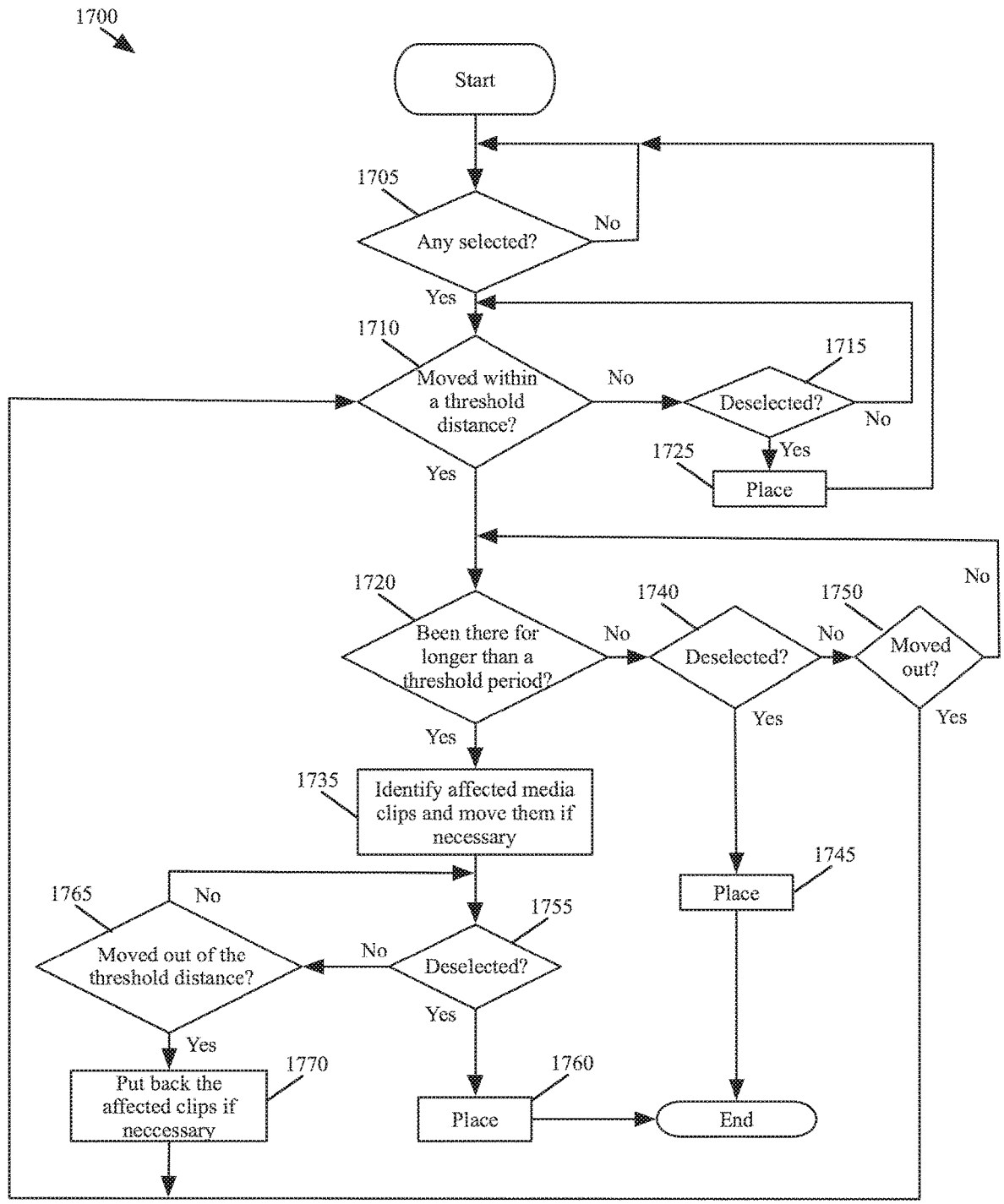
FIG. 17 conceptually illustrates a process of some embodiments for rearranging positions of media clips in a timeline while a media clip is being dragged over or extended into different regions of the timeline.

FIG. 17 conceptually illustrates a process 1700 of some embodiments for rearranging positions of media clips in a timeline while a media clip is being dragged over or extended into different regions of the timeline. The process 1700 is performed by a media-editing application. The process starts when the media-editing application displays a timeline.

The process begins by determining (at 1705) whether a media clip is selected for editing. As described above, a selection of a media clip for editing can be accomplished in a variety of ways. For instance, a user can select a media clip in a timeline by clicking on a portion of the media clip. In some embodiments, the process determines that a media clip is selected for editing when only part of a media clip is selected. For instance, the process determines that a media clip is selected for editing when either side edge of the media clip is selected for trimming or extending. Also, the process determines that a media clip is selected for editing when a media clip is being brought from out of the timeline. For instance, a media clip that is being dragged into the timeline is deemed selected by the process.

When the process determines (at 1705) that no media clip is selected for editing, the process loops back to 1705 until a selection is made. Otherwise, the process determines (at 1710) whether the selected media clip has moved within a threshold distance from a second media clip. Different embodiments determine whether the selected media clip has moved within the threshold distance differently. In some embodiments, the process draws an invisible shape around the second media clip. The process in these embodiments determines that the selected media clip is within the threshold distance from the second media clip when any part of the selected media clip comes within the enclosing shape. In some cases, the selected media clip comes within the enclosing shape when the whole media clip is selected and dragged. In other cases, the selected media clip comes within the enclosing shape when the selected media clip is extended into the enclosing shape. The process in other embodiments places invisible markers throughout a media clip's border and measures the distance between two media clips by measuring the shortest distance between any two markers (i.e., one for each media clip) of the two media clips.

When the process determines (at 1710) that the selected media clip is within a certain threshold distance from another media clip, the process proceeds to 1720 which will be described further below. Otherwise, the process determines (at 1715) whether the selected media clip is deselected. The user may deselect a selected media clip in a variety of different ways. For instance, the user can deselect a selected media clip by releasing a mouse button or removing a finger from a touch screen, etc.

When the process determines (at 1715) that the selected media clip has not been deselected, the process loops back to 1710 to determine the selected media clip has been moved within a threshold distance of a second media clip. Otherwise, the process places (at 1725) the media clip at the location in the timeline where the media clip has been deselected. In some cases, the location in the timeline where the process places the media clip may be the same location as the selected media clip's initial location. The process then loops backs to 1705 to determine whether there is a media clip selected for editing.

When the process determines (at 1710) that the selected media clip has been moved within a threshold distance from the second media clip displayed in the timeline, the process determines (at 1720) whether the selected media clip has been within the threshold distance from the second media clip for longer than a certain threshold period of time. In some embodiments, the process uses different threshold value for different cases. For instance, the process may use different threshold period for cases when the selected media clip is touching or at least partly overlapping the second media clip and for cases when the selected media clip is not in contact with another media clip.

When the process determines (at 1720) that the selected media clip has been within the threshold distance from the second media clip longer than the threshold period of time, the process proceeds to 1735 which will be described further below. Otherwise, the process determines (at 1740) whether the selected media clip has been deselected. When the process determines (at 1740) that the media clip has been deselected, the process places (at 1745) at the location where the selected media clip was deselected. The process also identifies all other media clips affected by the placement of the selected media clip at the new location of the selected media clip. The affected media clips may include the second media clip. The process changes the locations of those affected media clips to new locations if necessary. For instance, the process may push the second media clip up to another anchor lane. The affected media clips may include other media clips whose positions are affected by the bumped up media clip. In this manner, the placement of the selected (now deselected) media clip may cause a series of movements of some of the media clips in the timeline.

When the process determines (at 1740) that the selected media clip has not been deselected, the process determines (at 1750) whether the selected media clip has moved away from the second media clip such that the selected media clip is no longer within the threshold distance form the second media clip. When the process determines (at 1750) that the selected media clip has been moved away, the process loops back to (at 1710) to determine whether the selected media clip has moved within a threshold distance from a third media clip.

When the process determines (at 1750) that the selected media clip has not been moved away from the second media clip further than the threshold distance, the process loops back to 1720 to determine whether the selected media clip has been within the threshold distance from the second media clip longer than the threshold period of time.

When the process determines (at 1720) that the selected media clip has been moved within the threshold distance from the second media clip and has been there for longer than the threshold period of time, the process (at 1735) identifies the media clips that are affected by the movement of the selected media clip and displays the affected media files in different locations in the timeline if necessary. As described above, the process may move the second media clip to another location and the movement of the second media clip may affect other media clips that were placed near or adjacent to the second media clip. Placing affected media clips will be described in detail further below by reference to FIGS. 18 and 19.

Process 1700 then determines (at 1755) whether the selected media clip has been deselected. When the process determines that the selected media clip has been deselected, the process places (at 1760) the selected media clips and the affected media clips at the locations to which the process has moved (at 1735) them. Otherwise, the process determines (at 1765) whether the selected media clip has moved away from the second media clip such that the selected media clip is no longer within the threshold distance from the second media clip.

When the process determines (at 1765) that the selected media clip has not been moved away from the second media clip, the process loops back to 1755 to determine whether the selected media clip is deselected. Otherwise, the process puts back the affected media clips back to the locations where they had been before the process moved (at 1735). The process puts (at 1770) them back because the selected media clip was not deselected (i.e., not released) while it was within the threshold distance from the second media clip. The process then loops back to 1710 to determine whether the selected media clip has moved within a threshold distance of a third media clip.

One of ordinary skill in the art will recognize that process 1700 is a conceptual representation of the operations used to arrange the media clips in a timeline as one of media clip is being moved within a timeline. The specific operations of process 1700 may not be performed in the exact order shown and described. The specific operations may not be performed in one continuous series of operations, and different specific operations may be performed in different embodiments. Furthermore, the process could be implemented using several sub-processes, or as part of a larger macro process. For instance, the operations the process 1700 performs are described in the context of one selected media clip being moved around the timeline and coming close to one other media clip. However, the process may perform these operations for other combinations of media clips. For instance, the media clip being moved around in the timeline could be a combination of two or more media clips that are selected together. Also, such media clip may be a selected range over one or media clips.

Figure 18:
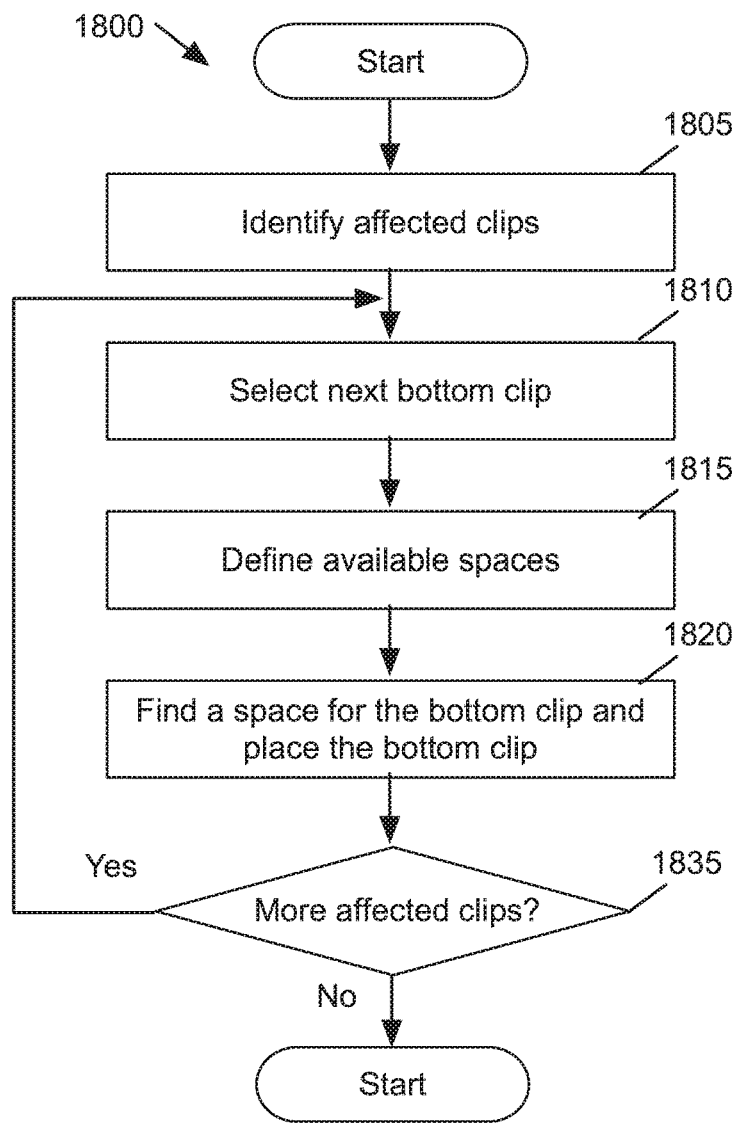
FIG. 18 conceptually illustrates a process of some embodiments for placing media clips in a timeline when a media clip has moved to a new position in the timeline.
Figure 19:
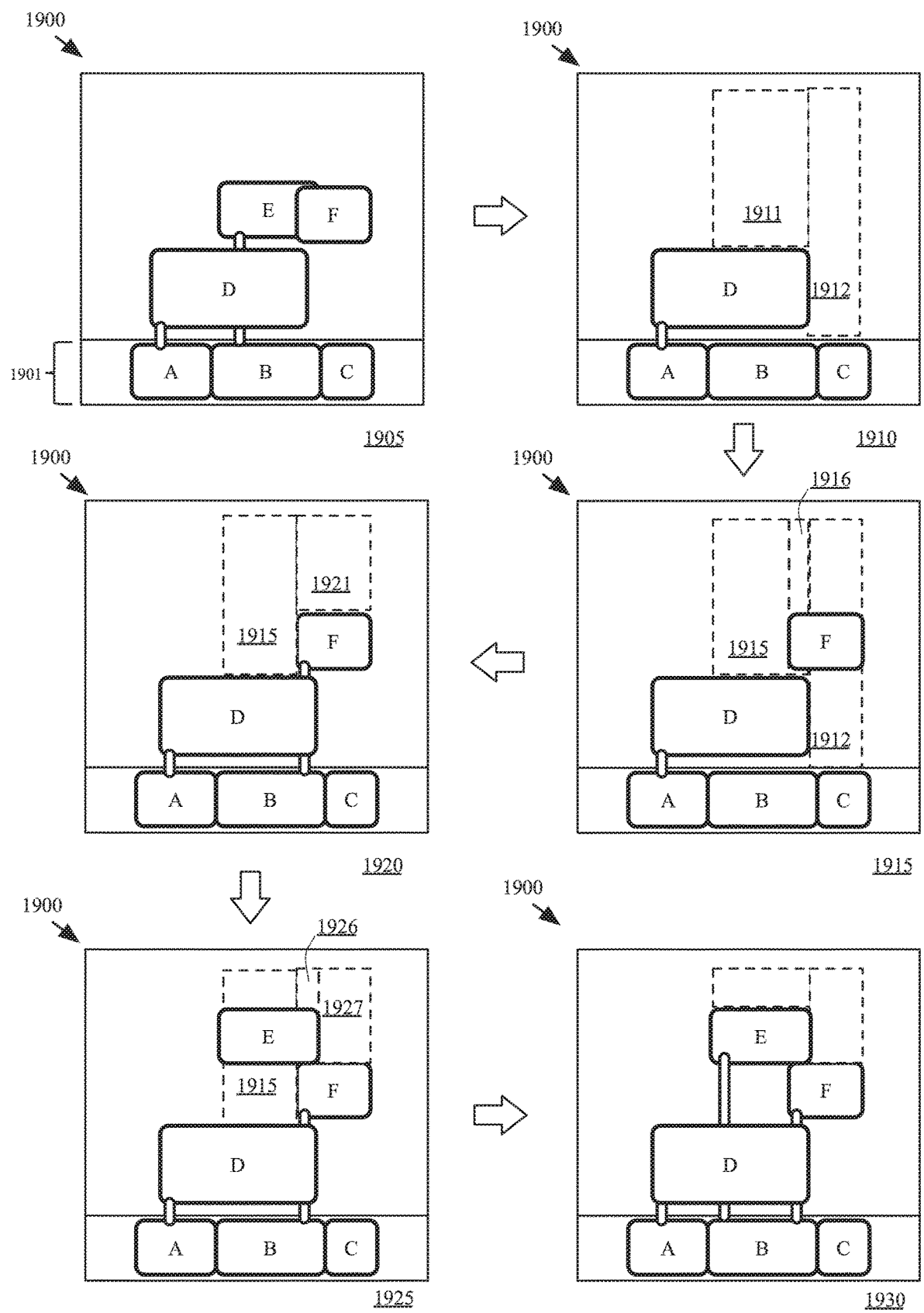
FIG. 19 illustrates an example of placing media clips in a timeline.

FIG. 18 conceptually illustrates a process 1800 of some embodiments for placing media clips in a timeline when a media clip has moved to a new position in the timeline. The process 1800 is performed by a media-editing application. In some embodiments, process 1800 is performed whenever the media-editing application determines that a moving media clip has moved to a new location in the timeline or has been in a location that is closer than a threshold distance from another media clip for longer than a threshold period of time. Process 1800 will be described by reference to FIG. 19, which illustrates an example of placing media clips in a timeline 1900 in six different stages 1905-1930. FIG. 19 illustrates media clips A, B, C, D, E and F. The media clips A, B, and C are in spine 1901. The media clip D is initially anchored to the media clip A and spans part of the media clips A and B horizontally. The media clip E is anchored to the media clip B and spans part of the media clip B horizontally. The media clip F is a moving media clip. That is, the media clip F is being moved into a new location in the timeline 1900. Process 1800 starts when a media clip has moved to a new location in the timeline or has been in a location in the timeline that is closer than a threshold distance from another media clip for longer than a threshold period of time.

Process 1800 begins by identifying (at 1805) media clips that are affected by the moving clip. As described above, the affected clips are those clips that the media-editing application moves as a result of having moved the moving piece to its new location. As shown at stage 1901 in FIG. 19, the media clip F has moved to a new location such that the media clip F partially overlaps the media clip E in the timeline 1900. Since the media-editing application of some embodiments does not allow two anchored clips to overlap each other within one anchor lane, the media-editing application moves the media clip E to another location in the timeline 1900. As such, the media clip E is a media clip affected by the movement of the media clip F. The media clip D is not affected because it does not have to move. The height of the media clip D is larger than that of another media clip in the timeline 1900 because the media clip D has its audio and video portion visually separated in this example.

Process 1800 then selects (at 1810) next bottom clip. A bottom clip is a clip among the affected clips and the moving clip to be placed closest to the spine of the timeline. In some embodiments, the process finds the bottom clip using the lane numbers of the lanes that the affected media clips are occupying before the moving clip has moved. Lane numbers are described further below by reference to FIG. 33. At stage 1905 in FIG. 19, the media-editing application identifies the media clip F as the bottom clip. This is because the media clip E will be moved to another anchor lane above the lane that the media clip E currently occupies. As described above, an anchored media clip retains its temporal position relative to a media clip in the spine to which the anchored clip is anchored. Thus, in order to retain that relative temporal position of the media clip E with respect to the media clip B and to avoid overlapping the media clip E with the media clip F, the media-editing application of some embodiments moves the media clip E into another anchor lane. The media-editing application does not move the media clip E closer to the spine 1901 because the media clip D is already occupying part of the space below the media clip E.

Process 1800 then defines (at 1815) available spaces to place the bottom clip. In some embodiments, the process first defines all available spaces based on the positions of the side edges of the affected media clips and the moving media clip. For instance, as shown at stage 1910 in FIG. 19, the media-editing application defines rectangular space 1911 (depicted as a dotted rectangle) bounded by the horizontal position of the left edge of the media clip E and the horizontal position of the right edge of the media clip D. The media-editing application defines rectangular space 1912 (depicted as a dotted rectangle) bounded by the horizontal position of the right edge of the media clip D. At stage 1915, the media-editing application divides the 1911 space 1911 into two spaces 1915 and 1916 based on the horizontal position of the left edge of the media clip F. The media-editing application defines these spaces 1911, 1912, 1915, and 1916 in order to find an anchor lane that is closest to the spine 1901 and that can include the entire length of the media clip F (i.e., the current bottom clip) without moving the media clip F horizontally.

Next, process 1800 finds (at 1820) a location in which to place the current bottom clip and places the current bottom clip at the location. In some embodiments, the process finds lowest possible horizontal span that can include the entire width of the current bottom clip. For instance, as shown at stage 1915 in FIG. 19, the space 1912 alone cannot contain the entire width of the media clip F horizontally. Together with the space 1916, the space 1912 can contain the entire width of the media clip F. As shown, the space 1916 is above the media clip D. Thus, the media-editing application places the media clip F above the media clip D.

Process 1800 then determines (at 1825) whether all clips that need to be placed have been placed. That is, the process determines whether all of the affected clips as well as the moving clip have been placed in the timeline. When the process determines (at 1825) that there are more clips to place, the process loops back to 1810 to select the next bottom clip to place. Otherwise, the process ends. As shown at stage 1920 in FIG. 19, the media editing application has not placed the media clip E yet. The media-editing application defines the space 1915 and a space 1921. The space 1921 is defined above the media clip F and bounded by the both side edges of the media clip F.

At stage 1925 in FIG. 19, the media-editing application divides the space 1921 into spaces 1926 and 1927 based on the horizontal position of the right edge of the media clip E. As shown, the space 1915 alone cannot contain the entire width of the media clip E horizontally. Together with the space 1926, the space 1915 can contain the entire width of the media clip F. As shown, the space 1926 is above the media clip F. Thus, at stage 1930, the media-editing application places the media clip E above the media clip F.

One of ordinary skill in the art will recognize that process 1800 is a conceptual representation of the operations used to arrange the media clips in a timeline as one of media clip is being moved within a timeline. The specific operations of process 1800 may not be performed in the exact order shown and described. The specific operations may not be performed in one continuous series of operations, and different specific operations may be performed in different embodiments. Furthermore, the process could be implemented using several sub-processes, or as part of a larger macro process.

III. Live Edit

Figure 20:
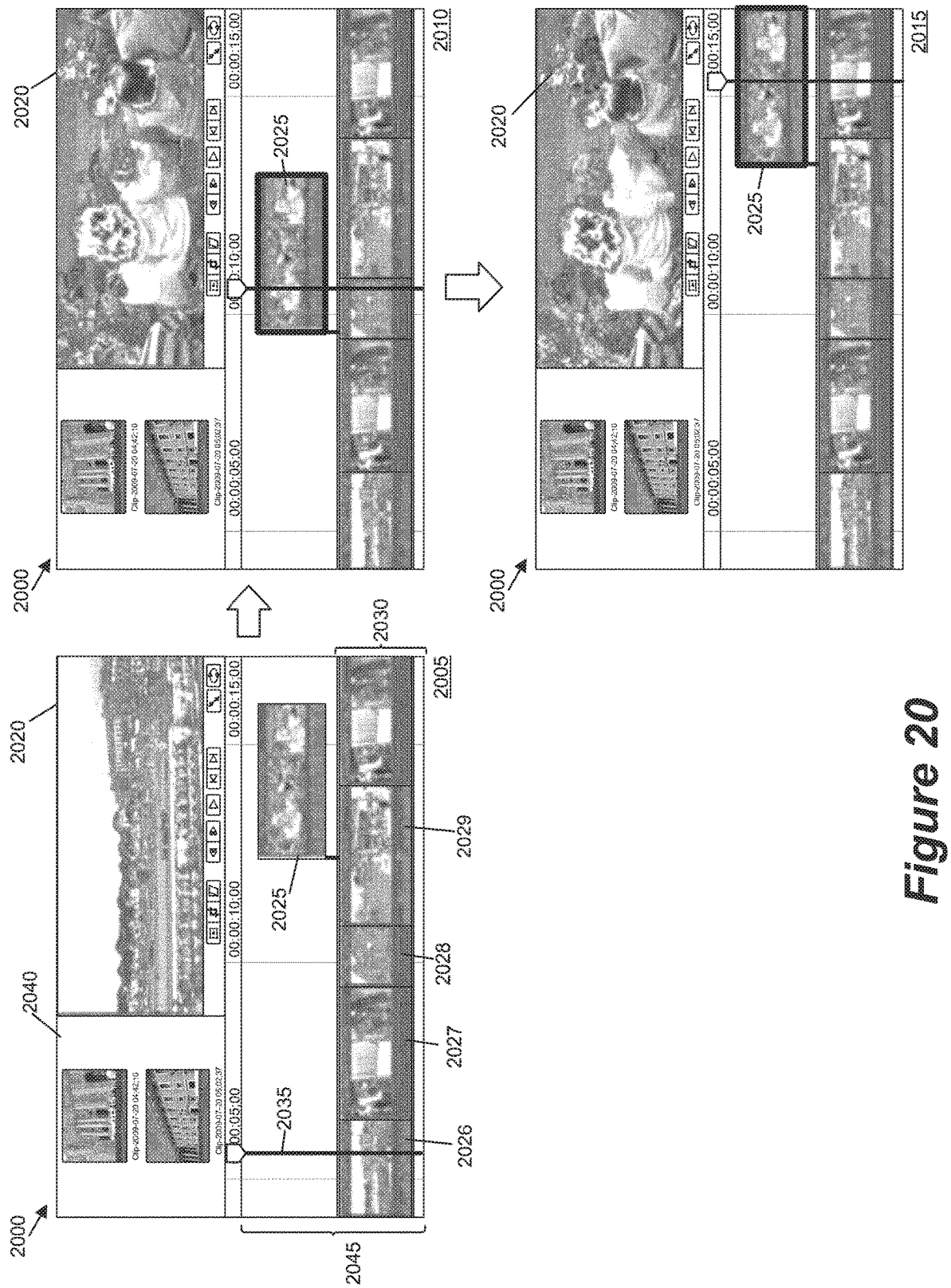
FIG. 20 conceptually illustrates a GUI of a media-editing application that displays results of editing operations in the preview display area as the editing operations are being performed.

FIG. 20 conceptually illustrates a GUI 2000 of a media-editing application that displays the results of editing operations in a viewer 2020 as the editing operations are being performed. Specifically, FIG. 20 illustrates the GUI 2000 in three different stages 2005-2015 as a user of the application moves an anchored clip 2025 along a timeline 2030 such that it intersects with the playhead that is moving through the timeline. The GUI 2000 is similar to the GUI 100 described above by reference to FIG. 1 in that the GUI 2000 includes a clip browser 2040, a viewer 2020, and a timeline 2030 which are similar to the clip browser 110, the timeline 115, and the viewer 110, respectively.

The media-editing application of some embodiments allows the user to edit a media presentation by moving a media clip from one location to another location within a timeline or from an area out of the timeline into the timeline. For instance, the user can drag a media clip from the clip browser 2040 into a central compositing lane 2045 or into an anchor lane. Some embodiments show the composite result of the editing operation performed by moving media clips as the operations are being performed. More specifically, the media-editing application of some embodiments displays a composite image represented by a point along the timeline 2030 in the viewer 2020 as the playhead 2035 moves to the point that intersects with a media clip that is being moved.

As the playhead 2035 moves along the timeline 2030 (i.e., as the media-editing application playbacks the media presentation), the media-editing application displays a composite frame of the media presentation represented by a point along the timeline 2030 at which the playhead is positioned currently. When any part of a media clip occupies a point along the timeline 2030 at the moment the playhead 2035 is passing the point, the media-editing application will factor that media clip into the composite image displayed for that point. When a media clip is in an anchor lane above the central compositing lane, the output image will be that of the anchor lane (unless there is a blend operation defined between the two frames).

In the first stage 2005, the timeline 2030 displays an anchored media clip 2025 and media clips 2026-2029 within the central compositing lane 2045. At this point, the media-editing application is playing back the media presentation and thus the playhead 2035 is moving to the right through the timeline 2030. The playhead 2035 currently is in the middle of the media clip 2026, and thus the preview display area 2020 displays an image of the media clip 2026 that corresponds to the portion of the media clip at which the playhead is currently located.

In the second stage 2010, the user has selected the media clip 2025 and is dragging the media clip 2025 to the left such that the playhead that is moving to the right intersects with the media clip 2025. Because the clip 2025 is in the anchor lane, the preview display area 2020 displays the image from this clip, rather than media clip 2028 in the central compositing lane. At this point, the playhead 2035 is continuing to move to the right to play the presentation. In some embodiments, as soon as the playhead intersects the left edge (in-point) of clip 2025, the playback image displayed in the preview display area changes to that of the anchored clip 2025.

In the third stage 2015, the user is dragging the media clip 2025 to the right along with the playhead 2035. As in the stage 2010, the media-editing application displays a frame from the media clip 2025 in the preview display area 2020. This is a different frame than shown at stage 2010, as the playhead is located over a different portion of the clip 2025. In theory, a user could drag the anchored clip to the right at the same rate as the playhead, and have the same image displayed in the preview display area.

The media clip 2025, therefore, has been moved back and forth along the timeline 2030 as shown in the stages 2010-2015. As the clip 2025 has been moving back and forth, the primary playhead has intersected with different parts of the clip 2025 at different points along the timeline 2030. The media-editing application has been reflecting the composite frames resulted from these intersections caused by the movement of the media clip 2025.

Figure 21:
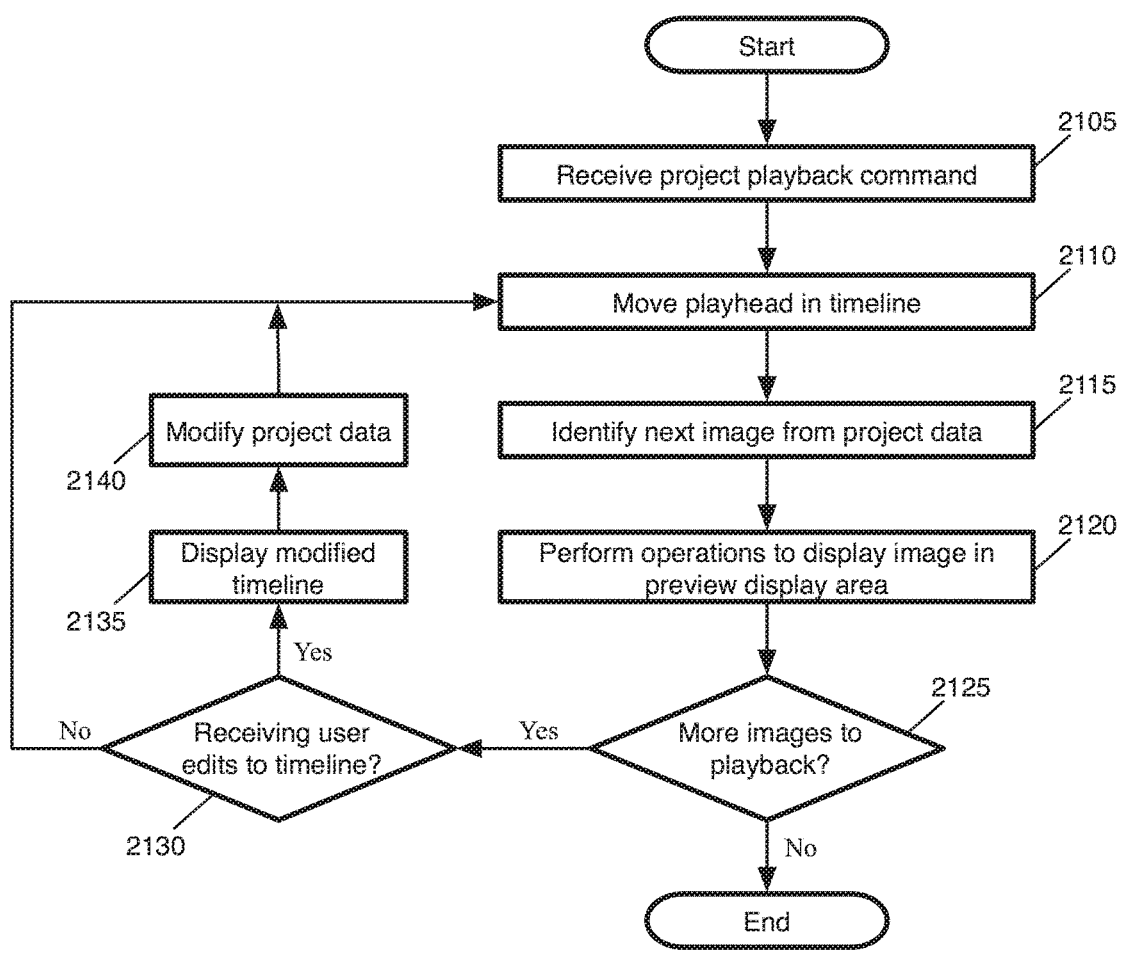
FIG. 21 conceptually illustrates a process for incorporating edits into playback of a video sequence in real-time.

FIG. 21 conceptually illustrates a process 2100 for incorporating edits into playback of a video sequence in real-time. As shown, the process 2100 begins by receiving (at 2105) a project playback command. In some embodiments, the user commands the media-editing application to play back the contents of the timeline. The playback may start at the current location of the playhead in the timeline, or at the beginning of the project (i.e., time=0).

The process moves (at 2110) the playhead in the timeline. The media-editing application displays the movement of the playhead at a rate representative of real-time. That is, in a particular amount of actual time, the playhead moves over a portion of the timeline representative of that particular amount of time. In this process, the operation 2110 indicates a movement of one image (i.e., $1/24^{th}$ of a second for 24 fps video) in the timeline.

The process also identifies (at 2115) the next image from the project data. In some embodiments, the project data is kept up to date with updates to the project as the user modifies the clips in the project. When playing back a project (i.e., a media presentation), the application makes sure that the image being displayed is the correct image for the most up-to-date version of the project data. In some embodiments, when the project data changes, the process receives an indication that this change has been made and retrieves the new project data. These changes may include movement of clips in the timeline, adding clips to the timeline, removing clips from the timeline, adding effects to clips, etc.

With the image identified, the process 2100 performs (at 2120) operations required to display the image in the preview display area. This may involve a disk read operation, decode operation, any graphics processing operations to generate a proper format image or combine images, etc. In some embodiments, the image will have already been generated by a background rendering process or by pre-rendering during playback and at this stage the application just reads the generated image (e.g., from memory) and outputs the image.

The process then determines (at 2125) whether any more images need to be played back. If the user pauses the playback, then (at least temporarily) the application can cease outputting images. In addition, if the playhead reaches the end of the timeline, then playback will cease unless the user has set the application to playback the timeline in a continuous loop. When no more images remain, the process 2100 ends.

When additional images remain, the process determines (at 2130) whether any user edits to the timeline are being received. These edits may be the addition of effects, transitions, titles, etc., the movement of clips, trimming of clips, removal of clips, or other edits that affect the project displayed in the timeline.

When no such edits are received, the process returns directly to 2110 to move the playhead and identify the next image. However, when edits are received, the process displays (at 2135) a modified timeline and modifies (at 2140) the project data. The modified display may involve the movement of a clip, the indication of an effect, etc. With the modification performed, the process proceeds to 2110 to move the playhead and identify the next image.

IV. Editing Tools

A. Multi-track Editing

Figure 22:
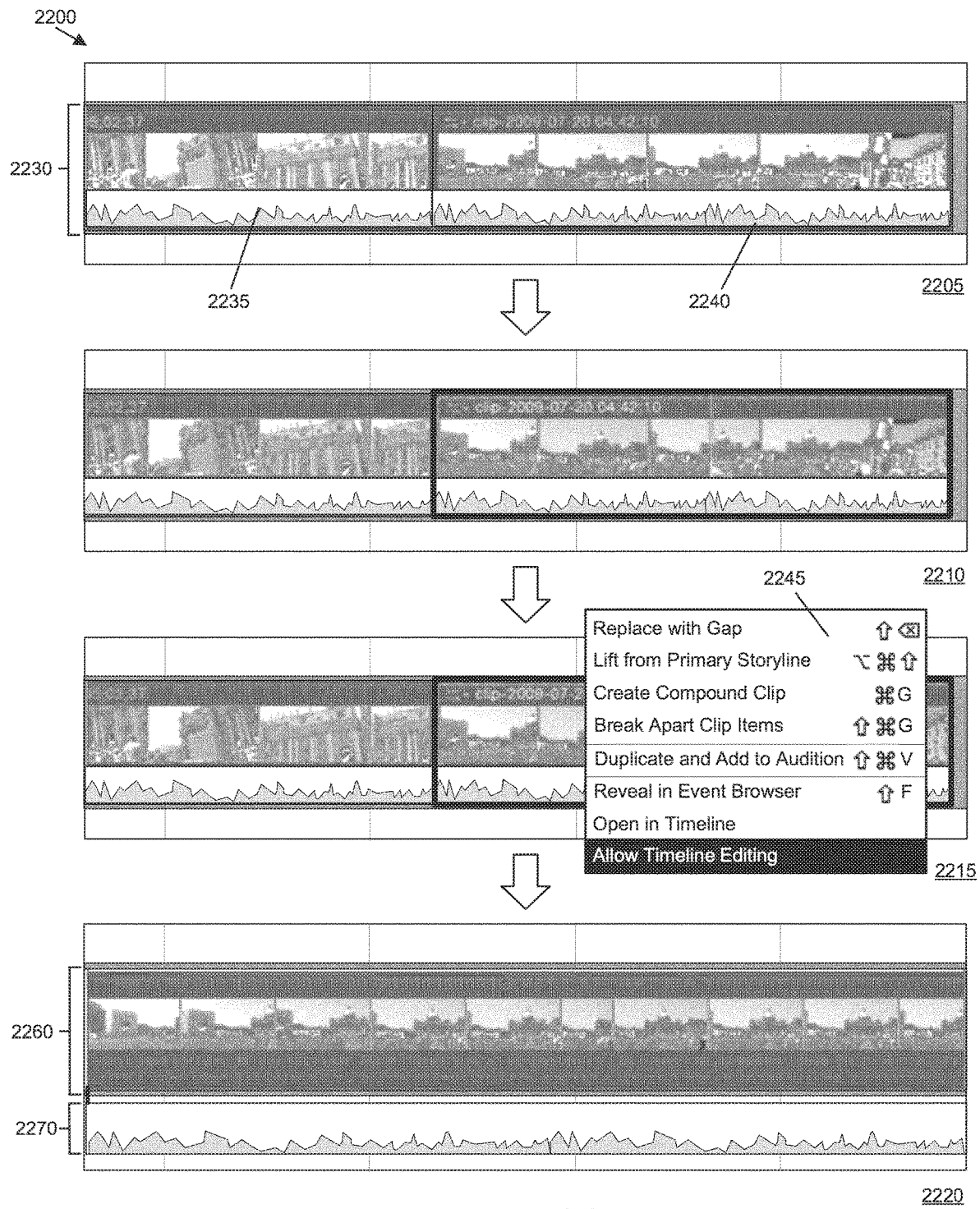
FIG. 22 conceptually illustrates an in-line multi-tracked editing tool for a timeline of a media-editing application.

FIG. 22 conceptually illustrates an in-line multi-tracked editing tool for a timeline of a media-editing application. Specifically, this figure illustrates in four different stages 2205-2220 to show activating the in-line multi-tracked editing tool in a timeline 2200. The timeline 2200 is similar to the timeline 115 described above by reference to FIG. 1.

As described above, a media clip in some embodiments include different types of media content. For instance, an audio and video clip has both video and audio content. In some such embodiments, a media clip includes different "tracks" for each type of media content. For instance, an audio content of an audio clip may include several tracks for several audio channels. Likewise, a video content of a video clip may include several tracks for a foreground video and a background video.

The media-editing application of some embodiments provides a multi-tracked editing tool. This multi-track editing tool is an in-line tool. That is, the media-editing application opens this multi-tracked editing tool within the timeline 2200 in some embodiments. This multi-tracked editing tool opens different tracks contained in a media clip in different lanes to allow the user to edit individual tracks of the media clip independently. In some embodiments, the multi-tracked editing tool opens different tracks of a media clip in a central compositing lane and a set of anchor lanes. Each lane will include a track of a media clip in these embodiments. In some embodiments, the media-editing application does not display in the tool any other media clips that were displayed in the timeline before the tool was opened.

The first stage 2205 shows the timeline 2200 before the media-editing application opens a multi-tracked editing tool for a media clip. As shown, the central compositing lane 2230 displays two media clips 2235 and 2240. The second stage 2210 illustrates the selection of the media clip that the user of the media-editing application wants to edit with the multi-tracked editing tool. The user selects a media clip through a cursor click operation, through a keystroke, through a selection from a pull-down menu. The user has selected the media clip 2240 in the timeline 2200.

In the third stage 2215, the media-editing application displays a drop-down menu 2245 that includes a selectable item which, when selected, will cause the media-editing application to display the multi-tracked editing tool for editing the selected media clip 2240. The user selects (e.g., by a click operation) the item. The fourth stage 2220 illustrates that upon receiving the selection, the media-editing application opens up the selected media clip 2240 in the in-line multi-tracked editing tool. As shown, the lanes 2260 and 2270 display the individual video and audio tracks that make up the media clip 2240.

B. Precision Editor

Figure 23:
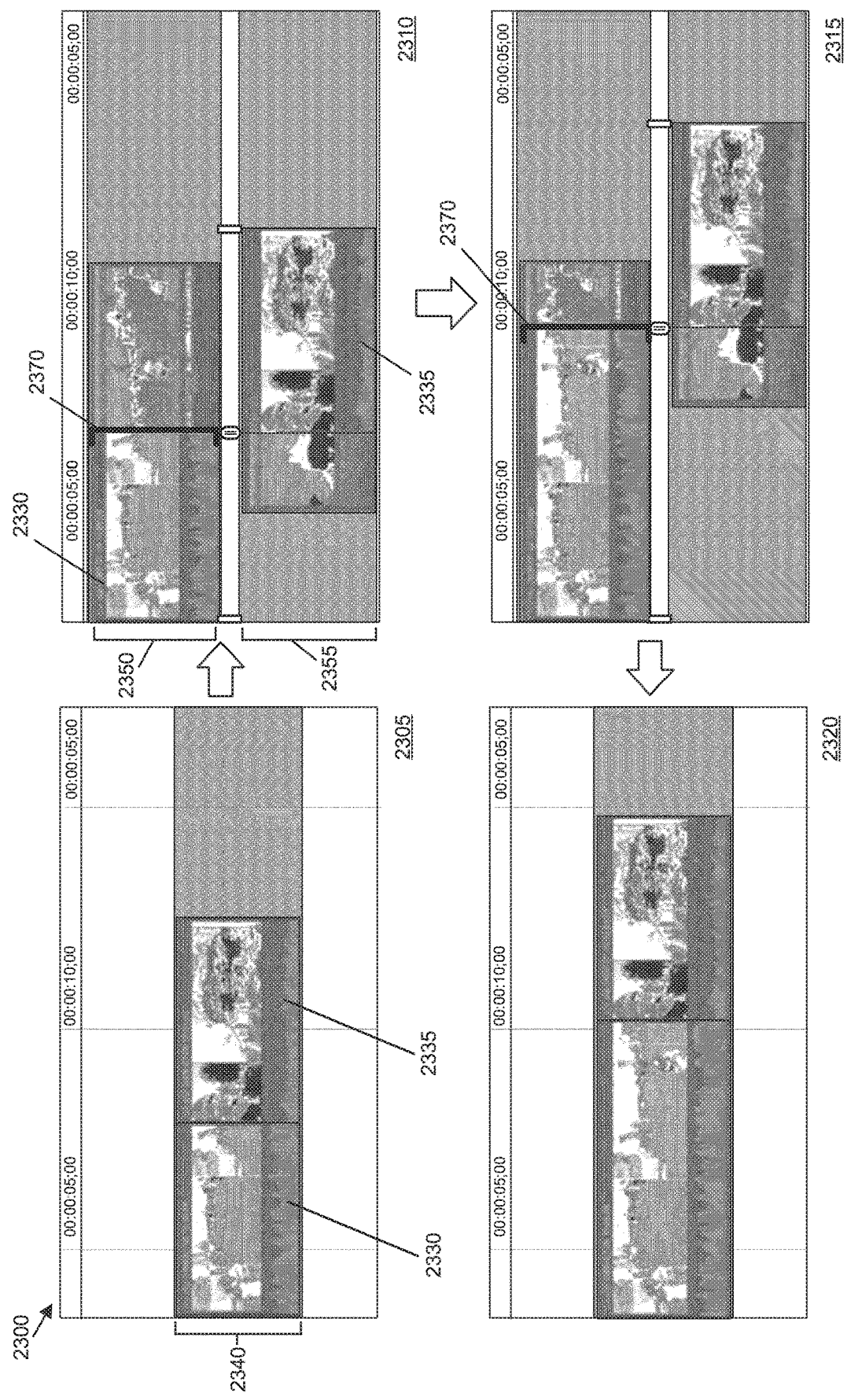
FIG. 23 conceptually illustrates an example of an in-line precision editing tool for a timeline of a media-editing application.

FIG. 23 conceptually illustrates an example of an in-line precision editing tool for a timeline of a media-editing application. Specifically, this figure illustrates a timeline 2300 five different stages 2305-2320 to show the modification of the transition point between media clips 2332 and 2334 in a timeline 2300 using a precision editing tool of some embodiments. The timeline 2300 is similar to the timeline 115 described above by reference to FIG. 1.

The media-editing application of some embodiments provides a precision editing tool that allows a user of the application to modify the point at which one clip transitions into the next, trimming or extending frames at the end of one clip and at the beginning of the next clip in the same magnified view. The precision editing tool in some embodiments displays both clips on either side of a transition such that the unused frames (i.e., available media content of the source media files) from both clips. In this manner, the precision editing tool displays how the edits affect the transition from one clip to the next. In some embodiments, this precision editing tool is an in-line tool. That is, the media-editing application opens this multi-tracked editing tool within the timeline 2300.

The first stage 2305 shows the timeline 2300 before the user performs a transition modification operation between two media clips 2330 and 2335 using a precision editing tool. The timeline 2300 displays media clips 2330 and 2335 in the central compositing lane 2340.

The second stage 2310 shows the activation of the precision editing tool in the timeline 2300. The media-editing application provides various ways to activate the tool. For instance, the user may click a point along the timeline where two media clips 2330 and 2335 meet. In some embodiments, the user of the media-editing application may activate the precision editing tool by a selection on a pull-down menu, by a keystroke, and a selection from a pop-up menu, etc. after selecting the adjacent edges of the two media clips. As shown, the media-editing application splits the central compositing lane 2340 into two lanes 2350 and 2355.

The top lane 2350 displays the outgoing media clip 2330 as well as the additional media content beyond the out-point of the media clip 2330. As described above, the additional media content beyond the out-point of a media clip is in the source media clip of the media clip. The media-editing application displays a vertical line at the current out-point of the media clip 2330 as shown. The vertical line separates the media clip 2330 and the additional media content.

The bottom lane 2355 displays the incoming media clip 2335 as well as the additional media content beyond the in-point of the media clip 2335. The media-editing application displays a vertical line at the current in-point of the media clip 2335. The vertical line separates the media clip 2335 and the additional media content. The vertical line in the bottom lane 2355 and the vertical line in the top lane are the same vertical line in some embodiments as shown. The user has also selected (e.g., by a click operation) the out-point of the outgoing media clip 2330 to push out the out-point and include more frames in the media clip. The media-editing application highlights the bracket 2370 to indicate the selection of the out-point of the media clip 2330.

The third stage 2315 shows the movement of the edge 2370 that adds frames at the end of the outgoing media clip 2330. The user pushes out the out-point of the media clip 2330 by dragging the edge 2370 of the media clip 2330 to the right to include additional frames to the media clip 2330 from the source media clip. The vertical line that separates the media clip 2330 and the additional media content has moved to further right from the position where it was in the second stage 2315. The media-editing application has also moved the outgoing media clip 2335 and its additional available media content to the right along with the vertical line as the vertical line is moved to the right. The position of the vertical line with respect to the media clip 2335 and the additional content for the clip 2335 did not change to indicate that the in-point of the media clip 2335 did not change.

The fourth stage 2320 shows that upon the user's completion in adjusting the transition point between two media clips using the precision editing tool, the top track and the bottom track collapse back into one central compositing lane 2340. The user may indicate his completion in editing the transition point by double clicking on the screen, making a selection on a pull-down menu, entering a keystroke, etc. As shown, the top and bottom tracks 2350 and 2355 have collapsed back into the central compositing lane 2340 for one continuous composite presentation upon the user's signal. The central compositing lane the media clips 2330 and 2330 in such a way to reflect the edit that was made through the precision editing tool. That is, the media clip 2340 has been extended and the media clip has rippled (i.e., pushed to the right along the timeline 2300)

Figure 24:
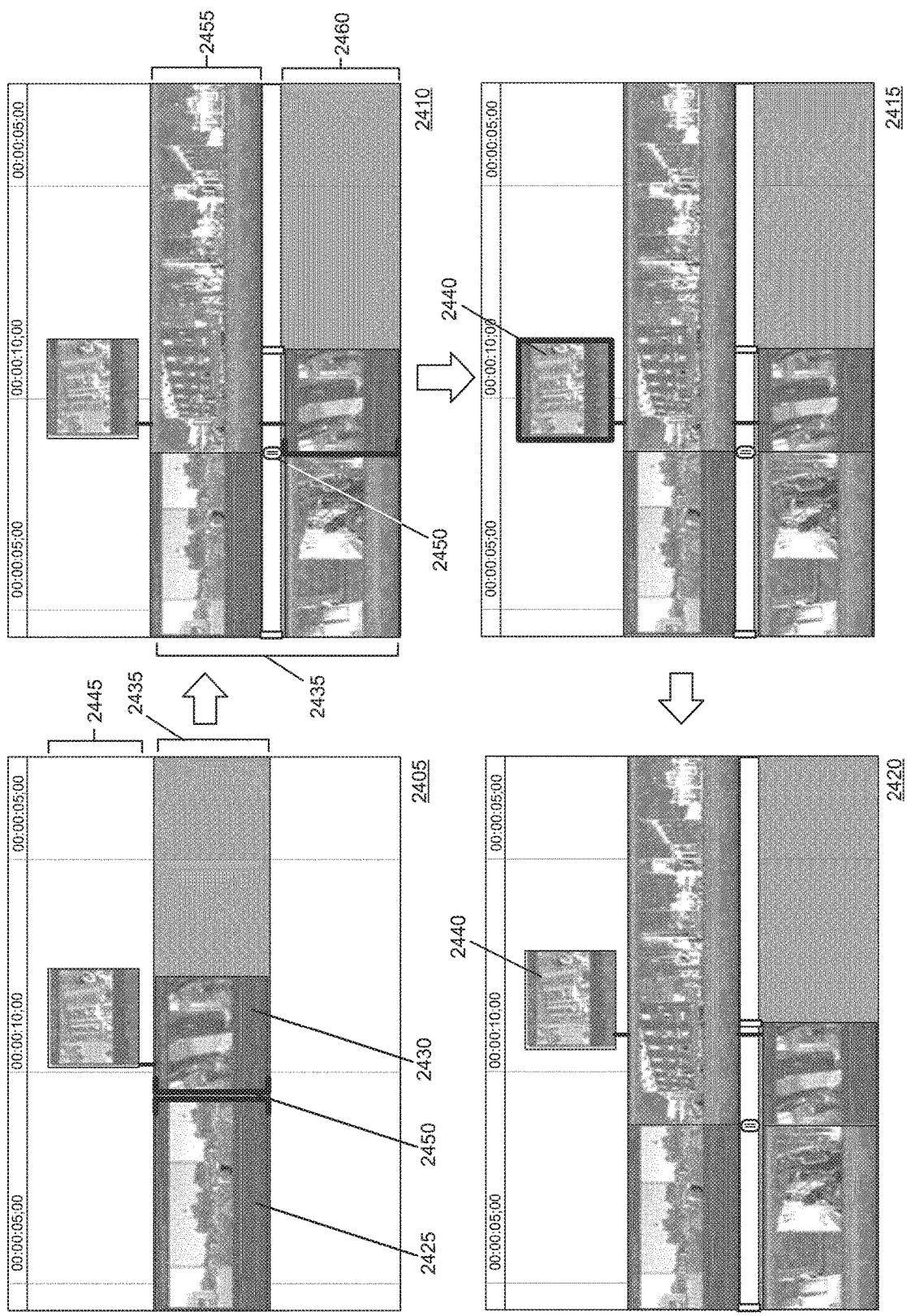
FIG. 24 illustrates an example of the movement of an anchored clip in the middle of a transition modification operation.

FIG. 24 illustrates an example of the movement of an anchored clip in the middle of a transition modification operation (i.e., while the precision editing tool is in operation). Specifically, this figure illustrates a timeline 2400 in four different stages 2405-2420 that the media-editing application allows the user to move an anchored clip that is anchored to a media clip displayed in the precision editing tool. The timeline 2400 is similar to the timeline 2300 described above in FIG. 23.

As described above, a central compositing lane splits into two lanes (i.e., a top lane and a bottom lane) at the point of transition between two clips to allow the user to trim or extend the two media clips. In some embodiments, the media-editing application displays anchor lanes when any exists and allows the user to edit any anchored clips in the displayed anchored lanes.

The first stage 2405 shows the timeline 2400 before the user performs a transition modification operation between two media clips. The timeline 2400 displays two media clips 2425 and 2430 in the central compositing lane 2435 and an anchored clip 2440 in an anchor lane 2445. The user selects (e.g., by a click operation) the neighboring edges of the media clips 2425 and 2430 as indicated by the highlighted brackets. A user of the media-editing application may select the neighboring edges (i.e., the edit point 2450) by hovering the cursor at the transition point, by performing a keystroke, etc.

In the second stage 2410, the media-editing application activates the precision editing tool. The media-editing application splits the central compositing lane 2435 of the timeline 2400 into two lanes 2455 and 2460.

The third stage 2415 illustrates a selection of the anchored clip 2440 while the precision editing tool is in operation. The user selects the anchored clip by performing a cursor controller operation, by performing a keyboard operation, by selecting through a pull-down menu, etc. The media-editing application highlights the border to indicate the selection of the anchored clip 2440 in the anchor lane 2445.

The fourth stage 2420 illustrates a movement of the anchored clip while the precision editor is still in operation. The user moves the anchored clip 2440 by dragging the selected clip across the anchor lane, by incrementing the position of the anchored clip using numeric entry, by keystroke, etc.

C. Editing Tools for Transition

Figure 25:
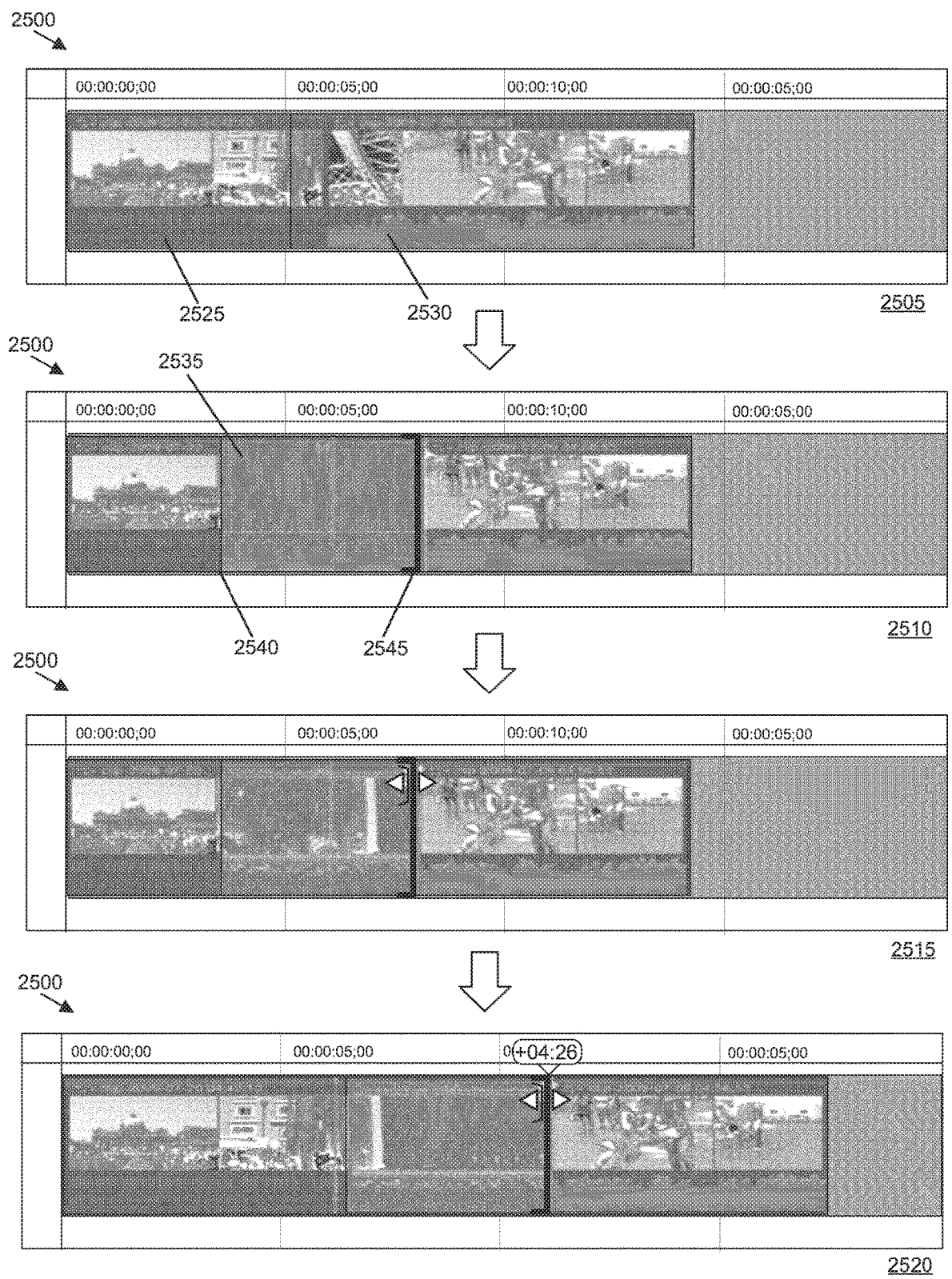
FIG. 25 illustrates an example of adjusting a transition between two media clips in a timeline of a media-editing application.

FIG. 25 illustrates an example of adjusting a transition between two media clips in a timeline 2500 of a media-editing application. Specifically, this figure illustrates the timeline 2500 in four different stages 2505-2520 to show that the timeline displays a transition that becomes transparent as the transition is being adjusted. FIG. 25 illustrates media clips 2525 and 2530 and a transition 2535. The timeline 2500 is similar to the timeline 115 described above by reference to FIG. 1.

A transition effect is an effect used to impact the transition from one media clip of a media presentation to the next media clip. There are many types of transition effects well known in the art. A common type of transition effect is a fade-out effect where the content of the outgoing media clip (i.e., the first clip of the two consecutive clips) gradually fades out as the content of the incoming media clip (i.e., the second clip of the two clips) gradually fades in.

To apply a transition effect between two adjacent media clips, both media clips must have additional media content that overlap past the edit point in some embodiments. That is, the incoming media clip has to have media content before its in-point and the outgoing media clip has to have media content beyond its out-point. The media-editing application uses these additional media contents to show the transitional effect instead of an abrupt cut between the two media clips. In the case of a fade-out, the additional media content of the incoming media clip starts to fade in before the clip's in-point (i.e., before the outgoing clip's out-point). Likewise, the additional media content of the outgoing media clip keeps fading out beyond the clip's out-point (i.e., beyond the incoming clip's in-point).

The timeline 2500 in some embodiments displays a transition as a rectangle between two media clips as shown in the second stage 2510 of this figure. In some embodiments, the media-editing application allows the user of the media-editing application to adjust the transition by manipulating the rectangle. For instance, the media-editing application allows the user to grab either side edges of the rectangle to adjust the points in time at which the incoming media clip starts to fade in or the outgoing media clip finishes fading out. The media-editing application may also allow the user to perform a rolling edit (i.e., adjusting the in-point of the incoming clip and the out-point of the outgoing media clip at the same time) by grabbing and dragging a middle portion of the rectangle.

When a transition is applied between two consecutive media clips, the media-editing application in some embodiments covers portions of the two media clips with the rectangle such that the covered portions are not visible in the timeline 2500. In some such embodiments, the media-editing application displays the rectangle transparently such that each of the two media clips is affected when the transition effect is adjusted. The media-editing application determines whether one or both of the two media clips should be made visible as well as which of the two media clips should be made visible. The media-editing application determines this based on the position within the transition effect 2535 on which the user performs a click operation. For instance, when the user selects the right side edge of the transition 2535 to move it, the timeline 2500 displays the transition 2535 transparently so that the audio and video portions of the incoming media clip are visible to the user as shown in the third stage 2515 of this figure. When the user selects the left side edge of the transition 2535 to move it, the timeline 2500 makes the audio and video portions of the outgoing media visible through the transition 2535. When the user selects a middle portion of the 2535, the timeline 2500 makes the audio and video portions of both media clips to show the edit point between the two clips. The timeline 2500 may also provide a set of key commands to allow the user to make the transition transparent.

In the first stage 2505, the timeline 2500 displays the media clips 2525 and 2530. The user may select these two clips to apply a transition effect between them. The user selects these two clips and a transition effect to apply between them in many different ways that the media-editing application provides. For instance, the user may select these two clips via click operations and select a fade-out from a drop-down menu.

In the second stage 2510, the user places a transition effect (e.g., a fade-out) that the user has selected between the media clips 2525 and 2530. The user selects the right edge 2545 of the transition effect 2535 by a click operation. The timeline 2500 in some embodiments highlights the right edge 2545 of the transition to indicate the selection.

In the third stage 2515, the user starts to drag the selected edge 2545 of the transition to the right. The timeline 2500 displays the transition 2535 transparently and makes the video portion of the media clip 2525 visible through the transition 2535. In the fourth stage 2520, the user has dragged the right edge 2545 of the transition further to the right and the video portion of the media clip 2525 shows the frames from the additional media beyond the initial in-point of the media clip.

Figure 26:
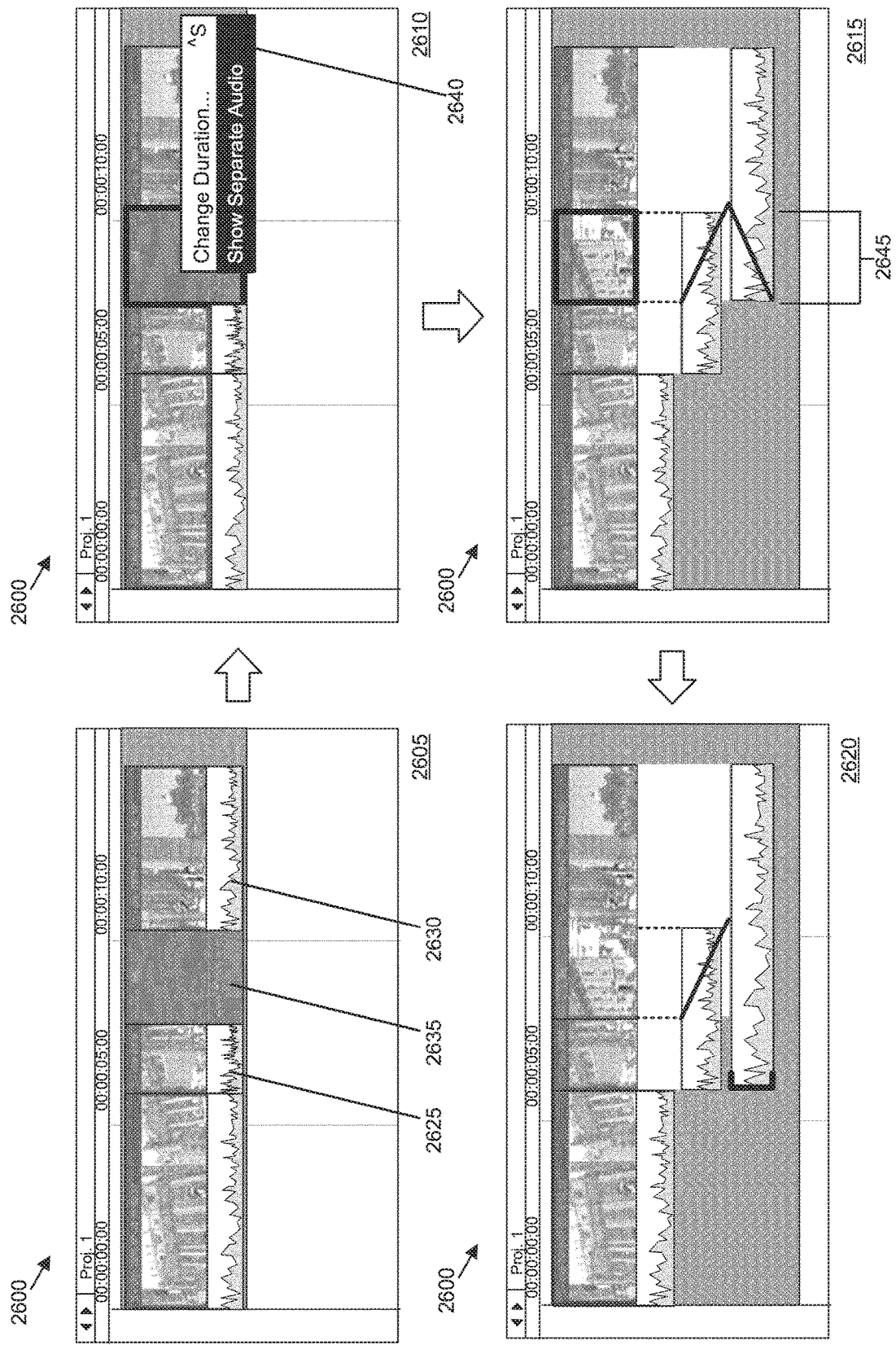
FIG. 26 illustrates an example of adjusting a transition between two media clips in a timeline of a media-editing application.

FIG. 26 illustrates an example of adjusting a transition between two media clips in a timeline 2600 of a media-editing application. Specifically, this figure illustrates the timeline 2600 in four different stages 2605-2620 to show that the audio content and video content of the two media clips can be separately adjusted. FIG. 26 illustrates media clips 2625 and 2630 and a transition 2635. The timeline 2600 is similar to the timeline 115 described above by reference to FIG. 1.

As described above, a media clip in some embodiments contains one or more types of media content (e.g., audio, video, text, image, etc.). When a transition is applied between two adjacent media clips in the timeline 2600 of some embodiments, the media-editing application allows the user to adjust the transition such that the adjustment affects all types of media content that the two media clips have at the same time. For instance, the timeline 2600 allows the user to drag the right side edge of a transition to adjust the point in time at which both the audio and video content of the outgoing media clip finish fading out. In some such embodiments, the timeline 2600 also allows the user to adjust different types of media contents separately. For instance, the timeline 2600 allows the user to adjust the audio contents of the two media clips without affecting the video contents of the two clips by manipulating the audio portions of the representations of the two media clips in the timeline 2600. Also, the timeline 2600 allows the user to adjust the video transition independently from the audio transition. For instance, the timeline 2600 allows to move the video portion of the transition 2635 along the timeline 2600 independently from the audio portion of the transition 2635. Furthermore, the timeline 2600 allows the user to adjust one or more types of media contents at the same time and without affecting the media clips' other contents.

In the first stage 2605, the timeline 2600 displays the media clips 2625 and 2630 along with another media clip before the media clip 2625. The user has also placed a transition 2635 between the media clips 2625 and 2630.

In the second stage 2610, the timeline 2600 displays a menu bar 2640 that appears when the user clicks on the transition 2635. The user selects an item that will result in displaying the audio portions of the two media clips separately from the video portions of the media clips. The timeline 2600 may provide numerous different ways of causing the timeline to display the audio portions separately. For instance, the timeline 2600 may provide hotkey commands that causes the timeline 2600 to display the audio portions separately.

In the third stage 2615, the timeline 2600 displays the audio portion of the media clip 2625 further away from the video portion of the media clip 2625. The timeline 2600 displays the audio portion of the media clip 2630 away from the video portion of the media clip 2630 and below the audio portion of the media clip 2625. Parts of the audio portions span the same duration 2645 of the timeline 2600 to indicate that the audio content of the media clip 2625 is fading out over this duration and the audio content of the media clip 2630 is fading in over this duration. The diagonal lines that appear in the audio portion in some embodiments indicate that this fading effect currently applied to the audio contents of the two media clips are preset by the media-editing application. The media-editing application allows the user to select the video portion of the transition independently from the audio portions of the transition. For instance, the user can select (as indicated by the highlighted border of the video portion of the transition) and move to the left or to the right to adjust video transition.

In the fourth stage 2620, the user has dragged the left edge of the audio portion of the media clip 2630 to the left in order to make the audio content of the media clip 2630 starts to fade in at an earlier point in time than before. The timeline 2600 in some embodiments may also allow the user to adjust video portions of the two media clips by manipulating the transition 2635. For instance, the user can drag the transition 2635 to the left without affecting the audio portions of the two media clips in order to adjust the points in time at which the video contents of the two media clips start to fade in or finish fading out.

The media-editing application has removed the diagonal line for the audio portion of the media clip 2630. This indicates the fade-in effect is not governed by the preset pattern represented by the diagonal line. The user will have to apply a fade-in effect as the user desires using fade handles similar to the fade handles 221 and 222 described above by reference to FIG. 2.

D. Moving Clips while Trimming

Figure 27:
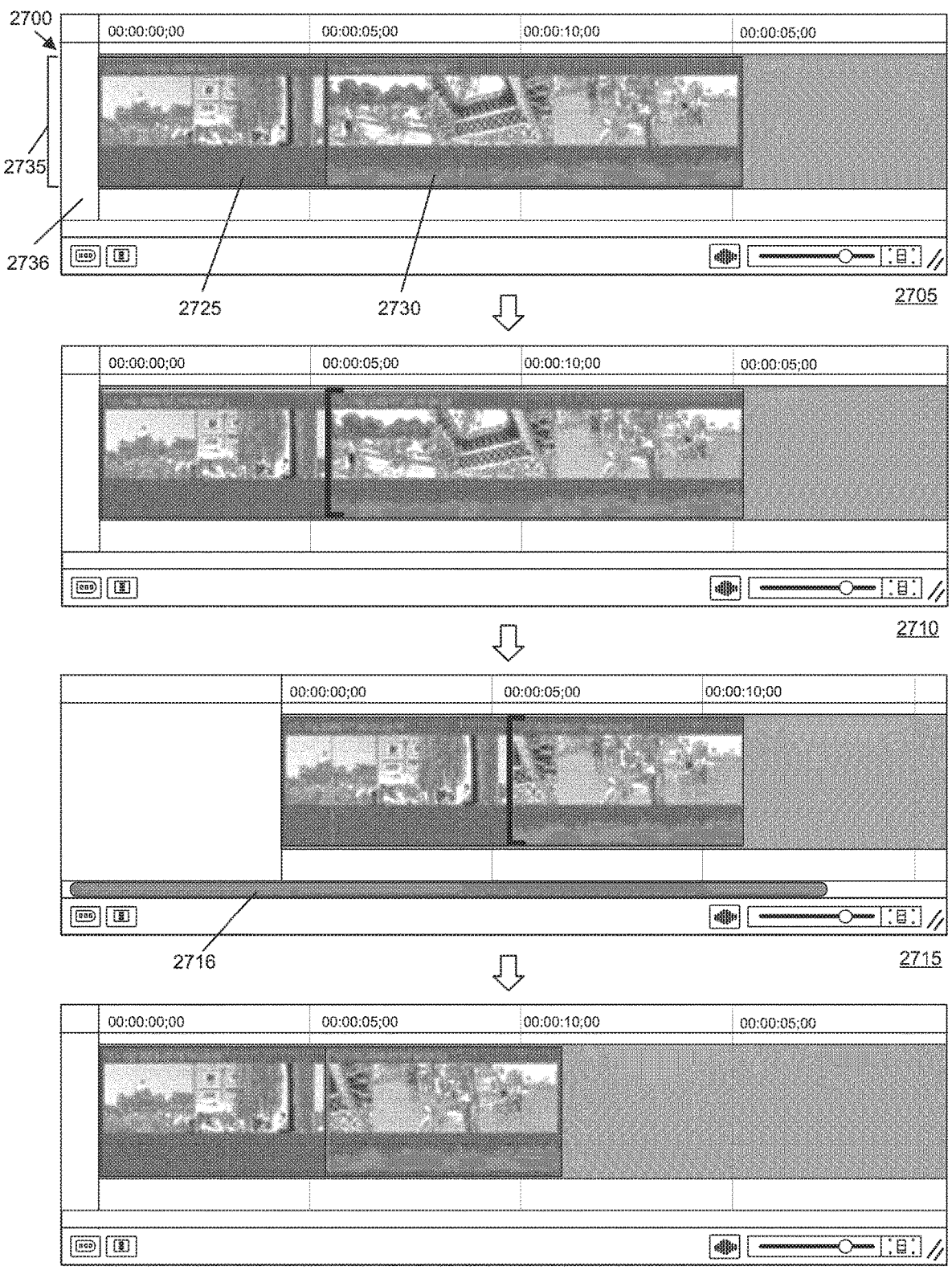
FIG. 27 illustrates expanding a space before the first media clip of a media presentation that is displayed in a timeline of a media-editing application.

FIG. 27 illustrates expanding a space before the first media clip of a media presentation that is displayed in a timeline 2700 of a media-editing application. Specifically, this figure illustrates the timeline 2700 four different stages 2705-2720 to show that a space before a media clip 2725 expands as the in-point of a media clip 2725 is pulled in to trim the media clip 2725 from its beginning. The timeline 2700 is similar to the timeline 115 described above by reference to FIG. 1.

When a media clip in the timeline 2700 of some embodiments is trimmed from its beginning (i.e., when the media clip's in-point is pulled in), the media-editing application moves the media clips that come after the media clip being trimmed to the left while leaving the media clips that come before the media clip being trimmed static. This results in an impression to the user that the media clip that is being trimmed is trimmed from its ending. That is, this gives an impression that the out-point of the media clip that is being trimmed is pulled in. To prevent such impression from occurring, some embodiments of the media application moves the media clips that come before the media clip being trimmed from its beginning to the right.

The first stage 2705 shows the timeline 2700 before the user performs a trimming operation to the media clip 2730 in the timeline 2700. The timeline 2700 displays the media clips 2725 and 2730 in the central compositing lane 2735. The timeline 2700 also displays a rectangular space 2736 before the beginning of the sequence of the two media clips (i.e., before the media clip 2725). The second stage 2710 illustrates the selection of the left edge of the media clip 2730 in the timeline 2700. The left edge of the media clip 2730 is the current in-point of this media clip 2730.

The third stage 2715 illustrates the shortening of the media clip 2730 as the user of the media-editing application moves the right edge towards the center of the media clip. As the right edge of the media clip moves towards the center of the media clip 2730, the media-editing application shortens the length of the media clip 2730 while leaving the right edge of the media clip 2730 static. Also, the media-editing application moves the media clip 2725 to the right and expands the space 2736 accordingly. In this manner, the media-editing application generates an impression that the media clip 2730 is trimmed from its beginning, not from its end. The fourth stage 2720 illustrates that, upon the performance of another operation, the media-editing application moves all media clips in the timeline 2730 to the left so as to contract the space 2736 to the length it originally had before the trimming operation initiated. In this example, the user has moved a scroll bar 2716 to the right.

V. Data Structures

In some embodiments, the media-editing application is an application that enables a user to create a composite media presentation from a set of media files. Through a graphical user interface (GUI) of the application, the user specifies the manner in which the media files are composited to create the composite presentation. In addition, through this GUI, the user can command the application to import one or more media files (e.g., from a camera, from an external drive, from an internal drive, etc.). Upon instructions from the user (i.e., through the media-editing application GUI) or as an automatic response to the detection of the media files in an external storage, the application copies the media files to a particular media storage location on a particular storage device. Some embodiments create a particular folder within the folder structure of the storage device for a set of imported media files (i.e., the media files imported at a particular time) and store a copy of the imported files in this particular folder at time of import.

When importing a media file, some embodiments create a media clip data structure for the imported media that links to the media file, any transcoded versions of the media file, and any analysis data about the media file. This media clip is the entity that is added to a media presentation in some embodiments in order to include the media file (or a portion of the media file) in the composite presentation. Some embodiments store this information in an asset data structure that specifically references the media and analysis files, and then additionally create a clip data structure that references the asset. In addition, the asset data structure may include metadata such as a UUID for the media file generated by the camera that captured the media, file format information, various video properties (e.g., frame rate, colorspace, pixel transform, dimensions, etc.), and various audio properties (e.g., channel count, track count, sample rate, etc.) of the media.

The references stored in the media clip (or asset) refer to the versions of the media file stored in the application's file storage. Some embodiments, for each set of imported media files, create separate folders for the original media and any type of transcoded media. In some embodiments, the transcoded media include both high-resolution and low-resolution encodes of the original media file that may be created on import or post-import.

In some embodiments, these references to the files are pointers to the locations of the files on the storage device. In some embodiments, the media-editing application initially sets the reference to the original media such that the data structure references the media file that is to be imported (e.g., the file on a camera) as the original media, then modifies this reference once the media file is copied to the application's file storage so that the data structure now references the media in the file storage. In some such embodiments, the application displays the media clips for the user to edit before the file is actually copied. This enables a user to begin creating a presentation using the media clip while the clip refers to a file stored on a camera, and then continue using the same clip once the file is copied with no interruption to the editing workflow.

Much like the folders for different versions of media files, some embodiments create separate folders within a folder for a set of imported files for each type of analysis file (e.g., a folder for person detection files, a folder for color balance files, a folder for shake detection files, etc.). In addition, some embodiments store additional clip data in the media clip, as opposed to a separate file. As one example, some embodiments store shake detection as a tag about the media file or a specific portion of the media file.

Figure 28:
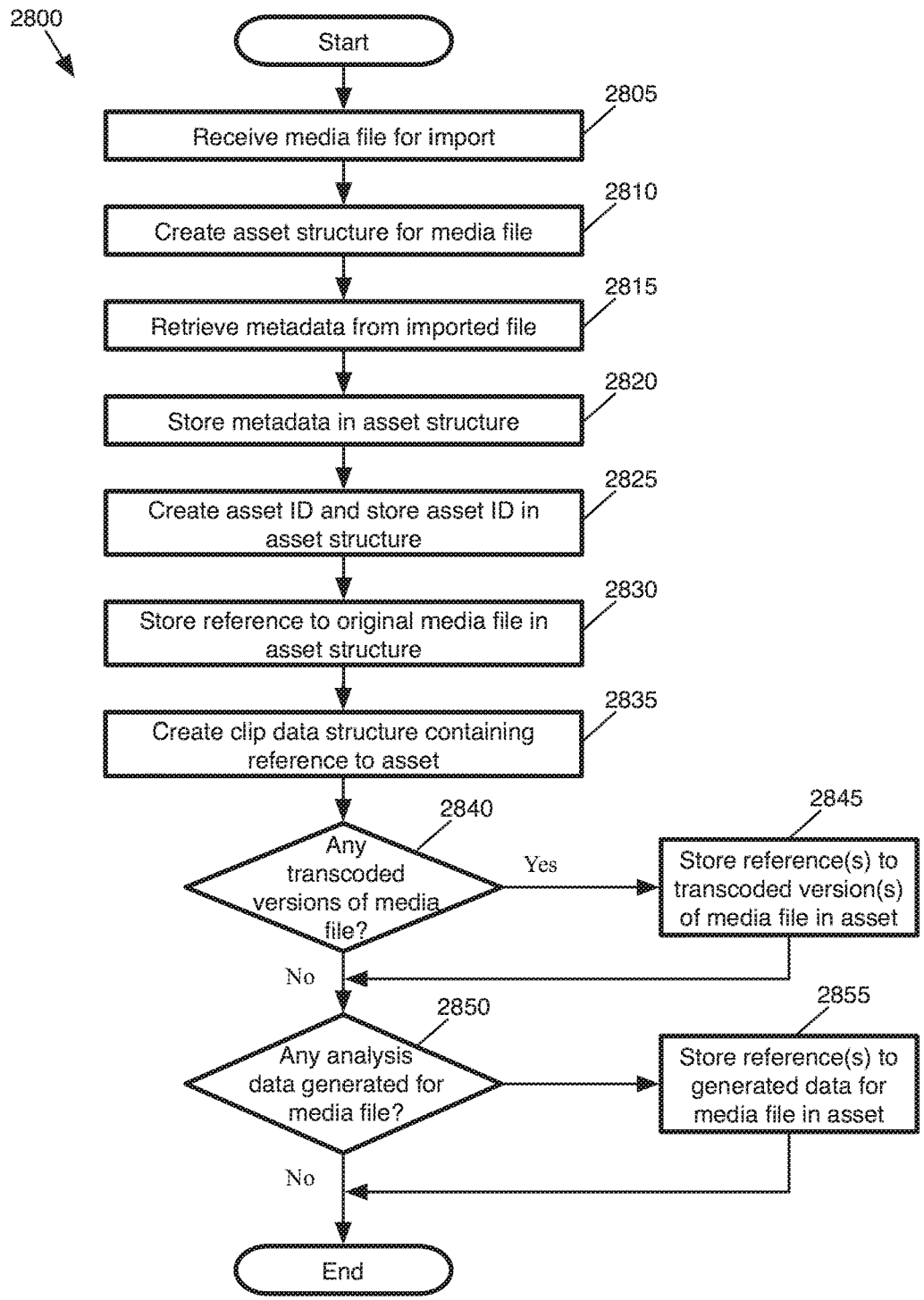
FIG. 28 conceptually illustrates a process of some embodiments for creating an asset data structure and a clip data structure referencing that asset.
Figure 29:
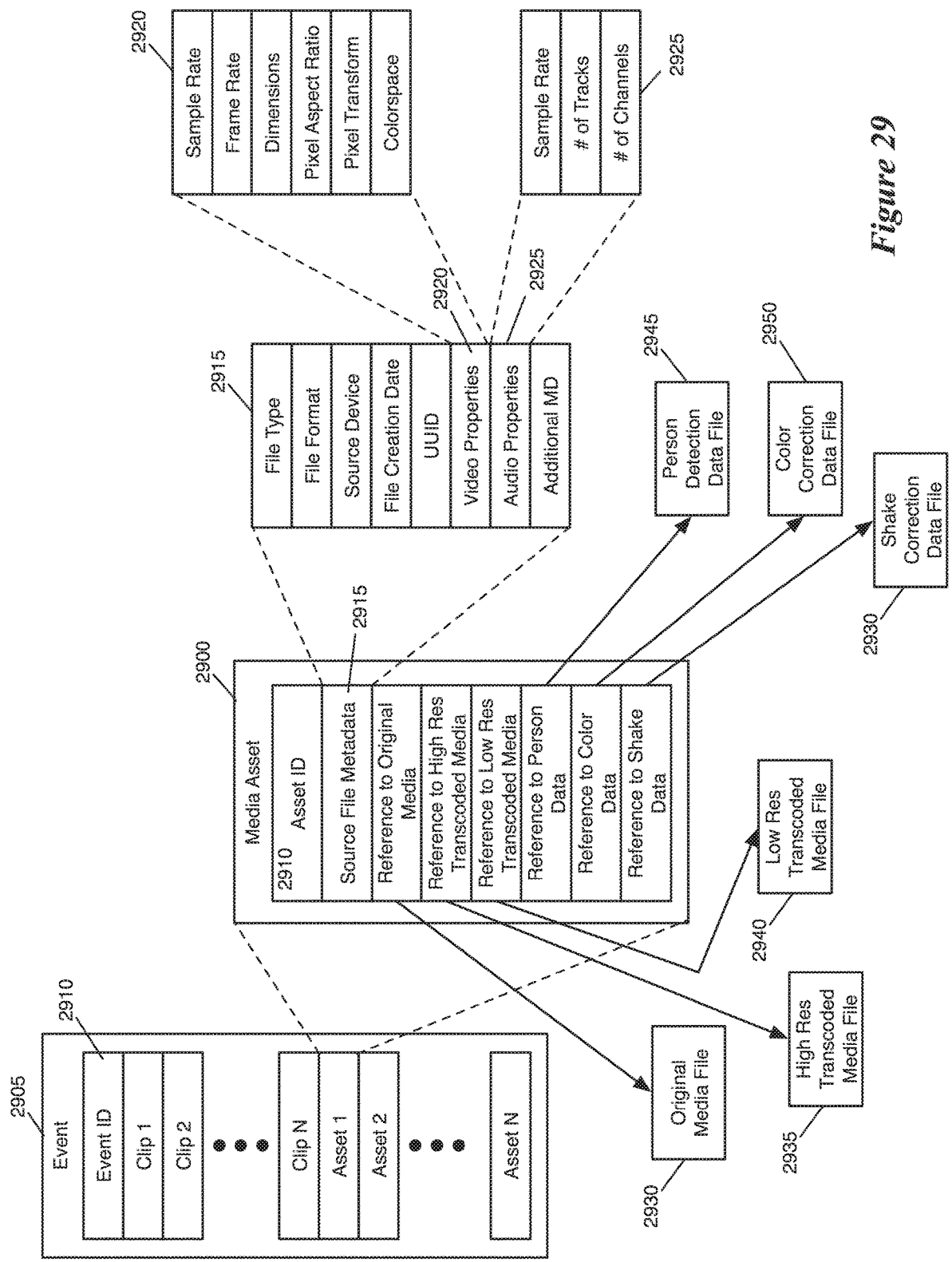
FIG. 29 conceptually illustrates an asset data structure for a video asset, as well as an event data structure for an event that contains the video asset.
Figure 31:
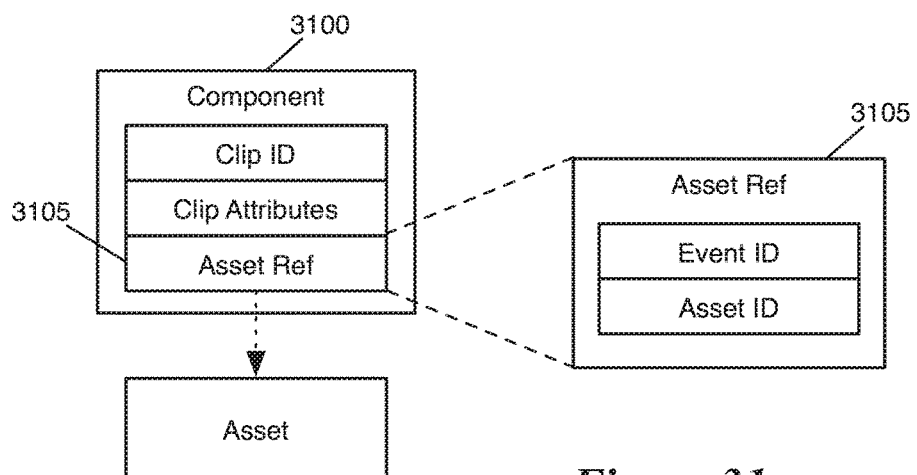
FIG. 31 conceptually illustrates a clip data structure that contains a single asset.

FIG. 28 conceptually illustrates a process 2800 of some embodiments for creating an asset data structure and a clip data structure referencing that asset. In some embodiments, process 2800 is performed as part of the import process of the media-editing application. The process 2800 will be described in part by reference to FIGS. 29 and 31. FIG. 29 conceptually illustrates an asset data structure 2900 for a video asset, as well as an event data structure 2905 for an event that contains the video asset. FIG. 31 conceptually illustrates a simplified clip data structure 3100 that contains a single asset.

As shown, the process begins by receiving (at 2805) a media file to import. The media file may be an audio file, a video file, or other type of media file. In the example shown in FIG. 29, the media file is a video file with audio channels (e.g., a ".mov" file).

Next, the process creates (at 2810) an asset data structure for the media file. At this point in the process, the asset data structure is an empty structure. Some embodiments define the data structure in a CoreData (SQLite) database file, an XML file (e.g., an XML file for an event), etc. As mentioned, FIG. 29 illustrates an asset data structure 2900 for the media asset. The asset data structure 2900 is fully populated, and this data will be described further below.

In some embodiments, the asset data structure is created within an event data structure. If the event data structure does not yet exist, then the media-editing application also creates this data structure to contain the asset. As shown in FIG. 29, the asset data structure 2900 is one asset within the event data structure 2905. The event data structure 2905 includes an event ID 2910, the list of assets, and a list of clips. The event data structure may include additional fields in some embodiments, such as the event name, event date (which may be derived from asset information), etc. The event data structure 2905 may be a CoreData (SQLite) database file that includes the assets and clips as objects defined with the file, an XML file that includes the assets and clips as objects defined with the file, etc.

The process next retrieves (at 2815) metadata from the imported file, and then stores (at 2820) this metadata in the asset structure. The metadata is information about the source file and its stored media in some embodiments. In some embodiments, this metadata is used to generate the asset ID, described below. The asset data structure 2900, as shown, includes source file metadata 2915. As shown, the source file metadata includes the file type (e.g., audio, video, movie, still image, etc.), the file format (e.g., ".mov", ".avi", etc.), the source device (i.e., the device that created the media, such as the particular type of camera on which a movie file was captured), the file creation date (e.g., the date a video was captured, rather than the date of import), a UUID (a unique identifier generated by a media creation device such as a camera), a set of video properties 2920, a set of audio properties 2925, and additional metadata. Different types (or manufacturers) of cameras create different UUIDs differently. These may be hashes of various data in some embodiments, such as a camera ID, record time (e.g., the time a user of the camera started recording, the duration of the video), etc., so long as no UUIDs will always be unique.

The video properties 2920 of some embodiments include such properties as a sample rate, a frame rate (i.e., the number of video images the video file contains per second, often 24, 25, or 30), the dimensions of the image (i.e., the number of pixels horizontally and number of rows of pixels), the pixel aspect ratio (i.e., the shape of the pixels, which may be square (HD video) or rectangular (e.g., NTSC video has a ratio of 10:11)), the pixel transform, and the colorspace in which pixel values of the image are defined (e.g., ITU-R BT.709 for HD, ITU-R BT.601 for SD, etc.). The audio properties 2925 of some embodiments include a sample rate (i.e., the number of audio samples per second, often 48 kHz), the number of audio tracks stored in the underlying media file, and the number of audio channels stored in the underlying media file. In some embodiments, the asset may additionally store override data that modifies one or more of the video or audio properties. For instance, a user might enter that a media file is actually 1080p, even though the file's metadata, stored in the asset, indicates that the video is 1080i. When presented to the user, or used within the application, the override will be used and the media file will be treated as 1080p.

Returning to FIG. 28, the process 2800 then creates (at 2825) an asset ID and stores the asset ID in the asset structure. The asset ID, in some embodiments, is a function of various properties of the underlying media file. For instance, some embodiments generate the asset ID as a hash of properties such as a file identifier, video properties, audio properties, and media range. The creation of the asset ID will be described in further detail by reference to FIG. 30. As shown in FIG. 29, the asset ID 2910 is stored in the video asset 2900.

With the asset created, the process 2800 then begins populating the asset with references to various data. The process stores (at 2830) a reference to the original media file in the asset structure. As described above, this reference initially refers to the media file on the device from which the application is importing the file (e.g., the camera), and then once the file is copied to the application's folder structure, the reference is modified to refer to the copied media file.

Next, the process 2800 creates (at 2835) a clip data structure containing a reference to the asset. In some embodiments, a clip is created for each asset. As will be described below, clip data structures (e.g., clip objects) can also contain other clips, and some embodiments use the same data structure for single asset clips, compound clips containing multiple assets and/or nested clips, and project sequences. The clip data structure, like the asset, is contained in the event data structure in some embodiments. Some embodiments create a series of nested clip objects for an imported clip, as described in further detail below. The lowest clip object in the nested hierarchy references the asset.

Next, the process determines (at 2840) whether any transcoded versions of the media are generated by the media-editing application. As described in subsections A and B above, some embodiments generate one or more transcoded versions of imported media files in formats that are better suited for editing. This may be an automatic process based on the imported file properties, or based on user selection of whether to transcode the media. When one or more transcoded versions of the media are created, the process stores (at 2845) references to any such transcoded versions of the media file in the asset data structure.

The process also determines (at 2850) whether any analysis data is generated for the media by the media-editing application. As described above, some embodiments generate data about the video and/or audio data of a media file. This data may be generated automatically or based on user selection of particular analysis operations. When one or more analysis data files are created, the process stores (at 2855) references to any such analysis data files in the asset data structures. The process 2800 then ends.

The media asset 2900 of FIG. 29 includes references to three versions of the underlying media file: a copy of the original media file 2930, a high resolution transcoded media file 2935, and a low resolution transcoded media file 2940. In addition, the media asset includes references to a person detection file 2945, a color correction data file 2950, and a shake correction data file 2955. These data files are described in further detail in the subsections above. In some embodiments, the references stored in the asset data structures are pointers to the locations of the video on a physical storage device (e.g., the boot disk of the device on which the media-editing application operates). In the case of media asset 2900, the underlying file stores both audio and video. In some media formats, different files are used to store video and audio for a single shot (and there may be multiple audio files recorded by different audio recorders in some cases). In this case, some embodiments create separate assets for each file. In some embodiments, each media file gets its own asset data structure.

Figure 30:
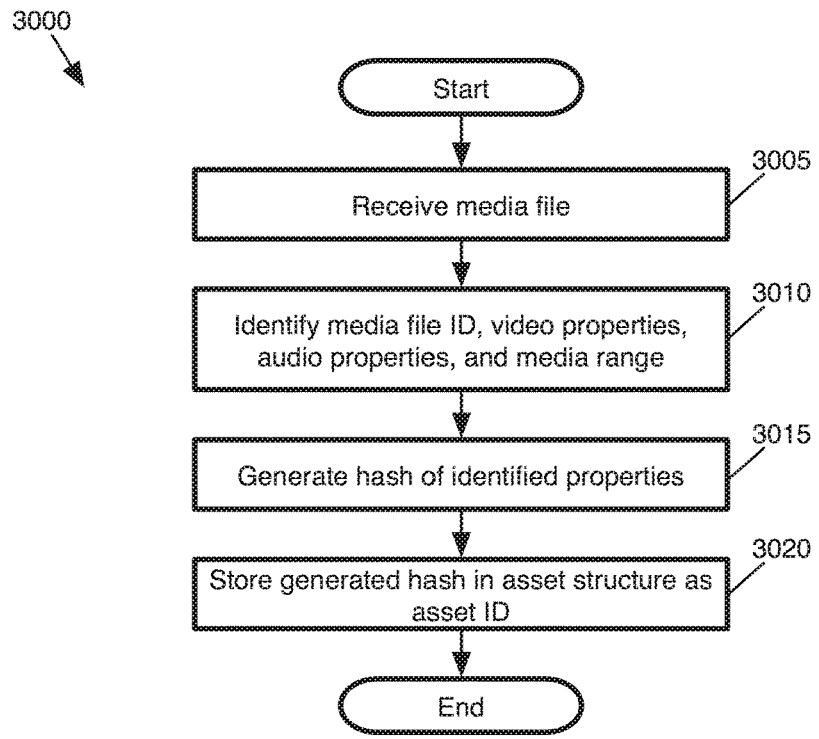
FIG. 30 conceptually illustrates a process of some embodiments for generating an asset ID and storing the ID in the data structure.

As mentioned in the discussion of FIG. 29, the asset ID for a particular asset may be generated using various properties of the asset's underlying media file. FIG. 30 conceptually illustrates a process 3000 of some embodiments for generating the asset ID and storing the ID in the data structure. In some embodiments, process 3000 is performed at operation 2825 of process 2800.

As shown, the process 3000 begins (at 3005) by receiving a media file (e.g., a video file, audio file, movie file, etc.). The process then identifies (at 3010) the media file ID, video properties, audio properties, and media range of the media file. As shown in FIG. 29, these may be stored as metadata of the source media file. The media file ID, in some embodiments, is a UUID generated by a camera that shot the media file, as described above. In some cases, the file may not have a UUID (e.g., if the device that captured the file does not generate UUIDs), and some embodiments will instead use the file name. The video properties used in some embodiments are the dimensions, colorspace, field dominance, sample duration, frame duration, pixel transform, and pixel aspect ratio, though different video properties may be used in different embodiments. The sample duration may be different from frame duration if, for example, the video is field rendered, in which case the frame duration is twice the sample duration. The frame duration, in some embodiments, is the inverse of the frame rate (e.g., if the frame rate is 30 fps, then the frame duration is 1/30 of a second). The audio properties used in some embodiments are the number of tracks, number of channels, and sample rate (i.e., the same as shown in audio properties 2925). Some embodiments include additional properties, such as the file creation date (i.e., the date and/or time at which the media was captured (e.g., filmed, photographed, recorded, etc.)).

The media range indicates the range of the original media file reference by the particular asset. Some embodiments use timecode values of the media file to define the media range. Thus, if a file is split apart (e.g., a user might take a thirty minute video and split it into a twelve minute video, a seven minute video, and an eleven minute video, as well as retain the original), the different timecodes will differentiate the assets. The media range can also be used if one of the assets goes missing, as an asset with identical properties and a range including the media range of the missing assets can be used to restore the missing asset.

The process then generates (at 3015) a hash of the identified properties of the media file. Different embodiments use different hash algorithms (e.g., MD5, etc.). The process then stores (at 3020) this generated hash in the asset structure as the asset ID. While the process 3000 describes one method of computing an asset ID, one of ordinary skill will recognize that asset IDs can be computed using many different properties and many different computation algorithms.

As mentioned above, some embodiments use a clip structure that references one or more assets when importing a media file. FIG. 31 illustrates a component clip data structure 3100 of some embodiments that references an asset. In some embodiments, the component clip 3100 is the lowest level of a set of nested clip objects, that are all members of the same class. The details of clip objects of some embodiments will be described below by reference to FIG. 32.

The component clip 3100 includes a clip ID, clip attributes (described in more detail below), and an asset reference 3105. The asset reference 3105 of some embodiments stores an event ID and an asset ID, and uniquely identifies a particular asset data structure, as indicated by the dashed arrow referring to an asset. The arrow is shown as dashed because the asset reference is not a direct reference to the asset, but rather is used to locate the asset when needed. When the media-editing application of some embodiments needs to identify a particular asset, the application uses the event ID to locate the event that contains the asset, and then the asset ID to locate the particular desired asset.

Figure 32:
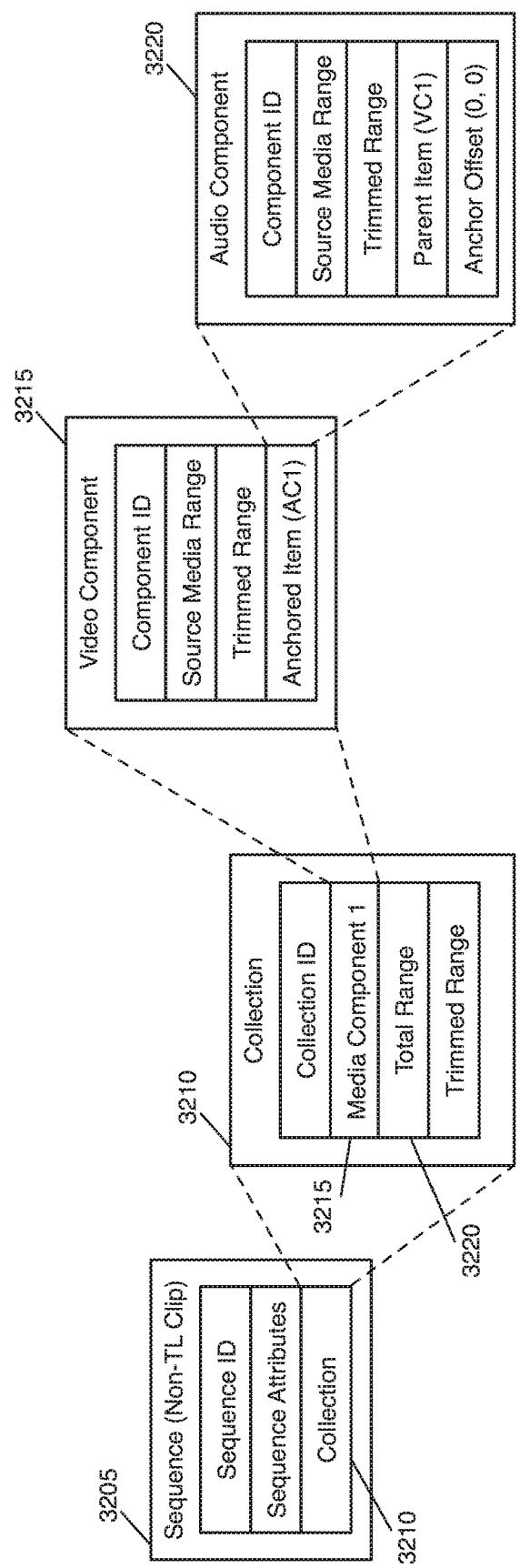
FIG. 32 conceptually illustrates a nested sequence of clip objects created by the media-editing application of some embodiments for an imported media file.

FIG. 32 conceptually illustrates a nested sequence of clip objects created by the media-editing application of some embodiments for an imported media file. In some embodiments, each of the clip objects shown in this figure is a member of the same class, though the object may be of different sub-classes. The media file whose clip structure is illustrated in FIG. 32 is a movie file that stores both audio and video information.

The figure illustrates a sequence 3205, a collection 3210, and two components 3215 and 3220. As mentioned, these three types of objects are all subclasses of clip objects (or anchored objects) in some embodiments. Some embodiments create a sequence within an event object for each imported media clip. The sequence 3205 stores a sequence ID, a set of sequence attributes, and the collection object 3210. The sequence ID is a unique identifier for the sequence object. The sequence attributes, in some embodiments, include video properties for the sequence, such as the resolution, frame rate, etc. The attributes may be set by a user in some embodiments, or set automatically based on the underlying media.

The collection object 3210 is an ordered array of clip objects. In the case of a clip imported into an event, as is the case with object 3210, the collection stores one or more component clips in the array. Often, the collection only stores the video component clip in the array, as shown here; any additional components (generally one or more audio components) are then anchored to that video component. In addition, the collection object 3210 stores a collection ID, a total range, and a trimmed range. The collection ID is a unique identifier for the collection object. The total range of a clip object indicates the maximum range for the object based on the objects it contains, while the trimmed range indicates the actual range of the object in its parent object according to user edits. In some embodiments, the collection object stores a value for the total range because the total range is a variable assigned to all types of clip objects, but this range is not actually used by the application. Instead, the application dynamically calculates the total range based on the objects contained by the collection (as opposed to updating the range value every time a clip is added to the collection). Some embodiments, on the other hand, do update the total range in the collection object. These ranges will be described in further detail below by reference to FIG. 33. The array of the collection object includes two media components 3215 and 3220. Collection objects, in some embodiments, can include component clip objects as well additional collections.

In the above paragraph and elsewhere in this section, a first object (e.g., the collection object 3210) is described as containing a second object (e.g., media component 32 in the collection object's array). In some embodiments, a first object contains a second object by storing a reference to the object (e.g., a pointer). This reference is a strong pointer in some embodiments.

The media components shown include a video component 3215 and an audio component 3220. These are the same data structures as the component clip 3100, in some embodiments, and thus store the clip attributes and the asset reference shown in that figure. Each of the components stores a component ID (i.e., the clip ID of FIG. 31), a source media range (i.e., total range) and a trimmed range. For a component clip that refers to a media asset, the total range is the duration of the source media. The trimmed range is the range selected by a user through various user edits (e.g., trim edits) and indicates both the start time within the total range and the duration, in some embodiments. The trimmed range is generally a subset of the total range (i.e., does include time outside the total range). However, in some embodiments, the application may use a range extender to extend the trimmed range past the total range (e.g., when needed for part of a transition, or if aligned audio runs slightly longer than video). Some embodiments will generate video images using, e.g., the first and last images of the video file, to fill in the needed extra range. When a clip is initially imported into the application, the total range and trimmed range will generally be equal as the user will not have edited the clip at all yet.

The video component 3215 includes an anchored item set that contains the audio component 3220. As described above by reference to the timeline 115 in the user interface 100 of FIG. 1, clips can be anchored to other clips in some embodiments. When a particular clip is moved in a timeline, any clips anchored to the particular clip are moved along with it. Each clip can have numerous clips anchored to it, and can be anchored to a single clip. In the case of a media clip with audio and video components, some embodiments anchor the audio component to the video component. Thus the video component object 3215 contains the audio component in its set of anchored items (and could include numerous such items if there were additional audio components), while the audio component object 3220 includes a parent item reference to the video component to which it is anchored. In addition, the child (anchored) object stores an anchor offset that indicates two values. The first value is the position in the parent object to which the child object is anchored, and the second value is the offset within the child object of the anchor. In the case of an imported media file, the audio and video components will start at the same time, and thus both anchor offset values are zero. However, this can be modified if, for example, there is a slight offset in the recordings of the two components and the user has to adjust the audio relative to the video.

Figure 33:
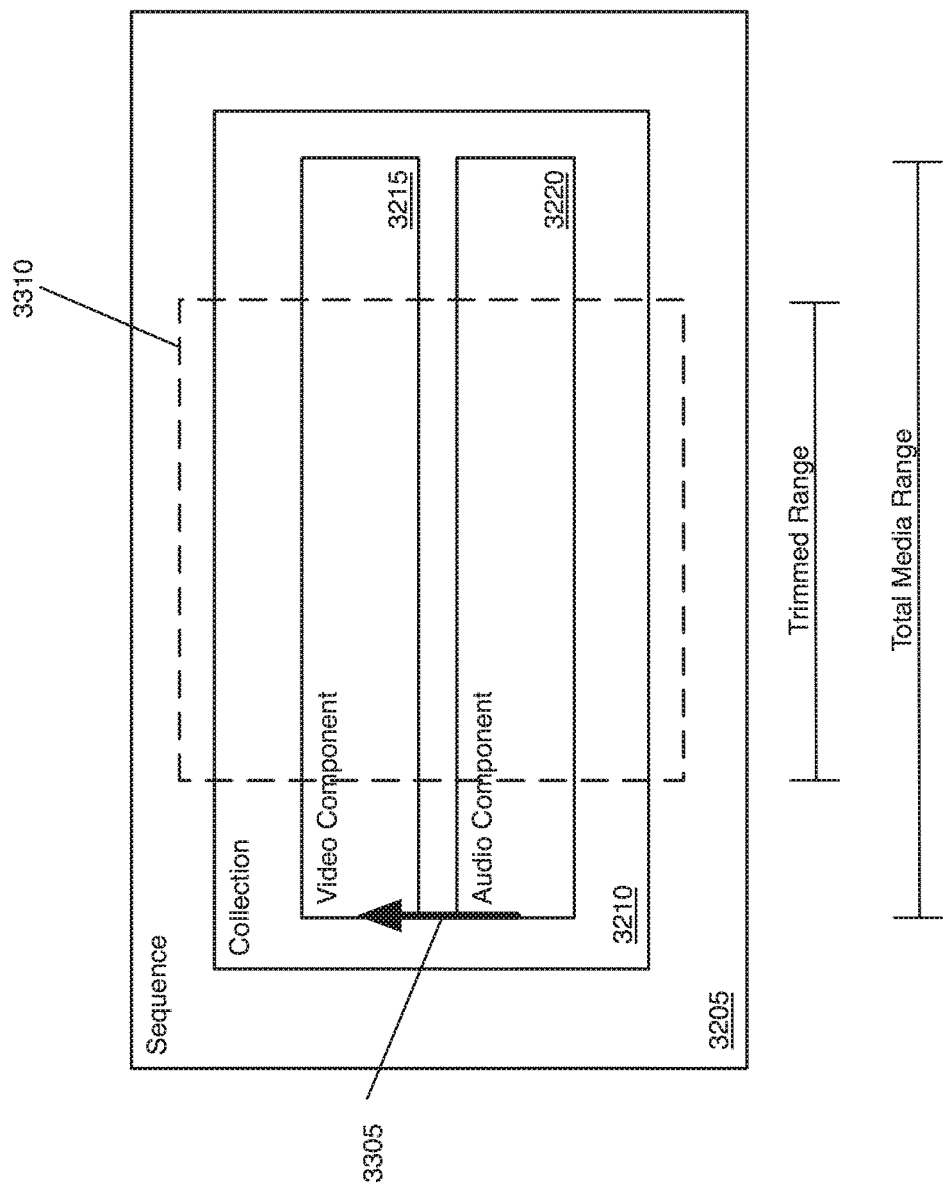
FIG. 33 conceptually illustrates objects nested in a conceptual timeline.

FIG. 33 conceptually illustrates the objects 3205-3220 nested in a conceptual timeline. The figure shows video and audio components 3215 and 3220 inside the collection 3210, which is nested inside the sequence 3205. The audio component 3220 is anchored to the video component 3215; specifically, as shown by the thick arrow 3305, the start of the audio component is anchored to the start of the video component.

The figure also includes a dashed box 3310 that illustrates that a user has trimmed the clips so that portions at the beginning and end of the clip are not part of the sequence were it to be rendered. Thus, the total media range of the components is the full length of the media to which they refer, whereas the trimmed range is a subset of this range based on the user edits. In some embodiments, all clip objects store a total range and trimmed range. The collection 3210, in this case, will have the same total range and trimmed range as the components. However, if the components were offset, or if the collection included additional objects, it would have larger trimmed and total ranges. For sequence objects, the total range and trimmed ranges are always equal in some embodiments. In the illustrated case, the sequence 3205 has a range equal to the trimmed range of the collection 3210. As the user edits the objects in the sequence, both the trimmed and total ranges of the sequence change. In some embodiments, these ranges are based on units of time, number of frames, and/or number of audio samples. As described above by reference to FIG. 2, the media-editing application of some embodiments provides a volume control for a user of the application to control the volume of a media clip displayed in the timeline.

Figure 34:
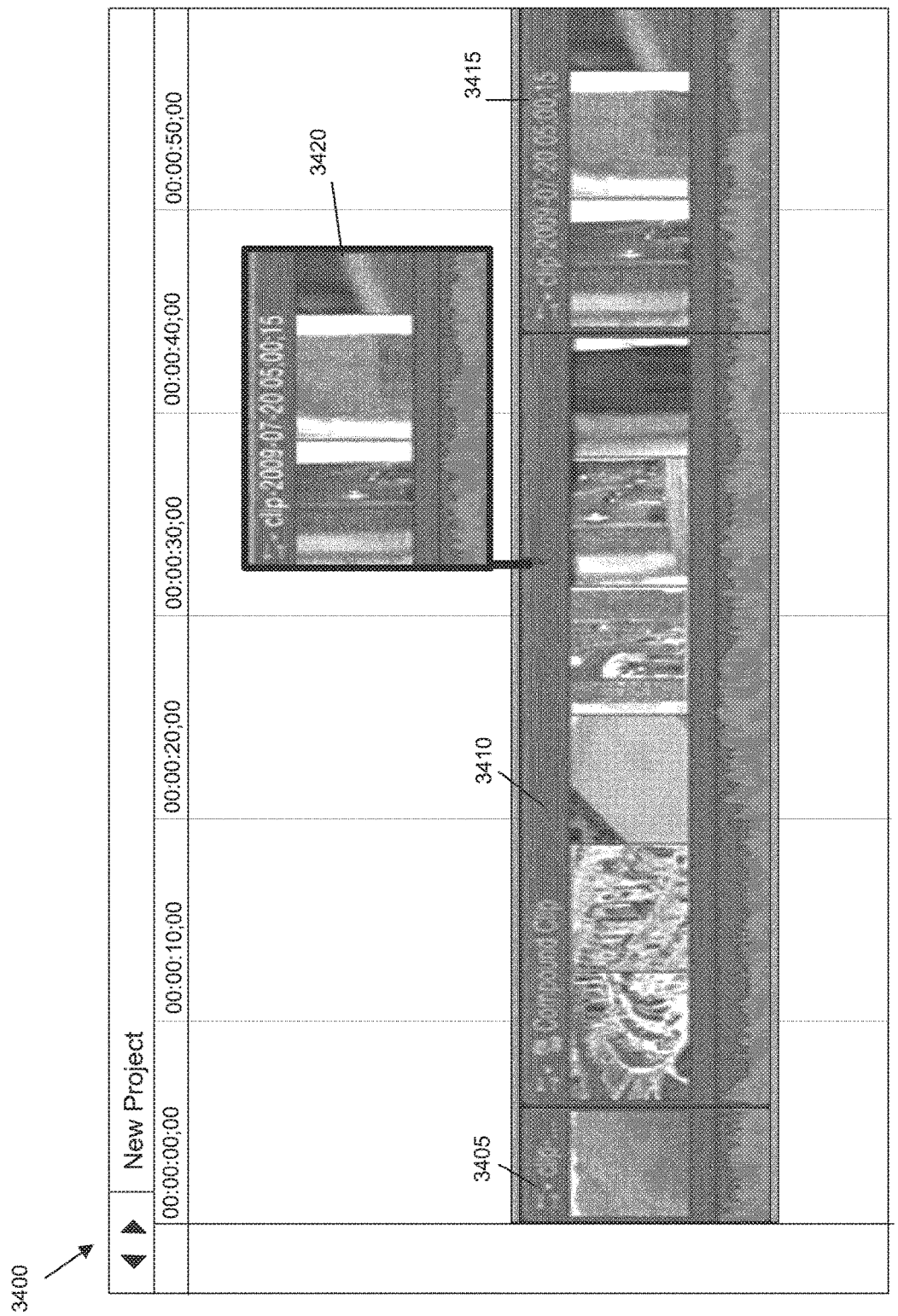
FIG. 34 illustrates a timeline of some embodiments.

FIG. 34 illustrates a timeline 3400 with a project title "New Project" that includes four clips 3405-3420. The clips 3405-3415 are in the primary compositing lane of the project's sequence, while the clip 3420 is anchored to clip 3410 at approximately 26 seconds into clip 3410. The clip 3410 is a compound clip that itself includes two clips.

Figure 35:
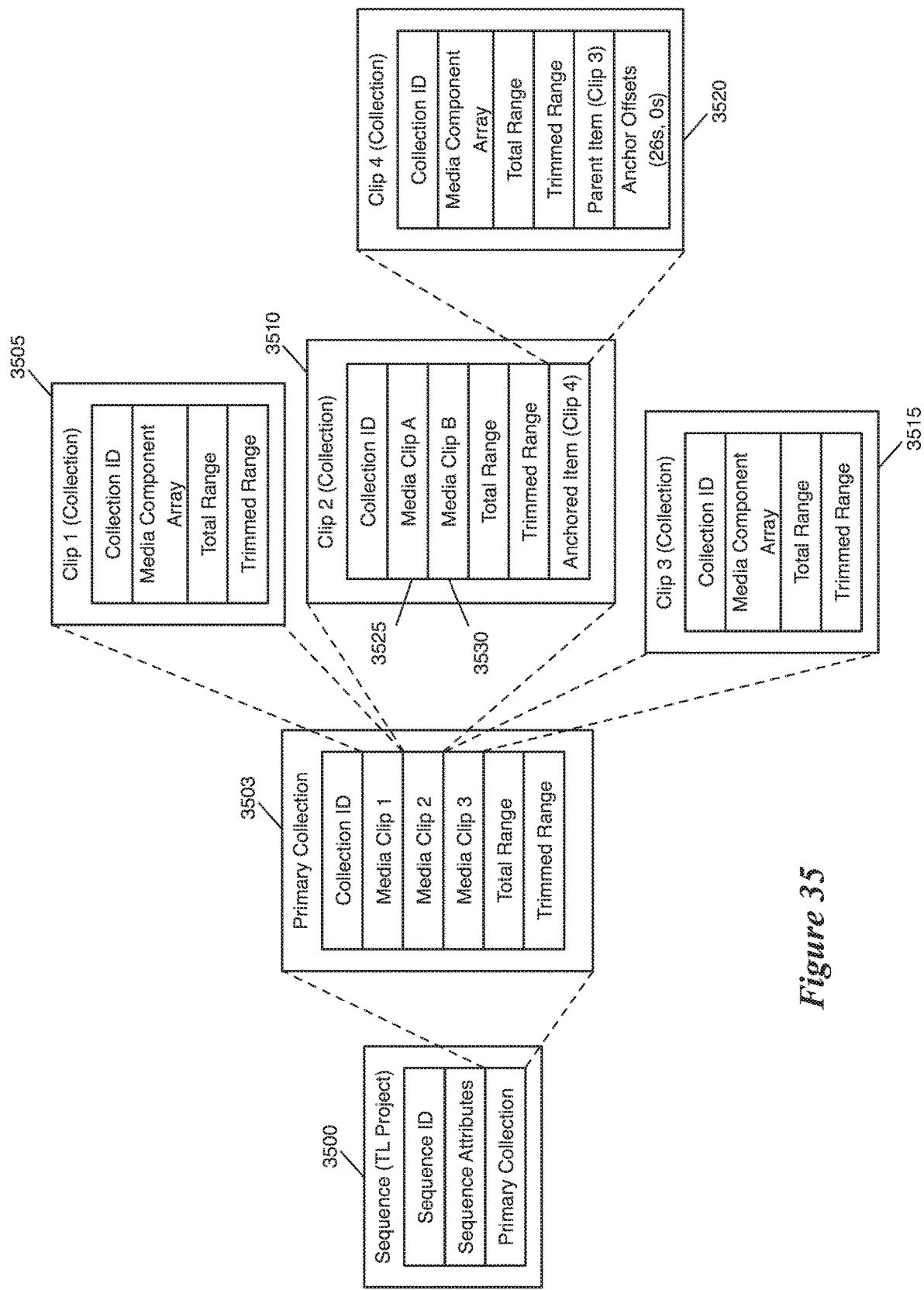
FIG. 35 conceptually illustrates a subset of the data structures for the sequence illustrated in FIG. 34.

FIG. 35 conceptually illustrates a subset of the data structures for the sequence illustrated in FIG. 34. In some embodiments, the data structures of FIG. 35 are all contained within a project data structure that contains a single sequence. In some embodiments, the project data structure for a project in the timeline is a sub-class of a class that also includes event data structures. Unlike the project data structures, the event data structures can contain multiple sequences, and in fact contain a sequence (such as sequence 3305) for each clip in the event.

FIG. 35 illustrates a sequence 3500 that includes a primary collection data structure 3503, which itself is an array of three collections 3505-3515 that correspond to the clips 3405-3415. In addition, the fourth clip 3420 is stored as a data structure within the collection 3510. For simplicity, the component objects are not shown in this figure. The sequence 3500 includes a sequence ID, sequence attributes, and the primary collection 3503. The sequence attributes for a project in the timeline are set by a user when creating the project, in some embodiments.

The primary collection 3503 includes the collection ID, total and trimmed range, and the array of media clips. In some embodiments, the array is ordered based on the location in the timeline and only includes media clips in the primary lane of the collection. The application assumes that there is no gap between these items, and thus no timing data is needed between the items. As shown, each of these clips is represented as a collection. When a clip stored in an event (e.g., the clip shown in FIG. 32) is added to a project in a timeline, some embodiments remove the sequence container data structure (e.g., structure 3205) and copy the rest of the structure (i.e., the collection and its components) into the data structure for the object in the timeline.

Clips 3505, 3515, and 3520 are individual clips that have been added to the timeline from the clip browser, and thus do not themselves include collections. Similar to the collection 3210, these objects include an ID, total and trimmed ranges, and an array of media components (e.g., a video component and one or more audio components).

The clip 3510 is a compound clip and therefore includes multiple clips in addition to the collection ID and ranges. Specifically, the clip 3510 includes two media clips 3525 and 3530. Within the collection, the clips are both in the primary lane of the collection, and thus one follows the next. These clip objects are not shown in this figure, but each of the clips is similar to clip 3505 in that the clips include an array of media components. In addition, the clip object 3510 includes a set of anchored items (in this case only the one item, clip 3520). Some embodiments include a set of anchored items for each collection, which are empty for the other objects shown in this figure. The anchor offset stored in clip 3520 indicates that it is anchored 26 seconds into clip 2, and that the anchor is at the start of clip 3520. These times refer to the trimmed ranges of the clips in some embodiments.

When one of clips 3405, 3510, and 3515 is removed from the spine and placed in the anchor lane above the spine like clip 935 does as illustrated in FIG. 9 above, the corresponding entry in the media component array of the primary collection 3503 will be removed from the array and the primary collection will include an anchored item that associates with the collection for the removed clip. The collection for the removed clip will then include anchored offsets. Conversely, when anchored clip 3420 is inserted into the spine as the second media component of the primary collection 3503 like clip 1025 does as illustrated in FIG. 10 above, the primary collection will create an entry for the collection #9220 in the array of the media components. The anchored offsets will be deleted from the collection 3520. Also, the anchored item for the collection 3520 in the collection 3510 will be deleted. When the anchored clip 3420 is moving along the timeline as clip 1130 does as illustrated in FIG. 11 above, the first value of the anchor offsets in the collection 3520 will be modified accordingly.

Figure 36:
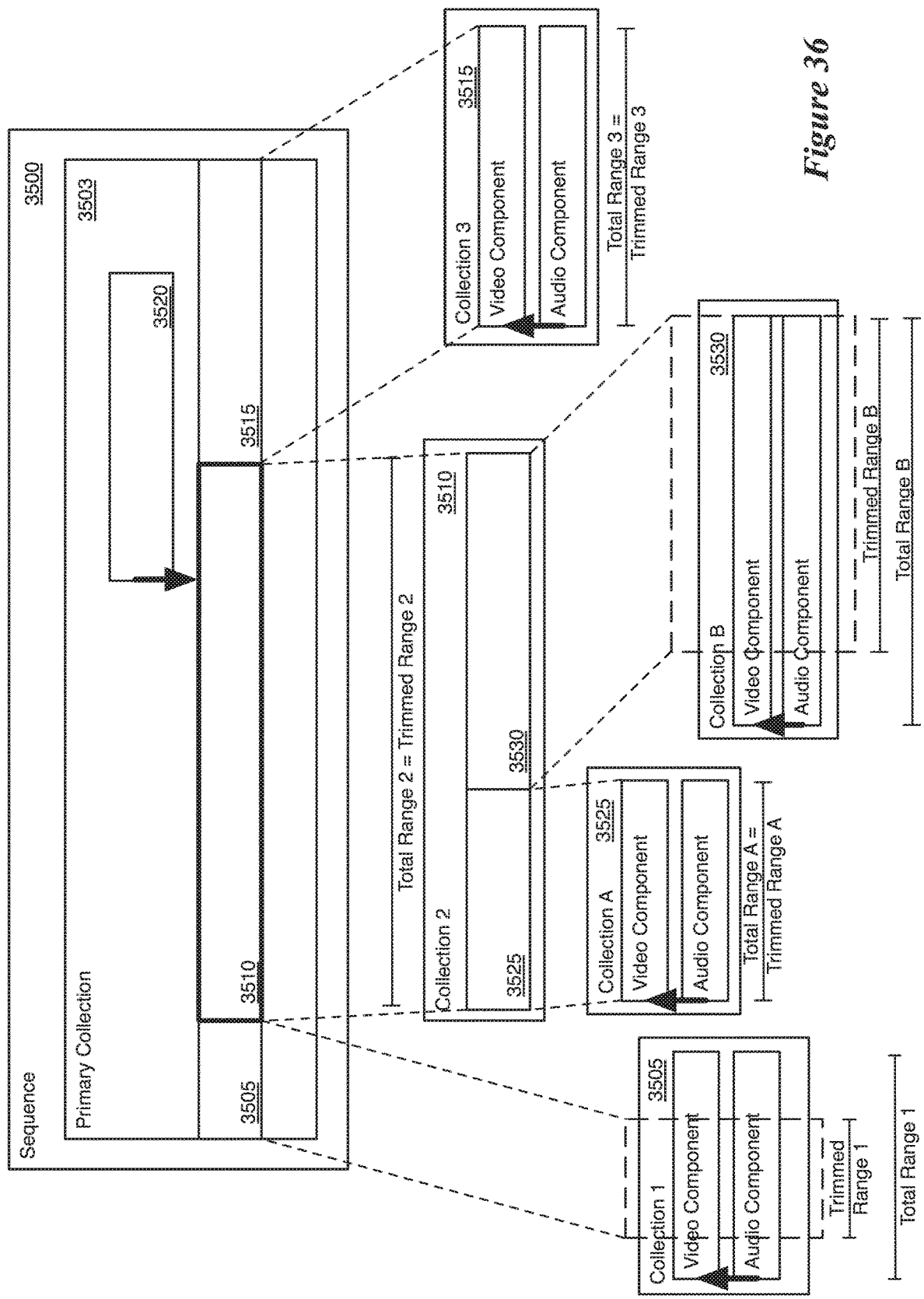
FIG. 36 conceptually illustrates objects nested in a conceptual timeline.

FIG. 36 conceptually illustrates the objects 3500-3230 nested in a conceptual timeline. As shown, collection objects 3525 and 3530 are nested inside the collection 3510, which is nested inside the primary collection object 3503 along with the collection objects 3505, 3515, and 3520. The collection object 3503 is itself nested inside a sequence object.

The figure illustrates the anchoring relationships between the various clips as well as the durations (ranges) of the clips. As with the clip objects shown in FIG. 33, each of the lowest level collections 3505, 3515, 3525, and 3530 each have an audio component anchored to a video component. While not shown, collection 3520 could also have the same video/audio setup, or could be just a video component (or just an audio component). While each of the objects shown has a single audio component, one of ordinary skill will recognize that some embodiments will have multiple audio components (e.g., if a camera records several audio tracks as separate files and imports the files with a video file as part of a single clip).

The figure also illustrates the anchoring of clip 3520 to clip 3510. In some cases, multiple clips will be anchored to the same primary lane clip, and the multiple anchored clips may overlap in time. In this case, multiple secondary lanes may be used. Some embodiments assign lane numbers to each clip object that indicates the clip object's lane within a collection.

All of the primary lane objects are assigned a lane number of zero in some embodiments, with lanes above the primary lane getting increasing numbers and lanes below the primary lane getting decreasing (negative) numbers. For instance, a separate audio clip might be anchored to a clip in the primary lane and displayed below the primary lane. In this case, within the primary collection 3503, the anchored clip 3520 has a lane number of 1. The lane numbers indicate compositing order for video in some embodiments. Whereas two audio files can be combined fairly easily (mixed), two video files cannot be displayed at the same time. Thus, some embodiments composite higher lane number clips on top of lower lane number clips. If no compositing effect is defined between two clips at the same time, then the clip in the higher lane will be displayed. However, various compositing modes and effects may be used to combine the pictures (e.g., compositing modes such as subtract, darken, multiply, etc. that combine pixel information of two images, as well as effects such as scaling the top image to get a picture-in-picture, applying a color mask to the top image, etc.).

The items in a lower-level nested collection will also have lane numbers that refer to their lane order within that collection. For example, the collection object 3510 has two clips 3525 and 3530, that each have a lane number of zero. However, this collection object could have anchored clips in multiple lanes. For the purpose of compositing at time of rendering, the items within the collection 3510 would be composited initially according to the ordering within the collection, then the output of that would be composited within the primary collection according to the ordering of the primary collection. Similarly, for each of the lowest-level collections (e.g., collection 3505), the video components are all lane zero and the audio components are lane −1.

FIG. 36 also illustrates the ranges (e.g., durations) of the various clip objects. For the lowest level collections and their components (e.g., collections 3505, 3515, 3525, 3530, and 3520), the trimmed range and the total range are determined in a manner similar to that shown in FIG. 33 for the collection object 3210. In this case, collections 3515 and 3555 are not trimmed at all, whereas collection 3505 is trimmed on both sides and the start of collection 3530 is trimmed.

For collection 3510, the total range is the sum of the trimmed ranges of its primary lane clips, which in this case are collections 3525 and 3530. Thus, the variable Total Range 2=Trimmed Range A+Trimmed Range B. In this case, the collection 3510 is not separately trimmed, such that its trimmed range equals its total range. This means that, although there is more media within clip 3530, while editing the primary collection 3503 the media-editing application will not allow a user to increase the duration of clip 3510 beyond that of Total Range 2. However, a user could open up the clip 3510 in the timeline and apply trim edits to either of clip 3525 and 3530. Modifications to the trimmed range of these clips will affect the total range of the clip 3510. In addition, within the primary collection 3503, a user can modify the trimmed range of clip 3510 to shorten the clip. Trimming from the beginning would result in less of the media of collection 3525 being used in the component presentation, while trimming from the end would result in less of the media of collection 3530 being used in the composite presentation.

The above figures illustrated various aspects of different subclasses of clip objects (e.g., sequences, collections, and components). One of ordinary skill will recognize that clip objects of some embodiments may have additional properties not shown in these figures. For instance, both collections and components may have an effect stack in some embodiments, which stores a stack of effects that are applied to the media in the clip when the application renders the clip. The application applies these affects to the media in an order designated by the effects stack, which can be modified by the user during editing. The effects may include audio effects that perform a transform on the audio or video effects that apply a function to the pixel values of the video images, in some embodiments. In fact, some embodiments store separate video and audio effects stacks.

In addition, one of ordinary skill in the art will recognize that some embodiments may have additional different subclasses of clip objects. For instance, some embodiments store generators, transitions, audition stacks, markers, and keywords as clip objects. A generator, in some embodiments, is an effect used in a composite presentation that creates its own video images rather than modifying existing images (e.g., clouds and other computer-generated effects that may rely on random processes). Some embodiments also use generators as gap elements (e.g., a position clip) in collections in specific circumstances. If, for example, a user were to select clip objects 3505 and 3520 and create a compound clip from these objects, a gap element would be inserted into the collection object for the compound clip to take up the missing space of clip object 3510, which the user did not add to the collection. The clip object 3520 would then be anchored to this gap element. In some embodiments, these clips are not actually generators, but are special clips that produce neither audio nor video but add duration to a collection. As the generators create their own video images, they have a duration and this duration adds to the range of the collection containing the generator.

Transition objects, on the other hand, are used for transitions between two other clip objects. These objects have a range of 0, and do not add to the range of the container clip object. A transition object is stored in the array of its containing collection with an index between the indices of the two items between which it transitions. The transition object has a head and a tail that indicate the start and end of the transition between the clips.

Audition stack objects, or variants, store a list of possible clips for a particular index in a collection or for a particular anchor. That is, the audition stack object stores a set of clips, one of which is designated as active at any time. The properties of the stack object take on the properties of the active clip, such as the ranges, video properties (e.g., frame rate, resolution, etc.), audio properties, etc. Thus, when a user switches the active clip in the stack, some attributes of the stack may change. In addition, some of the objects in the stack may be collections that themselves have nested clips, while others might be simpler clip objects. When an audition stack object is anchored to another clip, some embodiments store the first portion of the anchor offset in the audition object (i.e., the offset within the parent clip), but store different offsets within the child clip for the different clips in the audition.

Marker objects store markers that a user adds to a specific time location in a collection. In some embodiments, marker objects have a duration of 1 frame, and store metadata indicating the type of marker (e.g., to do marker, analysis marker, etc.) and any notes about the marker that the user adds. Some embodiments anchor marker objects to a particular clip object. When calculating the duration of a collection, marker objects are specifically excluded from this calculation in some embodiments.

Finally, keyword objects store keyword tags about a clip object. Unlike markers, keywords have a range, as some embodiments provide the user the ability to tag a particular range of a clip rather than just associating the keyword with the entire clip. In some embodiments, a keyword object can store multiple keywords that have the same range. Some embodiments anchor keyword objects to the tagged clip object at the start of the range within the tagged object. Like markers, some embodiments specifically exclude keyword objects from the duration calculation for a collection.

Figure 37:
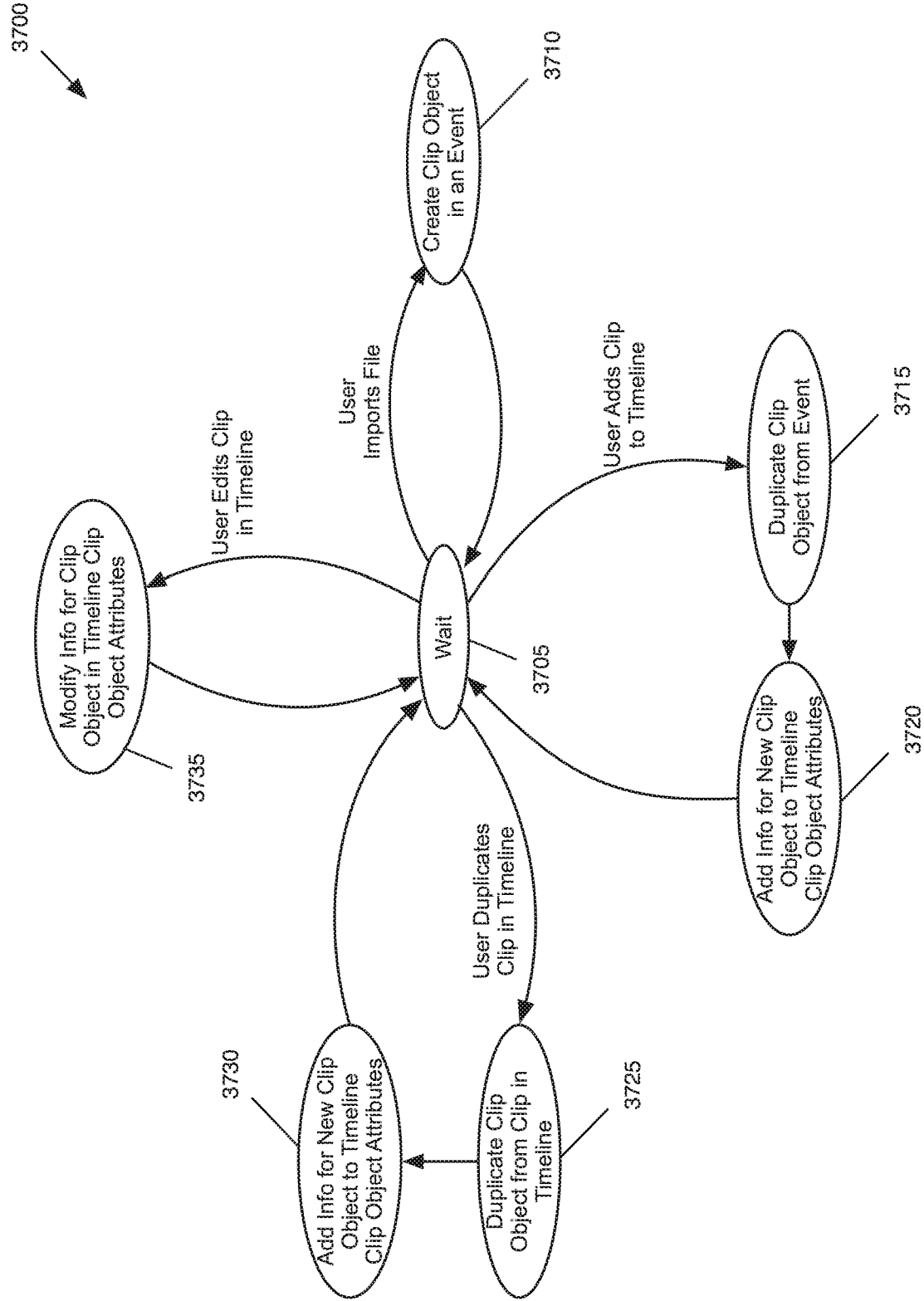
FIG. 37 conceptually illustrates a state diagram for a media-editing application of some embodiments.

FIG. 37 conceptually illustrates a state diagram 3700 for a media-editing application of some embodiments. Specifically, state diagram 3700 refers to the creation and modification of clip data due to various user actions. As shown, when the application is not receiving any such actions, the application is in the wait state 3705.

When a user imports a file, the application transitions to 3710 to create a clip object in an event for the imported file. The event may also need to be created, depending on whether the user is importing the file to an existing event. The clip object, as shown above, refers to an asset that refers to the file. The application then returns to the wait state 3705.

When the user adds a clip to the timeline (e.g., by dragging the clip from the browser to the timeline), the application transitions to 3715 and duplicates the clip object from the event to create a new clip object that is part of the project currently edited in the timeline. The clip data is partly the same (i.e., the same asset reference), but may also refer to only a portion of the asset (i.e., may have in and out points). In addition, the application transitions to 3720 to add information for the new clip object to the timeline clip object attributes. That is, the timeline is also represented by a clip object in some embodiments (e.g., may be a project, compound clip, etc.) and this data structure will be modified to refer to the new clip and store the position of the new clip. The application then returns to the wait state 3705.

When the user duplicates a clip in the timeline (as opposed to adding a clip from the browser), the application transitions to 3725 to duplicate the clip object from the clip in the timeline. This is a similar process as described above at state 3715. In addition, the information about the new clip is added to the timeline clip object at state 3730. Furthermore, at both state 3730 and state 3720, clip information in the timeline clip object may need to be modified to account for movement of other clips.

When the user edits a clip in the timeline (e.g., moves the clip), the application transitions to 3735 to modify the information for the edited clip object in the timeline clip object attributes, this may involve modifying its horizontal (time) and/or hierarchical position if the clip is moved. In addition, if the clip is trimmed, the information in the edited clip may need to be changed (i.e., its in and out points in the source media).

VI. Software Architecture

Figure 38:
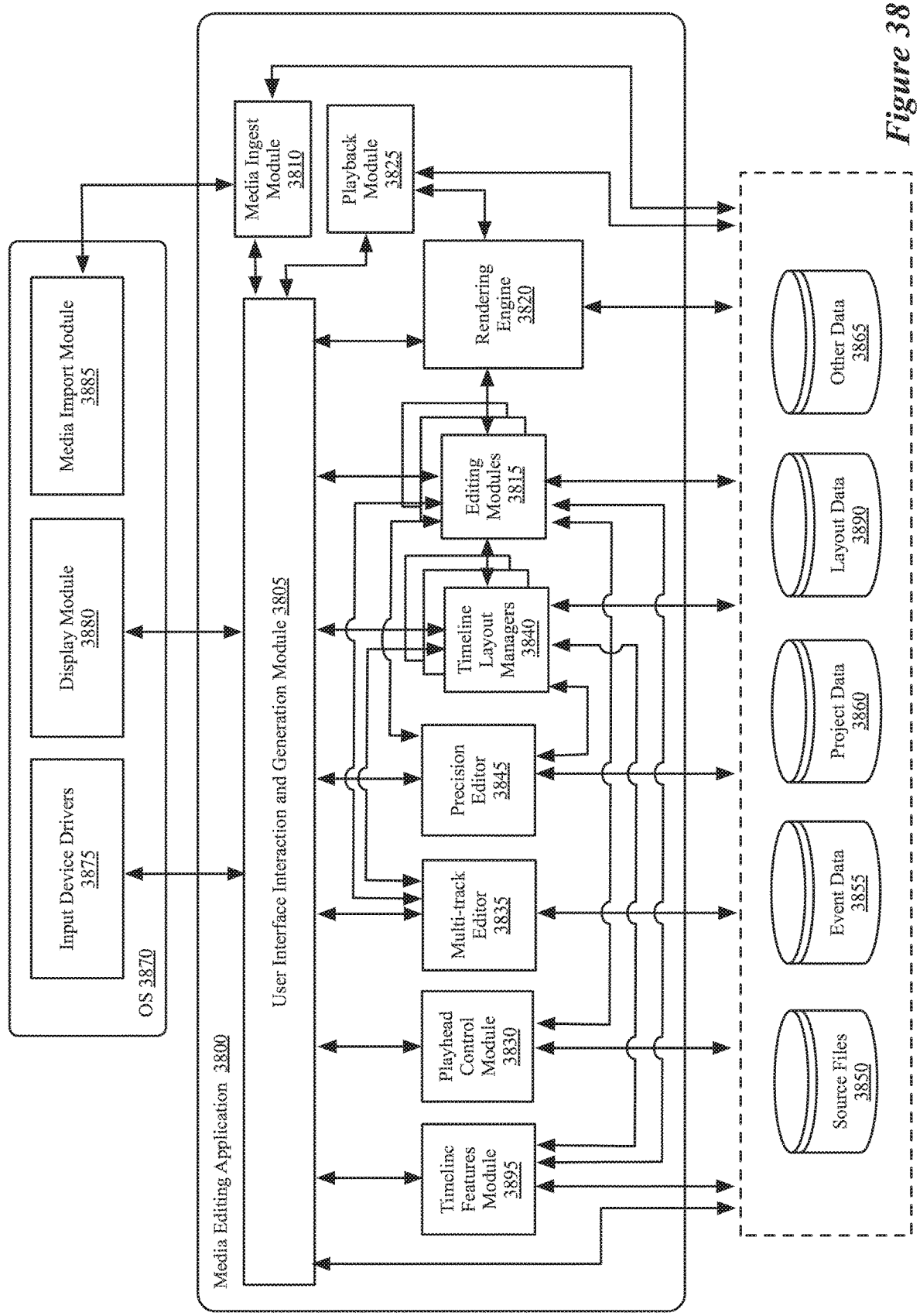
FIG. 38 conceptually illustrates a software architecture of a media-editing application of some embodiments.

In some embodiments, the processes described above are implemented as software running on a particular machine, such as a computer or a handheld device, or stored in a machine readable medium. FIG. 38 conceptually illustrates the software architecture of a media editing application 3800 of some embodiments. In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 3800 includes a user interface (UI) interaction and generation module 3805, a media ingest module 3810, editing modules 3815, rendering engine 3820, playback module 3825, timeline features module 3895, playhead control module 3830, multi-track editor 3835, and precision editor 3845.

The figure also illustrates stored data associated with the media-editing application: source files 3850, events data 3855, project data 3860, layout data 3890, and render files 3865. In some embodiments, the source files 3850 store media files (e.g., video files, audio files, combined video and audio files, etc.) imported into the application. The source files 3850 of some embodiments also store transcoded versions of the imported files as well as analysis data (e.g., people detection data, shake detection data, color balance data, etc.). The events data 3855 stores the events information used by some embodiments to populate the clip library and clip browser. The events data may be a set of clip object data structures stored as one or more SQLite database files (or other format) in some embodiments. The project data 3860 stores the project information used by some embodiments to specify a composite presentation in the timeline. The project data may also be a set of clip object data structures stored as one or more SQLite database files (or other format) in some embodiments. The layout data 3890 stores layout information (e.g., coordinates, length, width, lane numbers, etc.) of all clips that are displayed in the timeline. In some embodiments, the layout data 3890 is part of the project data 3860. The render files 3865 of some embodiments may include thumbnail-sized images for display in the clip browser or timeline, audio waveform displays for media clips, as well as rendered segments of a timeline sequence for use in playback. In some embodiments, the four sets of data 3850-3865 are stored in one physical storage (e.g., an internal hard drive, external hard drive, etc.). In some embodiments, the data may be split between multiple physical storages. For instance, the source files might be stored on an external hard drive with the events data, project data, and render files on an internal drive. Some embodiments store events data with their associated source files and render files in one set of folders, and the project data with associated render files in a separate set of folders.

FIG. 38 also illustrates an operating system 3870 that includes input device driver(s) 3875, display module 3880, and media import module 3885. In some embodiments, as illustrated, the device drivers 38875, display module 3880, and media import module 3885 are part of the operating system even when the media editing application 3800 is an application separate from the operating system.

The input device drivers 3875 may include drivers for translating signals from a keyboard, mouse, touchpad, tablet, touchscreen, etc. A user interacts with one or more of these input device, which send signals to their corresponding device driver. The device driver then translates the signals into user input data that is provided to the UI interaction and generation module 4305.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 3880 translates the output of a user interface for a display device. That is, the display module 3880 receives signals (e.g., from the UI interaction and generation module 3805) describing what should be displayed and translates these signals into pixel information that is sent to the display device. The display device may be an LCD, plasma screen, CRT monitor, touchscreen, etc.

The media import module 3885 receives media files (e.g., audio files, video files, etc.) from storage devices (e.g., external drives, recording devices, etc.) through one or more ports (e.g., a USB port, Firewire port, etc.) of the device on which the application 3800 operates and translates this media data for the media-editing application or stores the data directly onto a storage of the device.

The UI interaction and generation module 3805 of the media editing application 3800 interprets the user input data received from the input device drivers and passes it to various modules, including the media ingest module 3810, the editing modules 3815, the rendering engine 3820, the playback module 3825, the timeline features module 3895, the playhead control module 3830, the multi-track editor 3835, the precision editor 3845, and the timeline layout managers 3840. The UI interaction module also manages the display of the UI, and outputs this display information to the display module 3880. This UI display information may be based on information from the editing modules 3825, the playback module 3825, the timeline features module 3895, the playhead control module 3830, the multi-track editor 3835, the precision editor 3845, and the data 3850, 3855, 3860, 3890, and 3865.

The media ingest module 3810 manages the import of source media into the media-editing application 3800. Some embodiments, as shown, receive source media from the media import module 3885 of the operating system 3870. The media ingest module 3810 receives instructions through the UI module 3805 as to which files should be imported, then instructs the media import module 3885 to enable this import (e.g., from an external drive, from a camera, etc.). The media ingest module 3810 stores these source files 3850 in specific file folders associated with the application. In some embodiments, the media ingest module 3810 also manages the creation of event data structures upon import of source files and the creation of the clip and asset data structures contained in the events.

The editing modules 3815 include a variety of modules for editing media in the clip browser as well as in the timeline. The editing modules 3815 handle the creation of projects, addition and subtraction of clips from projects, trimming or other editing processes within the timeline (e.g., inserting, deleting, anchoring, appending, etc.), application of effects and transitions, or other editing processes. In some embodiments, the editing modules 3815 create and modify project and clip data structures in both the event data 3855 and the project data 3860.

Moreover, the editing modules 3815 works with the timeline layout managers 3840 to manage the layouts of the clips and effects (e.g., transitions) displayed in the timeline.

The rendering engine 3820 handles the rendering of images for the media-editing application. In some embodiments, the rendering engine manages the creation of images for the media-editing application. When an image is requested by a destination within the application (e.g., the playback module 3825) the rendering engine outputs the requested image according to the project or event data. The rendering engine retrieves the project data or event data that identifies how to create the requested image and generates a render graph that is a series of nodes indicating either images to retrieve from the source files or operations to perform on the source files. In some embodiments, the rendering engine schedules the retrieval of the necessary images through disk read operations and the decoding of those images.

The playback module 3825 handles the playback of images (e.g., in a preview display area of the user interface. Some embodiments do not include a playback module and the rendering engine directly outputs its images to the UI module 3810 for integration into the GUI, or directly to the display module 3880 for display at a particular portion of the display device.

In some embodiments, the render engine performs various operations to generate an output image. In some embodiments, these operations include blend operations, effects (e.g., blur or other pixel value modification operations), color space conversions, resolution transforms, etc.

In some embodiments, one or more of these processing operations are actually part of the operating system and are performed by a GPU or CPU of the device on which the application 3800 operates. The output of the rendering engine (a rendered image) may be stored as render files in storage 3865 or sent to a destination for additional processing or output (e.g., playback).

The timeline layout managers 3840 manage the layouts of the clips and effects (e.g., transitions) displayed in the timeline. For instance, the layout managers 3840 update the layout data 3865 as media clips in the timeline changes (e.g., by being edited, moved, deleted, etc.). The timeline layout managers 3840 interact with the editing modules 3815 to receive editing operations performed on the items displayed in the timeline. The timeline layout managers 3840 also interact with the numerical editor 3845 as well to get any editing updates. In some embodiments, each timeline layout manager has a one-to-one relationship with the spine in managing the layouts of the clips that are in the spine or anchored to the clips in the spine. As described above, the timeline layout managers 3840 may work with the editing modules 3815 in managing the layouts of the clips displayed in the timeline. Moreover, the layout managers 3815 in some embodiments perform the processes 1700 and 1900 described above by reference to FIGS. 17 and 19.

The timeline features module 3895 handles various features of the timeline in some embodiments provide. For instance, the timeline features module 3895 manages the separation of audio and video portion of a media clip displayed in the timeline. The timeline features module 3895 also controls the volume of a media clip that has audio content. These timeline features are described above by reference to FIG. 2. The timeline features module 3895 also communicates with the timeline layout managers 3840 and the editing modules 3815 for handling any changes in the layouts of the clips in the timeline and editing operations performed by using the provided timeline features.

The playhead control module 3830 manages playheads in the timeline in some embodiments. The playhead control module 3830 communicates with the editing modules 3815 to manage editing operations that are performed by using playheads. For instance, the playhead control module 3830 works with the editing modules 3815 for anchoring media clips based on the position of the primary playhead in the timeline. The playheads of some embodiments are described above by reference to FIG. 2.

The multi-track editor 3835 is a multi-track editing tool of some embodiments described above by reference to FIG. 22. As described above, the multi-track editor opens a media clip within the timeline for editing in multi-tracks. This multi-track editor opens different tracks contained in a media clip in different lanes to allow the user to edit individual tracks of the media clip independently. In some embodiments, the multi-track editor 3835 communicates with the timeline layout manager 3840 and the editing modules 3815 when performing edit operations on the opened media clip.

The precision editor 3845 is a precision editing tool of some embodiments described above by reference to FIG. 23. As described above, the precision editor splits the spine into two lanes and places each of two media clips to which a transition is applied in one of the two lanes for editing. In some embodiments, the precision editor 3835 communicates with the timeline layout manager 3840 and the editing modules 3815 when performing edit operations on the two media clips.

While many of the features of media-editing application 3800 have been described as being performed by one module (e.g., the UI interaction and generation module 3805, the media ingest manager 3810, etc.), one of ordinary skill in the art will recognize that the functions described herein might be split up into multiple modules. Similarly, functions described as being performed by multiple different modules might be performed by a single module in some embodiments (e.g., the playback module 3825 might be part of the UI interaction and generation module 3805).

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 39:
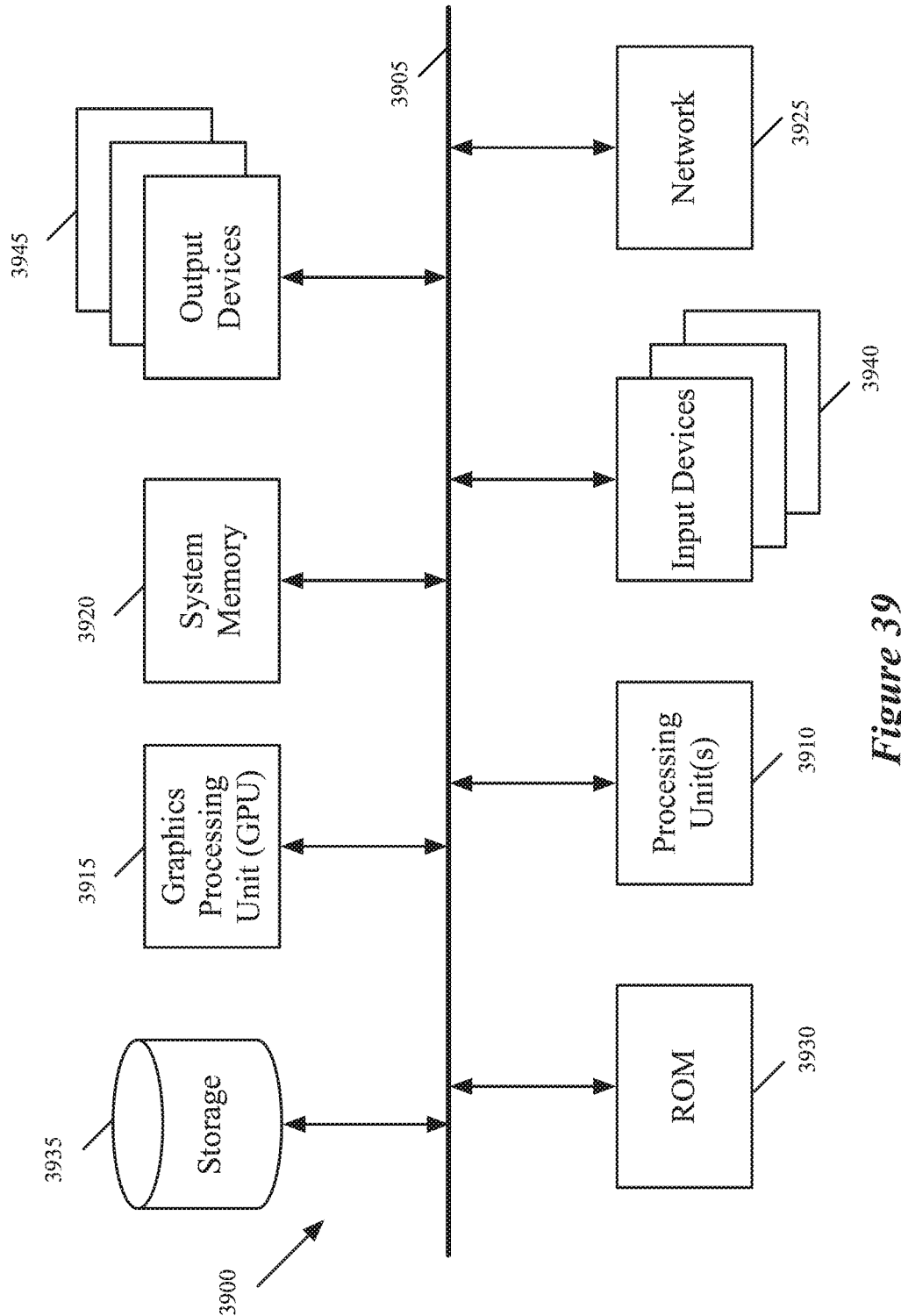
FIG. 39 conceptually illustrates an electronic system with which some embodiments of the invention are implemented.

FIG. 39 conceptually illustrates an electronic system 3900 with which some embodiments of the invention are implemented. The electronic system 3900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 3900 includes a bus 3905, processing unit(s) 3910, a graphics processing unit (GPU) 3915, a system memory 3920, a network 3925, a read-only memory 3930, a permanent storage device 3935, input devices 3940, and output devices 3945.

The bus 3905 collectively represents all system, peripheral, and chipset buses that communicatively connect the numerous internal devices of the electronic system 3900. For instance, the bus 3905 communicatively connects the processing unit(s) 3910 with the read-only memory 3930, the GPU 3915, the system memory 3920, and the permanent storage device 3935.

From these various memory units, the processing unit(s) 3910 retrieves instructions to execute and data to process in order to execute the processes of the invention. The processing unit(s) may be a single processor or a multi-core processor in different embodiments. Some instructions are passed to and executed by the GPU 3915. The GPU 3915 can offload various computations or complement the image processing provided by the processing unit(s) 3910. In some embodiments, such functionality can be provided using CoreImage's kernel shading language.

The read-only-memory (ROM) 3930 stores static data and instructions that are needed by the processing unit(s) 3910 and other modules of the electronic system. The permanent storage device 3935, on the other hand, is a read-and-write memory device. This device is a non-volatile memory unit that stores instructions and data even when the electronic system 3900 is off. Some embodiments of the invention use a mass-storage device (such as a magnetic or optical disk and its corresponding disk drive) as the permanent storage device 3935.

Other embodiments use a removable storage device (such as a floppy disk, flash memory device, etc., and its corresponding disk drive) as the permanent storage device. Like the permanent storage device 3935, the system memory 3920 is a read-and-write memory device. However, unlike storage device 3935, the system memory 3920 is a volatile read-and-write memory, such as random access memory. The system memory 3920 stores some of the instructions and data that the processor needs at runtime. In some embodiments, the invention's processes are stored in the system memory 3920, the permanent storage device 3935, and/or the read-only memory 3930. For example, the various memory units include instructions for processing multimedia clips in accordance with some embodiments. From these various memory units, the processing unit(s) 3910 retrieves instructions to execute and data to process in order to execute the processes of some embodiments.

The bus 3905 also connects to the input and output devices 3940 and 3945. The input devices 3940 enable the user to communicate information and select commands to the electronic system. The input devices 3940 include alphanumeric keyboards and pointing devices (also called "cursor control devices"), cameras (e.g., webcams), microphones or similar devices for receiving voice commands, etc. The output devices 3945 display images generated by the electronic system or otherwise output data. The output devices 3945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 39, bus 3905 also couples electronic system 3900 to a network 3925 through a network adapter (not shown). In this manner, the computer can be a part of a network of computers (such as a local area network ("LAN"), a wide area network ("WAN"), or an Intranet, or a network of networks, such as the Internet. Any or all components of electronic system 3900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray ● discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Although the above description of the various embodiments of the invention show background-rendering operations performed for video, many examples of these background-rendering operations are applicable to rendering audio as well. While the invention has been described with reference to numerous specific details, one of ordinary skill in the art will recognize that the invention can be embodied in other specific forms without departing from the spirit of the invention. In addition, a number of the figures (including FIGS. 17, 18, 21, 28, and 30) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a media-editing application for creating a media presentation from a plurality of media clips, the media-editing application comprising sets of instructions for:
   displaying a composite display area comprising a compositing lane for placing media clips to specify a description of the composite media presentation, the composite media presentation comprising a first media clip positioned temporally before a second media clip;
   receiving a user input to trim the second media clip displayed in the compositing lane of the composite display area;
   in response to receiving the user input, trimming a beginning of the second media clip displayed in the compositing lane;
   in response to trimming the beginning of the second media clip, moving the first media clip that is displayed before the second media clip in the compositing lane towards the second media clip as the second media clip is being trimmed; and
   in response to determining that the first media clip is a starting clip temporally positioned before all other media clips in the composite media presentation, expanding a region of the composite display area that is positioned before the first media clip to include blank space unoccupied by a media clip as the second media clip is being trimmed,
   wherein the first media clip is moved without adding additional media content of the first media clip to the compositing lane.

2. The non-transitory machine readable medium of claim 1, wherein the media-editing application further comprises a set of instructions for automatically displaying a scroll bar for adjusting the expanded region of the composite display area in response to the first media clip being trimmed.

3. The non-transitory machine readable medium of claim 2, wherein the media-editing application further comprises a set of instructions for, in response to completion of the trimming of the first media clip, automatically restoring a size of the region to an original size of the region prior to the expanding.

4. The non-transitory machine readable medium of claim 1, wherein the media-editing application further comprises a set of instructions for displaying a first anchor lane for placing media clips that are anchored to media clips in the compositing lane by a set of anchors, wherein an anchored media clip in the first anchor lane is anchored to a media clip segment in the compositing lane by an anchor having a position that defines a relationship between media contents of the anchored media clip and the media clip segment in the compositing lane.

5. The non-transitory machine readable medium of claim 4, wherein the first anchor lane is positioned above or below the compositing lane, and wherein the media-editing application further comprises a set of instructions for displaying a second anchor lane positioned on an opposite side of the compositing lane than the first anchor lane, the second anchor lane being for placing media clips that are anchored to media clips in the compositing lane by a second set of anchors.

6. The non-transitory machine readable medium of claim 1, wherein the media-editing application further comprises sets of instructions for:
   trimming a first amount of media content from the first media clip; and
   incrementing first additional media content for the first media clip by the first amount of media content trimmed off the first media clip.

7. A method for creating a media presentation from a plurality of media clips, the method comprising:
   displaying, by a media editing application of a computing device, a composite display area comprising a compositing lane for placing media clips to specify a description of the composite media presentation, the composite media presentation comprising a first media clip positioned temporally before a second media clip;
   receiving, by the computing device, a user input to trim the second a first media clip displayed in the compositing lane of the composite display area;
   in response to receiving the user input, trimming, by the computing device, a beginning of the second media clip displayed in the compositing lane;
   in response to trimming the beginning of the second first media clip, moving, by the computing device, the first media clip that is displayed before the second media clip in the compositing lane towards the second media clip as the second media clip is being trimmed; and
   in response to determining that the first media clip is a starting clip temporally positioned before all other media clips in the composite media presentation, expanding, by the computing device, a region of the composite display area that is positioned before the first media clip to include blank space unoccupied by a media clip as the second media clip is being trimmed,
   wherein the first media clip is moved without adding additional media content of the first media clip to the compositing lane.

8. The method of claim 7, further comprising automatically displaying a scroll bar for adjusting the expanded region of the composite display area in response to the first media clip being trimmed.

9. The method of claim 8, further comprising, in response to completion of the trimming of the first media clip, automatically restoring a size of the region to an original size of the region prior to the expanding.

10. The method of claim 7, further comprising displaying a first anchor lane for placing media clips that are anchored to media clips in the compositing lane by a set of anchors, wherein an anchored media clip in the first anchor lane is anchored to a media clip segment in the compositing lane by an anchor having a position that defines a relationship between media contents of the anchored media clip and the media clip segment in the compositing lane.

11. The method of claim 10, wherein the first anchor lane is positioned above or below the compositing lane, and further comprising displaying a second anchor lane positioned on an opposite side of the compositing lane than the first anchor lane, the second anchor lane being for placing media clips that are anchored to media clips in the compositing lane by a second set of anchors.

12. The method of claim 7, further comprising:
trimming a first amount of media content from the first media clip; and
incrementing first additional media content for the first media clip by the first amount of media content trimmed off the first media clip.

13. A system, comprising:
at least one processor; and
a non-transitory machine readable medium storing a media-editing application for creating a media presentation from a plurality of media clips, wherein the media-editing application, when executed by the at least one processor, causes the at least one processor to perform sets of instructions for:
displaying a composite display area comprising a compositing lane for placing media clips to specify a description of the composite media presentation, the composite media presentation comprising a first media clip positioned temporally before a second media clip;
receiving a user input to trim the second a first media clip displayed in the compositing lane of the composite display area;
in response to receiving the user input, trimming a beginning of the second media clip displayed in the compositing lane;
in response to trimming the beginning of the second media clip, moving the first media clip that is displayed before the second media clip in the compositing lane towards the second media clip as the second media clip is being trimmed; and
in response to determining that the first media clip is a starting clip temporally positioned before all other media clips in the composite media presentation, expanding a region of the composite display area that is positioned before the first media clip to include blank space unoccupied by a media clip as the second media clip is being trimmed,
wherein the first media clip is moved without adding additional media content of the first media clip to the compositing lane.

14. The system of claim 13, wherein the sets of instructions further comprise automatically displaying a scroll bar for adjusting the expanded region of the composite display area in response to the first media clip being trimmed.

15. The system of claim 14, wherein the sets of instructions further comprise, in response to completion of the trimming of the first media clip, automatically restoring a size of the region to an original size of the region prior to the expanding.

16. The system of claim 13, wherein the sets of instructions further comprise displaying a first anchor lane for placing media clips that are anchored to media clips in the compositing lane by a set of anchors, wherein an anchored media clip in the first anchor lane is anchored to a media clip segment in the compositing lane by an anchor having a position that defines a relationship between media contents of the anchored media clip and the media clip segment in the compositing lane.

17. The system of claim 16, wherein the first anchor lane is positioned above or below the compositing lane, and wherein the sets of instructions further comprise displaying a second anchor lane positioned on an opposite side of the compositing lane than the first anchor lane, the second anchor lane being for placing media clips that are anchored to media clips in the compositing lane by a second set of anchors.

18. The system of claim 13, wherein the sets of instructions further comprise:
trimming a first amount of media content from the first media clip; and
incrementing first additional media content for the first media clip by the first amount of media content trimmed off the first media clip.

* * * * *